(12) United States Patent
Wang et al.

(10) Patent No.: US 10,582,205 B2
(45) Date of Patent: Mar. 3, 2020

(54) ENHANCING VISUAL DATA USING STRIDED CONVOLUTIONS

(71) Applicant: Magic Pony Technology Limited, London (GB)

(72) Inventors: Zehan Wang, London (GB); Robert David Bishop, London (GB); Wenzhe Shi, London (GB); Jose Caballero, London (GB); Andrew Peter Aitken, London (GB); Johannes Totz, London (GB)

(73) Assignee: Magic Pony Technology Limited, London (GB)

( * ) Notice: Subject to any disclaimer, the term of this patent is extended or adjusted under 35 U.S.C. 154(b) by 0 days.

(21) Appl. No.: 15/680,753

(22) Filed: Aug. 18, 2017

(65) Prior Publication Data

US 2018/0130178 A1 May 10, 2018

Related U.S. Application Data

(63) Continuation of application No. PCT/GB2016/050429, filed on Feb. 19, 2016.

(30) Foreign Application Priority Data

Feb. 19, 2015 (GB) .................................. 1502753.5
Feb. 27, 2015 (GB) .................................. 1503427.5

(Continued)

(51) Int. Cl.
*G06K 9/62* (2006.01)
*H04N 19/36* (2014.01)
(Continued)

(52) U.S. Cl.
CPC ............... *H04N 19/36* (2014.11); *G06K 9/46* (2013.01); *G06K 9/6215* (2013.01); *G06K 9/66* (2013.01);
(Continued)

(58) Field of Classification Search
CPC ........ H04N 19/36; H04N 19/33; H04N 19/31; H04N 19/172; H04N 19/80; H04N 19/46;
(Continued)

(56) References Cited

U.S. PATENT DOCUMENTS 5,638,125 A 6/1997 Ahn et al.
5,673,213 A 9/1997 Weigl
(Continued)

FOREIGN PATENT DOCUMENTS

CN 101621683 A 1/2010
CN 102148996 A 8/2011
(Continued)

OTHER PUBLICATIONS

Dong et al (Learning a deep convolutional network for image super-resolution, Lecture Notes in Computer Science, Sep. 6, 2014, pp. 184-199) (Year: 2014).*

(Continued)

*Primary Examiner* — Amara Abdi
(74) *Attorney, Agent, or Firm* — Brake Hughes Bellermann LLP

(57) ABSTRACT

A method for enhancing at least a section of lower-quality visual data using a hierarchical algorithm, the method comprises receiving at least one section of lower-quality visual data; and extracting a subset of features, from the at least one section of lower-quality visual data. A plurality of layers of reduced-dimension visual data from the extracted features are formed and enhanced to form at least one section of higher-quality visual data. The at least one section of higher- (Continued)

quality visual data corresponds to the at least one section of lower-quality visual data received.

20 Claims, 27 Drawing Sheets

(30) Foreign Application Priority Data

| Mar. 31, 2015 | (GB) | 1505544.5 |
|---|---|---|
| Apr. 27, 2015 | (GB) | 1507141.8 |
| May 21, 2015 | (GB) | 1508742.2 |
| Jun. 25, 2015 | (GB) | 1511231.1 |
| Nov. 3, 2015 | (GB) | 1519425.1 |
| Nov. 6, 2015 | (GB) | 1519687.6 |

(51) Int. Cl.

| G06T 3/40 | (2006.01) |
|---|---|
| H04N 19/80 | (2014.01) |
| H04N 19/86 | (2014.01) |
| H04N 19/59 | (2014.01) |
| G06T 5/00 | (2006.01) |
| H04N 19/117 | (2014.01) |
| H04N 19/177 | (2014.01) |
| H04N 19/46 | (2014.01) |
| H04N 19/142 | (2014.01) |
| H04N 19/154 | (2014.01) |
| H04N 19/31 | (2014.01) |
| H04N 19/33 | (2014.01) |
| G06N 3/04 | (2006.01) |
| G06N 3/08 | (2006.01) |
| H04N 7/01 | (2006.01) |
| G06T 7/11 | (2017.01) |
| G06K 9/66 | (2006.01) |
| H04N 19/172 | (2014.01) |
| G06K 9/46 | (2006.01) |
| H04N 19/87 | (2014.01) |
| H04N 19/176 | (2014.01) |

(52) U.S. Cl.
CPC .............. *G06N 3/04* (2013.01); *G06N 3/049* (2013.01); *G06N 3/0445* (2013.01); *G06N 3/0454* (2013.01); *G06N 3/08* (2013.01); *G06T 3/40* (2013.01); *G06T 3/4007* (2013.01); *G06T 3/4046* (2013.01); *G06T 3/4053* (2013.01); *G06T 5/001* (2013.01); *G06T 5/002* (2013.01); *G06T 7/11* (2017.01); *H04N 7/0117* (2013.01); *H04N 19/117* (2014.11); *H04N 19/142* (2014.11); *H04N 19/154* (2014.11); *H04N 19/172* (2014.11); *H04N 19/177* (2014.11); *H04N 19/31* (2014.11); *H04N 19/33* (2014.11); *H04N 19/46* (2014.11); *H04N 19/59* (2014.11); *H04N 19/80* (2014.11); *H04N 19/86* (2014.11); *G06T 2207/10016* (2013.01); *G06T 2207/20081* (2013.01); *G06T 2207/20084* (2013.01); *H04N 19/176* (2014.11); *H04N 19/87* (2014.11)

(58) Field of Classification Search
CPC ...... H04N 19/59; H04N 19/117; H04N 19/86; H04N 19/142; H04N 19/177; H04N 19/154; H04N 19/176; H04N 19/87; H04N 7/0117; G06N 3/0445; G06N 3/04; G06N 3/049; G06N 3/0454; G06N 3/08; G06T 2207/10016; G06T 2207/20081; G06T 2207/20084; G06T 3/4007; G06T 3/40; G06T 3/4046; G06T 3/4053; G06T 5/001; G06T 5/002; G06T 7/11; G06K 9/46; G06K 9/66; G06K 9/6215
See application file for complete search history.

(56) References Cited

U.S. PATENT DOCUMENTS

| 5,831,678 | A | 11/1998 | Proctor |
|---|---|---|---|
| 6,075,884 | A | 6/2000 | Lubin et al. |
| 6,470,097 | B1 | 10/2002 | Lai et al. |
| 6,735,336 | B2 | 5/2004 | Avni et al. |
| 7,133,568 | B2 | 11/2006 | Nikitin et al. |
| 7,477,800 | B2 | 1/2009 | Avidan et al. |
| 7,623,731 | B2 | 11/2009 | Lim et al. |
| 7,676,441 | B2 | 3/2010 | Matsugu et al. |
| 8,037,010 | B2 * | 10/2011 | Jaros ........................ G06N 3/08 706/62 |
| 8,311,967 | B1 | 11/2012 | Lin et al. |
| 8,331,615 | B2 | 12/2012 | Furukawa et al. |
| 8,467,599 | B2 | 6/2013 | El |
| 8,731,255 | B2 | 5/2014 | El-Baz |
| 9,208,539 | B2 | 12/2015 | Choudhury et al. |
| 9,342,870 | B2 | 5/2016 | Lin et al. |
| 9,824,421 | B2 | 11/2017 | Ragozin et al. |
| 9,904,889 | B2 | 2/2018 | Eliasmith et al. |
| 9,906,787 | B2 * | 2/2018 | Amon ..................... H04N 19/51 |
| 10,019,642 | B1 | 7/2018 | Navarrete Michelini et al. |
| 10,181,092 | B2 | 1/2019 | Shao et al. |
| 2003/0071908 | A1 * | 4/2003 | Sannoh .............. H04N 5/23212 348/345 |
| 2004/0086039 | A1 | 5/2004 | Reynolds et al. |
| 2004/0136567 | A1 | 7/2004 | Billinghurst et al. |
| 2004/0150538 | A1 | 8/2004 | Kim et al. |
| 2004/0218834 | A1 * | 11/2004 | Bishop ................. H04N 19/587 382/299 |
| 2005/0063461 | A1 | 3/2005 | Lee et al. |
| 2005/0200757 | A1 * | 9/2005 | Pica ........................ H04N 19/30 348/390.1 |
| 2007/0172452 | A1 | 7/2007 | Klucher et al. |
| 2007/0223887 | A1 | 9/2007 | Kanamori et al. |
| 2009/0034622 | A1 | 2/2009 | Huchet et al. |
| 2009/0067491 | A1 | 3/2009 | Sun et al. |
| 2009/0110285 | A1 | 4/2009 | Elad et al. |
| 2009/0232213 | A1 | 9/2009 | Jia |
| 2010/0020874 | A1 | 1/2010 | Shin et al. |
| 2010/0150229 | A1 | 6/2010 | Francois et al. |
| 2010/0183217 | A1 * | 7/2010 | Seung ..................... G06K 9/342 382/156 |
| 2011/0299770 | A1 | 12/2011 | Vaddadi et al. |
| 2011/0304687 | A1 | 12/2011 | Joshi et al. |
| 2012/0288015 | A1 | 11/2012 | Zhang et al. |
| 2012/0294369 | A1 | 11/2012 | Bhagavathy et al. |
| 2013/0128111 | A1 | 5/2013 | Corral-Soto |
| 2013/0223734 | A1 | 8/2013 | Tuzel et al. |
| 2014/0177706 | A1 | 6/2014 | Fernandes et al. |
| 2014/0204996 | A1 | 7/2014 | Spears et al. |
| 2014/0301661 | A1 | 10/2014 | Voronov et al. |
| 2014/0369401 | A1 | 12/2014 | Minoo et al. |
| 2015/0015569 | A1 | 1/2015 | Jung et al. |
| 2015/0086109 | A1 | 3/2015 | Paris et al. |
| 2015/0181159 | A1 | 6/2015 | Matsuyama |
| 2016/0078600 | A1 | 3/2016 | Perez Pellitero et al. |
| 2016/0140408 | A1 | 5/2016 | Shen et al. |
| 2017/0132760 | A1 | 5/2017 | Kothule et al. |
| 2017/0193680 | A1 | 7/2017 | Zhang et al. |
| 2017/0345130 | A1 | 11/2017 | Wang et al. |
| 2017/0347060 | A1 | 11/2017 | Wang et al. |
| 2017/0347061 | A1 | 11/2017 | Wang et al. |
| 2017/0347110 | A1 | 11/2017 | Wang et al. |
| 2017/0374374 | A1 | 12/2017 | Wang et al. |
| 2018/0121769 | A1 | 5/2018 | Huszar et al. |
| 2018/0122048 | A1 | 5/2018 | Wang et al. |
| 2018/0129918 | A1 | 5/2018 | Wang et al. |
| 2018/0130177 | A1 | 5/2018 | Wang et al. |
| 2018/0130178 | A1 | 5/2018 | Wang et al. |
| 2018/0130179 | A1 | 5/2018 | Wang et al. |
| 2018/0130180 | A1 | 5/2018 | Wang et al. |

(56) References Cited

U.S. PATENT DOCUMENTS

| | | |
|---|---|---|
| 2018/0131953 A1 | 5/2018 | Wang et al. |
| 2018/0139458 A1 | 5/2018 | Wang et al. |
| 2018/0197089 A1 | 7/2018 | Krasser et al. |
| 2018/0293713 A1 | 10/2018 | Vogels et al. |

FOREIGN PATENT DOCUMENTS

| | | | |
|---|---|---|---|
| EP | 0618737 | A2 | 10/1994 |
| EP | 1720358 | A2 | 11/2006 |
| EP | 2557789 | A2 | 2/2013 |
| EP | 2806374 | A1 | 11/2014 |
| JP | 1021385 | A | 1/1998 |
| KR | 20030009575 | A | 2/2003 |
| WO | 9739417 | A2 | 1/1998 |
| WO | 0033207 | A1 | 6/2000 |
| WO | 02/005208 | A3 | 1/2002 |
| WO | 03094094 | A1 | 11/2003 |
| WO | 2008133951 | A2 | 11/2008 |
| WO | 2013143396 | A1 | 10/2013 |
| WO | 2014052740 | A1 | 4/2014 |
| WO | 2015193531 | A1 | 12/2015 |
| WO | 2016132145 | A1 | 8/2016 |
| WO | 2016132146 | A1 | 8/2016 |
| WO | 2016132147 | A1 | 8/2016 |
| WO | 2016132148 | A1 | 8/2016 |

OTHER PUBLICATIONS

Fei Zuo et al (Content-adaptive Resolution Enhancement of Compressed Video with Encoder-Generated Side Information, IEEE 2008, pp. 1-2) (Year: 2008).*

Yanyun et al (Single Image Super-Resolution via Convolutional Neural Network and Total Variation Regularization, Department of Computer Science, Xiamen University, Xiamen, China, Springer International Publishing Switzerland 2016, pp. 28-38) (Year: 2016).*

Dong et al, (Image Super-Resolution Using Deep Convolutional Networks, IEEE Transactions on pattern analysis and machine intelligence, vol. 38, No. 2, Feb. 2016, pp. 295-307) (Year: 2016).*

Cheng et al, ("Fast Video Super-resolution using Artificial Neural Networks", 2012 IEEE, pp. 1-4), (Year: 2012).*

Cayton, "Algorithms for manifold learning", Jun. 15, 2005, 17 pages.

Chopra, et al., "Learning a similarity metric discriminatively, with application to face verification", In IEEE Conference on Computer Vision and Pattern Recognition (CVPR), 2005, pp. 539-549.

Dong, et al., "Compression Artifacts Reduction by a Deep Convolutional Network", IEEE International Conference on Domputer Vision, Apr. 27, 2015, pp. 576-584.

Dong, et al., "Learning a Deep Convolutional Network for Image Super-Resolution", Lecture Notes in Computer Science, Sep. 6, 2014, pp. 184-199.

Search Report for GB Application No. 1502753.5, dated Jan. 12, 2016, 4 pages.

Search Report for GB Application No. 1503427.5, dated Dec. 17, 2015, 4 pages.

Search Report for GB Application No. 1505544.5, dated Feb. 12, 2016, 9 pages.

Search Report for GB Application No. 1507141.8, dated Dec. 21, 2015, 4 pages.

Search Report for GB Application No. 1508742.2, dated Jan. 25, 2016, 5 pages.

Search Report for GB Application No. 1511231.1, dated Jan. 11, 2016, 5 pages.

Search Report for GB Application No. 1519687.6, dated Apr. 13, 2016, 5 pages.

Examination Report for GB Application No. 1617471.6, dated Nov. 11, 2016, 6 pages.

Examination Report for GB Application No. 1617471.6, dated May 3, 2017, 2 pages.

Examination Report for GB Application No. 1617475.7, dated Nov. 11, 2016, 6 pages.

Examination Report for GB Application No. 1617478.1, dated Nov. 18, 2016, 6 pages.

Examination Report for GB Application No. 1617478.1, dated May 3, 2017, 4 pages.

Examination Report for GB Application No. 1617481.5, dated Nov. 25, 2016, 5 pages.

Examination Report for GB Application No. 1617482.3, dated Nov. 25, 2016, 4 pages.

Kim, et al., "Example-based Learning for Single-Image Super-Resolution and JPEG Artifact Removal", Technical Report No. TR-173, retrieved on Jun. 1, 2016 from http://www.kyb.mpg.de/fileadmin/user_upload/files/publications/attachments/TechReport-173, Aug. 2008, 28 pages.

Liu, et al. "Nonparametric Scene Parsing: Label Transfer via Dense Scene Alignment", IEEE Conference on Computer Vision and Pattern Recognition, Jun. 2009, 8 pages.

Matikainen, et al., "Model Recommendation for Action Recognition", IEEE Conference on Computer Vision and Pattern Recognition, 2012, pp. 2256-2263.

Mittal, et al., "No-Reference Image Quality Assessment in the Spatial Domain", IEEE Transactions on Image Processing, vol. 21, Issue 12, Dec. 2012, pp. 4695-4708.

Pan, et al., "A Survey on Transfer Learning", IEEE Transactions on Knowledge and Data Engineering, vol. 22, No. 10, Oct. 2010, pp. 1345-1359.

International Search Report and Written Opinion for PCT Application No. PCT/GB2016/050423, dated May 11, 2016, 16 pages.

International Search Report and Written Opinion for PCT Application No. PCT/GB2016/050424, dated May 11, 2016, 9 pages.

International Search Report and Written Opinion for PCT Application No. PCT/GB2016/050425, dated May 4, 2016, 18 pages.

International Search Report and Written Opinion for PCT Application No. PCT/GB2016/050426, dated May 13, 2016, 13 pages.

Torralba, et al., "80 million tiny images: a large dataset for non-parametric object and scene recognition", IEEE Transactions on Pattern Analysis and Machine Intelligence, vol. 30, Issue 11, Nov. 2008, pp. 1958-1970.

Wagstaff, et al., "Constrained K-means clustering with background knowledge", Proceedings of the Eighteenth International Conference on Machine Learning, 2001, pp. 577-584.

Yang, et al., "Coupled Dictionary Training for Image Super-Resolution", IEEE Transactions on Image Processing, vol. 21, Issue 8, Aug. 2012, 27 pages.

Yang, Image super-resolution via sparse representation, IEEE Transactions on Image Processing, vol. 19, Issue 11, Nov. 2010, 51 pages.

Zeyde, et al., "On Single Image Scale-Up Using Sparse-Representations", Curves and Surfaces, Springer, 2012, pp. 711-730.

Office Action for European Application No. 16706418.7, dated Jan. 28, 2019, 6 pages.

Office Action for European Application No. 16715067.1, dated Mar. 6, 2019, 9 pages.

Office Action for European Application No. 16706417.9, dated Mar. 6, 2019, 8 pages.

Office Action for European Application No. 16706424.5, dated Mar. 6, 2019, 8 pages.

Wikipedia, "Universal Approximation Theorem", Jun. 10, 2010, XP055562507, Retrieved from http://web.archive.org/web/20100701194338/https://en.wikipedia.org.wiki/Universal_approximation_theorem, 3 pages.

Atreya, et al., "Novel Lossy Compression Algorithms With Stacked Autoencoders", Internet Ditation, Dec. 11, 2019, 5 pages.

Bishop, et al., "Super-Resolution Enhancement of Video", International Workshop on Artificial Intelligence and Statistics, No. 9th, 3 Jan. 3, 2003, pp. 1-8.

Kwon, "Adaptive postprocessing algorithm in block-coded images using block classification and MLP", IEEE Transactions on Fundamentals of Electronics, Communications and Computer Sciences, Engineering Sciences Society, vol. E86-A, No. 4, Apr. 1, 2003, pp. 961-967.

(56) References Cited

OTHER PUBLICATIONS

Nielsen, "A Visual Proof That Neural Nets Can Compute Any Function", Feb. 6, 2015, XP055562061, 32 pages.
Park, et al., "Super-Resolution Image Reconstruction: A Technical Overview", IEEE Signal Processing Magazine, IEEE Service Center, vol. 20, No. 3, May 1, 2003, pp. 21-36.
Yang, et al., "Single-Image Super-Resolution Reconstruction via Learned Geometric Dictionaries and Clustered Sparse Coding", IEE Transactions on Image Processing, vol. 21, No. 9, Sep. 1, 2012, pp. 4016-4028.
"CS231n Convolutional Neural Networks for Visual Recognition", retrieved on Feb. 16, 2015, XP055488606, 2 pages.
International Search Report and Written Opinion for PCT Application No. PCT/GB2016/050427, dated May 4, 2016, 15 pages.
Examination Report for European Application No. 16706417.9, dated Jul. 10, 2018, 10 pages.
Examination Report for European Application No. 16706419.5, dated Jul. 10, 2018, 8 pages.
Examination Report for European Application No. 16706421.1, dated Jul. 10, 2018, 8 pages.
Examination Report for European Application No. 16706422.9, dated Jul. 10, 2018, 9 pages.
Examination Report for European Application No. 16706424.5, dated Jul. 10, 2018, 7 pages.
Examination Report for European Application No. 16715067.1, dated Jul. 18, 2018, 6 pages.
Long, et al., "Fully convolutional networks for semantic segmentation", IEEE Conference on Computer Vision and Pattern Recognition (CVPR), 2015, pp. 3431-3440.
Wang, et al., "Self-Tuned Deep Super Resolution", 2015 IEEE Conference on Computer Vision and Pattern Recognition Workshops, Jun. 7, 2015, XP032795527, 8 pages.
Zuo, et al., "Content-Adaptive Resolution Enhancement of Compressed Video with Encoder-Generated Side Information", International Conference on Consumer Electronics, Jan. 9, 2008, pp. 1-2.
Bevilacqua, et al., "Video Super-Resolution Via Sparse Combinations of Key-Frame Patches in a Compression Context", 30th Picture Coding Symposium (PCS), Dec. 8, 2013, 5 pages.
Cheng, et al., "Fast Video Super-Resolution Using Artificial Neural Networks", 8th IEEE, IET International Symposium on Communication Systems, Networks and Digital Signal Processing, Jul. 18, 2012, 4 pages.
Dong, "Image Super-Resolution Using Deep Convolutional Networks", IEEE Transactions on Pattern Analysis and Machine Intelligence, vol. 38, No. 2, Feb. 1, 2016, 14 pages.
Gendy, et al., "A Fast Algorithm for Image Restoration Using a Recurrent Neural Network with Bound-Constrained Quadratic Optimization", The Seventh Australian and New Zealand Intelligent Information Systems Conference, Nov. 18, 2001, pp. 111-116.
Liang, et al., "Incorporating Image Degeneration Modeling With Multitask Learning for Image Super-Resolution", IEEE International Conference on Image Processing, Sep. 27, 2015, pp. 2110-2114.
Liu, et al., "An Adaptive Image Denoising Model Based on Tikhonov and TV Regularizations", Advances in Multimedia, vol. 2014, Jan. 1, 2014, 11 pages.
Muneyasu, et al., "Image Restoration Using Layered Neural Networks and Hopfield Networks", Proceedings of the International Conference on Image Processing, vol. 2, Oct. 23, 1995, pp. 33-36.
Qu, et al., "Single Image Super-Resolution via Convolutional Neural Network and Total Variation Regularization", MultiMedia Modeling. Lecture Notes in Computer Science, vol. 951, Jan. 1, 2016, pp. 28-38.
Reed, et al., "Generative Adversarial Text To Image Synthesis", Proceedings of the 33rd International Conference on Machine Learning, JMLR: W&CP vol. 48, May 2016, 9 pages.
Rudin, et al., "Non-Linear Total Variation Based Noise Removal Algorithms", Physica D, vol. 60, No. 1-4, Nov. 1, 1992, pp. 259-268.
Sheikh, et al., "An Information Fidelity Criterion for Image Quality Assessment Using Natural Scene Statistics", IEEE Transactions on Image Processing, vol. 14, No. 12, Dec. 1, 2005, pp. 2117-2128.
Shi, et al., "Is the Deconvolution Layer the Same As A Convolutional Layer?", retrieved on Mar. 11, 2019 from https:// arxiv.org/ftp/arxiv/papers/1609/1609.07009.pdf, Sep. 22, 2016, 7 pages.
Sumali, et al., "Single Image Super Resolution by No-Reference Image Quality Index Optimization in PCA Subspace", IEEE 12th International Colloquium on Signal Processing and Its Applications, Mar. 4, 2016, pp. 183-187.
Wang, et al., "Deep Networks for Image Super-Resolution with Sparse Prior", International Conference on Computer Vision (ICCV), Dec. 1, 2015, 9 pages.
Xie, et al., "Image Denoising and Inpainting With Deep Neural Networks", Advances in neural Information processing systems, 2012, 9 pages.
Yu, et al., "VLSI Friendly Fast CU/PU Mode Decision for HEVC Intra Encoding: Leveraging Convolution Neural Network", 2015 IEEE International Conference on Image Processing, Sep. 27, 2015, pp. 1285-1289.

\* cited by examiner

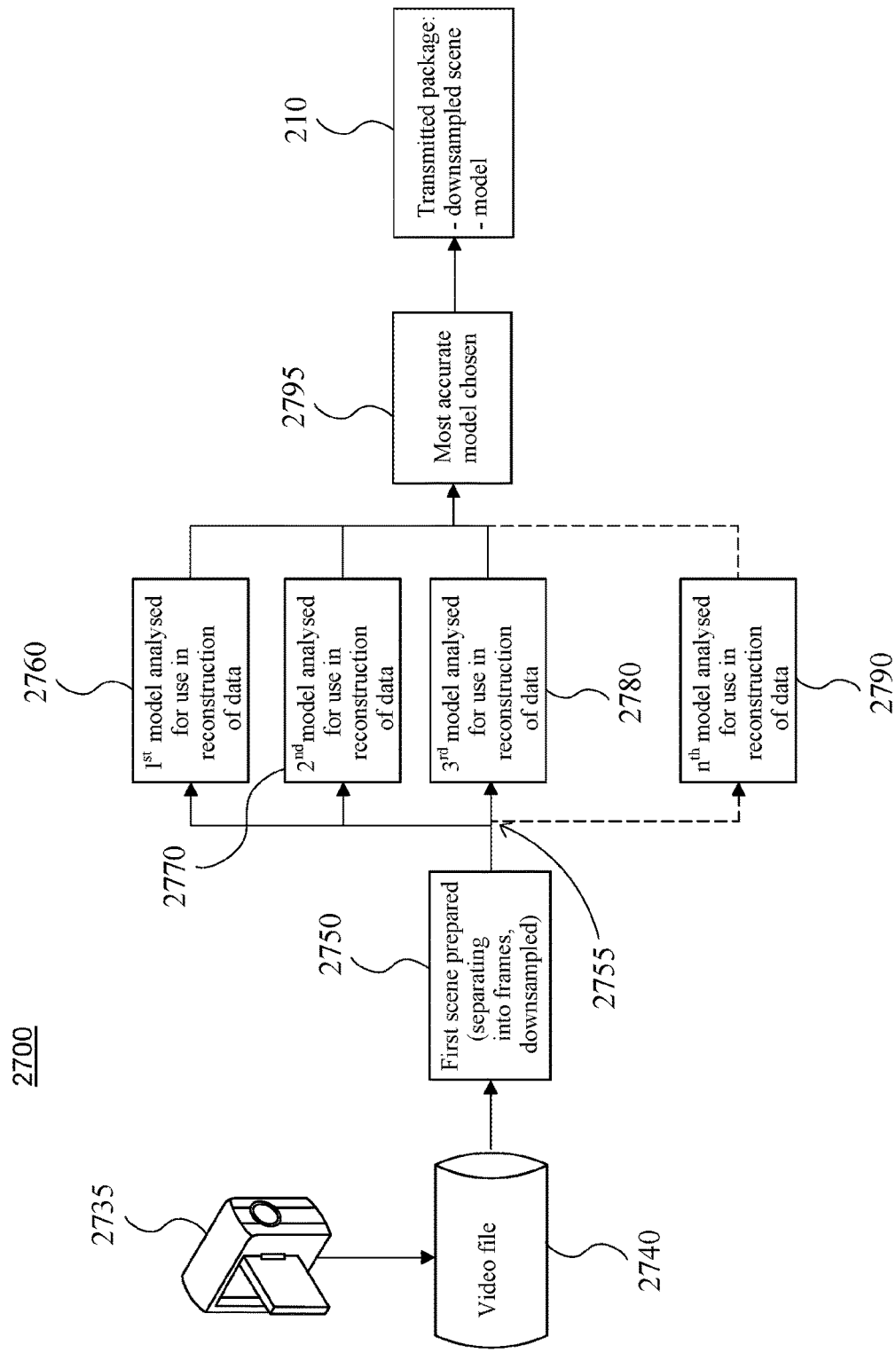

ENHANCING VISUAL DATA USING STRIDED CONVOLUTIONS

CROSS REFERENCE TO RELATED APPLICATIONS

This is a continuation of, and claims priority to, International Patent Application No. PCT/GB2016/050429, filed Feb. 19, 2016, which in turn claims priority to the following United Kingdom applications:
- GB 1519425.1, filed Nov. 3, 2015;
- GB 1519687.6, filed Nov. 6, 2015;
- GB 1502753.5, filed Feb. 19, 2015;
- GB 1508742.2, filed May 21, 2015;
- GB 1511231.1, filed Jun. 25, 2015;
- GB 1507141.8, filed Apr. 27, 2015;
- GB 1503427.5, filed Feb. 27, 2015; and
- GB 1505544.5, filed Mar. 31, 2015, all of which are incorporated herein by reference.

FIELD

Example embodiments relate to enhancing visual data using a hierarchical algorithm. Specifically, the example embodiments relate to enhancing visual data based on a subset of features extracted from the lower quality visual data.

BACKGROUND

Background—Increase in Quality of Video and Display Technology

Developments in display technology have led to significant improvements in the resolution able to be displayed on display hardware, such as on televisions, on computer monitors and using video projectors. For example, television screens that are able to display "High Definition" or "HD" resolution content (typically having a resolution of 1920× 1080 pixels) have been broadly adopted by consumers. More recently, television screens able to display Ultra High Definition or "Ultra HD" resolution content (typically having a resolution over 3840×2160 pixels) are starting to become more widespread.

In contrast, HD resolution video content is only now becoming commonplace and most legacy content is only available at either Digital Versatile Disc Video (or "DVD-Video") resolution (typically having a resolution of 720×586 pixels or 720×480 pixels) or Standard Definition or "SD" resolution (where the video content only has a resolution of 640×480 pixels). Some broadcast channels are limited to SD resolutions. Video-streaming services can be restricted to operating at DVD-Video or SD resolutions, to reduce transmission problems where consumers have limitations on available transmission bandwidth or because of a lack of legacy content at higher resolutions.

As a result, there can be a lack of sufficiently high-resolution video content for display on HD and Ultra HD television screens, for both current video content as well as for legacy video content and video streaming services. Also, over time mobile devices such as mobile 'phones and tablet computers with increasingly larger and higher-resolution screens are being produced and adopted by users. Further, current video content, being output at HD resolutions, is already at a significantly lower resolution than can be displayed by the latest consumer displays operating at, for example, Ultra HD resolutions. To provide sufficiently immersive virtual reality (or "VR") experiences, display technology needs to be sufficiently high resolution even for smaller screen sizes. The user experience of having to display content that has significantly lower resolution than the user's default screen/display resolution is not optimal.

Background—Growth in Data Transmission and Network Limitations

The amount of visual data being communicated over data networks such as the Internet has grown dramatically over time and there is increasing consumer demand for high-resolution, high quality, high fidelity visual data content, such as video streaming including, for example, video at HD and Ultra HD resolution. As a result, there are substantial challenges in meeting this growing consumer demand and high performance video compression is required to enable efficient use of existing network infrastructure and capacity.

Video data already makes up a significant fraction of all data traffic communicated over the Internet, and mobile video (i.e. video transmitted to and from mobile devices over wireless data networks such as UTMS/CDMA) is predicted to increase 13-fold between 2014 and 2019, accounting for 72 percent of total mobile data traffic by the end of that forecast period. As a result, there are substantial challenges in meeting this growing consumer demand and more efficient visual data transmission is required to enable efficient use of existing network infrastructure and capacity.

To stream video to consumers using available streaming data bandwidth, media content providers can down-sample or transcode the video content for transmission over a network at one or a variety of bitrates so that the resolution of the video can be appropriate for the bitrate available over each connection or to each device and correspondingly the amount of data transferred over the network can be better matched to the available reliable data rates. For example, a significant proportion of current consumer Internet connections are not able to reliably support continuous streaming of video at an Ultra HD resolution, so video needs to be streamed at a lower quality or lower resolution to avoid buffering delays.

Further, where a consumer wishes to broadcast or transmit video content, the uplink speeds of consumer Internet connections are typically a fraction of the download speeds and thus only lower quality or lower resolution video can typically be transmitted. In addition, the data transfer speeds of typical consumer wireless networks are another potential bottleneck when streaming video data for video at resolutions higher than HD resolutions or virtual reality data and content to/from contemporary virtual reality devices. A problem with reducing the resolution of a video when transmitting it over a network is that the reduced resolution video may not be at the desired playback resolution, but in some cases there is either not sufficient bandwidth or the bandwidth available is not reliable during peak times for transmission of a video at a high resolution.

Alternatively, even without reducing the original video resolution, the original video may have a lower resolution than desired for playback and so may appear at a suboptimal quality when displayed on higher-resolution screens.

Background—Video Compression Techniques

Existing commonly used video compression techniques, such as H.264 and VP8, as well as proposed techniques, such as H.265, HEVC and VP9, all generally use similar approaches and families of compression techniques. These compression techniques make a trade-off between the quality and the bit-rate of video data streams when providing inter-frame and intra-frame compression, but the amount of compression possible is largely dependent on the image resolution of each frame and the complexity of the image sequences.

To illustrate the relationship between bitrate and resolution among other factors, it is possible to use an empirically-derived formula to show how the bitrate of a video encoded with, for example the H.264 compression technique, relates to the resolution of that video:

$$\text{bitrate} \propto Q \times w \times h \times f \times m$$

where Q is the quality constant, w is the width of a video, h is the height of a video, f is the frame-rate of a video and m is the motion rank, where $m \in \{1, \ldots, 4\}$ and a higher m is used for fast-changing hard-to-predict content.

The above formula illustrates the direct relationship between the bitrate and the quality constant Q. A typical value, for example, that could be selected for Q would be 0.07 based on published empirical data, but a significant amount of research is directed to optimising a value for Q.

The above formula also illustrates the direct relationship between the bitrate and the complexity of the image sequences, i.e. variable m. The aforementioned existing video codecs focus on spatial and temporal compression techniques. The newer proposed video compression techniques, such as H.265, HEVC and VP9, seek to improve upon the motion prediction and intra-frame compression of previous techniques, i.e. optimising a value form.

The above formula further illustrates a direct relationship between the bitrate and the resolution of the video, i.e. variables w and h. In order to reduce the resolution of video, several techniques exist to downscale the resolution of video data to reduce the bitrate.

As a result of the disadvantages of current compression approaches, existing network infrastructure and video streaming mechanisms are becoming increasingly inadequate to deliver large volumes of high quality video content to meet ever-growing consumer demands for this type of content. This can be of particular relevance in certain circumstances, for example in relation to live broadcasts, where bandwidth is often limited, and extensive processing and video compression cannot take place at the location of the live broadcast without a significant delay due to inadequate computing resources being available at the location.

Background—Video Upscaling Techniques

To reproduce a video at a higher resolution than that at which it has been transmitted (e.g. by a streaming service or broadcaster) or provided (e.g. on DVD or via a video download provider), various "upscaling" techniques exist to increase the resolution of video data/signals, which enhance image quality when starting from a lower resolution image or video and which produce an image or video of a higher resolution.

Referring to FIG. 14, a conventional upscaling technique 1400 will now be described.

Received video data 1410 is provided into a decoder system and is, for example, a lower-resolution video encoded in a standard video format, such as an SD resolution video. This video format can be a variety of known video codecs, for example such as H.264 or VP8, but can be any video data that the system is able to decode into component frames of video.

The system then separates a first section of the video data 1410 into single frames at step 1420, i.e. into a sequence of images at the full SD resolution of the video data 1410. For some video codecs, this will involve "uncompressing" or restoring the video data as, for example, common video compression techniques remove redundant (non-changing) features (or subset of features) from sequential frames.

An upscaling technique 1430 is then used on one or more of the frames or sections of frames, to increase the resolution of the areas upon which it is used. The higher resolution frames are then optionally processed at step 1440 into a format suitable for output as a video. The video, being composed of higher resolution frames, will be in the form of a higher resolution video 1450 than the original video file.

For example, a basic upscaling technique that makes little attempt to enhance the quality of the video is known as nearest-neighbour interpolation. This technique simply increases the resolution of received video data by representing an original pixel of the transmitted video as multiple pixels or a "block" of pixels. The resulting effect is that the video appears pixelated and in blocks.

Other less basic upscaling techniques use the existing video data to estimate unknown intermediate pixels between known pixel values in order to increase the resolution with a less noticeable loss in quality, these techniques generally known by the term interpolation, these techniques typically factoring into account a weighted average of known pixels in the vicinity of each unknown intermediate pixel or fit to a curve or line to surrounding values and interpolate to the mid-point along the curve or line (e.g. bicubic or bilinear interpolation). Typically, such upscaling techniques determine values for the additional pixels required to create a higher resolution image by averaging neighbouring pixels, which creates a blurring effect or other visual artefacts such as "ringing" artefacts. Most upscaling techniques use interpolation-based techniques to produce higher-resolution versions of received video data. Various methods of interpolation are possible and well documented in the prior art in relation to video or image enhancement.

Various methods of interpolation are possible and well documented in the prior art in relation to video or image enhancement. There are many problems with conventional upscaling techniques. Upscaling techniques that reduce jagged edges tend to introduce more blur to an up-scaled video, for example, while upscaling techniques that reduce "halos" or "ringing" artefacts tend to make an up-scaled video less sharp. Further, conventional upscaling techniques are not content-aware or adaptive. Fundamentally, conventional upscaling techniques are limited by the Nyquist-Shannon sampling theorem.

As a result of the disadvantages of current upscaling techniques, the quality of video data that has been "upscaled" to a higher resolution than that at which it is stored or transmitted can be inadequate or non-optimal for its intended function.

Background—Super Resolution Techniques for Enhancing Images

Super resolution techniques are techniques that can be described as recovering new high-resolution information that is not explicitly present in low-resolution images.

Super resolution techniques have been developed for many different applications, such as for satellite and for aerial imaging and medical image analysis for example. These applications start with low-resolution images where the higher-resolution image is not available or is possibly unknowable, and by using super resolution techniques it is possible to make substantial enhancements to the resolution of such low-resolution images.

Super resolution techniques allow for the creation of one or more high-resolution images, typically from one or more low-resolution images. Typically, super resolution is applied to a set or series of low-resolution images of the same scene and the technique attempts to reconstruct a higher-resolution image of the same scene from these images.

Super resolution techniques fall predominantly into one of two main fields; optical super resolution techniques and geometrical super resolution techniques. Optical super resolution techniques allow an image to exceed the diffraction limit originally placed on it, while geometrical super resolution techniques increase the resolution from digital imaging sensors. In the field of image resolution enhancement, geometrical super resolution seems to be the predominant technique.

Further, super resolution approaches are usually split into learning—or example—based approaches and interpolation-based (multi-frame) approaches. Example based super resolution techniques are generally accepted to be a superior technique to enhance image quality.

One specific super resolution technique is termed multi-exposure image noise reduction. This technique takes the average of many exposures in order to remove unwanted noise from an image and increase the resolution.

Another super resolution technique employed is sub-pixel image localisation, which involves calculating the 'centre of gravity' of the distribution of light over several adjacent pixels and correcting blurring accordingly. However, this technique relies on the assumption that all light in the image came from the same source, which is not always a correct assumption.

Background—Machine Learning Techniques

Machine learning is the field of study where a computer or computers learn to perform classes of tasks using the feedback generated from the experience or data gathered that the machine learning process acquires during computer performance of those tasks.

Typically, machine learning can be broadly classed as supervised and unsupervised approaches, although there are particular approaches such as reinforcement learning and semi-supervised learning which have special rules, techniques and/or approaches.

Supervised machine learning is concerned with a computer learning one or more rules or functions to map between example inputs and desired outputs as predetermined by an operator or programmer, usually where a data set containing the inputs is labelled.

Unsupervised learning is concerned with determining a structure for input data, for example when performing pattern recognition, and typically uses unlabelled data sets.

Reinforcement learning is concerned with enabling a computer or computers to interact with a dynamic environment, for example when playing a game or driving a vehicle.

Various hybrids of these categories are possible, such as "semi-supervised" machine learning where a training data set has only been partially labelled.

For unsupervised machine learning, there is a range of possible applications such as, for example, the application of computer vision techniques to image processing or video enhancement.

Unsupervised machine learning is typically applied to solve problems where an unknown data structure might be present in the data. As the data is unlabelled, the machine learning process is required to operate to identify implicit relationships between the data for example by deriving a clustering metric based on internally derived information. For example, an unsupervised learning technique can be used to reduce the dimensionality of a data set and attempt to identify and model relationships between clusters in the data set, and can for example generate measures of cluster membership or identify hubs or nodes in or between clusters (for example using a technique referred to as weighted correlation network analysis, which can be applied to high-dimensional data sets, or using k-means clustering to cluster data by a measure of the Euclidean distance between each datum).

Semi-supervised learning is typically applied to solve problems where there is a partially labelled data set, for example where only a subset of the data is labelled. Semi-supervised machine learning makes use of externally provided labels and objective functions as well as any implicit data relationships.

When initially configuring a machine learning system, particularly when using a supervised machine learning approach, the machine learning algorithm can be provided with some training data or a set of training examples, in which each example is typically a pair of an input signal/vector and a desired output value, label (or classification) or signal. The machine learning algorithm analyses the training data and produces a generalised function that can be used with unseen data sets to produce desired output values or signals for the unseen input vectors/signals. The user needs to decide what type of data is to be used as the training data, and to prepare a representative real-world set of data. The user must however take care to ensure that the training data contains enough information to accurately predict desired output values without providing too many features (which can result in too many dimensions being considered by the machine learning process during training, and could also mean that the machine learning process does not converge to good solutions for all or specific examples). The user must also determine the desired structure of the learned or generalised function, for example whether to use support vector machines or decision trees.

The use of unsupervised or semi-supervised machine learning approaches are sometimes used when labelled data is not readily available, or where the system generates new labelled data from unknown data given some initial seed labels.

Current training approaches for most machine learning algorithms can take significant periods of time, which delays the utility of machine learning approaches and also prevents the use of machine learning techniques in a wider field of potential application.

Background—Machine Learning & Image Super Resolution

To improve the effectiveness of some super resolution techniques, it is possible to incorporate machine learning, otherwise termed a "learned approach", into the image super resolution techniques described above.

For example, one machine learning approach that can be used for image enhancement, using dictionary representations for images, is a technique generally referred to as dictionary learning. This approach has shown effectiveness in low-level vision tasks like image restoration.

When using dictionary learning, the representation of a signal is given as a linear combination of functions drawn from a collection of atoms referred to as a dictionary. For example, a given signal y can be represented as:

$$y=\alpha_1 x_1+\alpha_2 x_2+ \ldots +\alpha_n x_n$$

where $x_1, \ldots, x_n$ are the atoms of a dictionary of size n and $\alpha_1, \ldots \alpha_n$ are coefficients such that $\|\alpha\|_0 < \lambda m$ where $\lambda$ is the sparsity constraint, for example where $\lambda=3$ no more than three coefficients can be non-zero. The atoms have the same dimensionality as the signal y so, while it is possible to have an atom $x_i$ that is identical to y, a dictionary of simple atoms can usually be used to reconstruct a wide range of different signals.

In theory, at least k orthogonal atoms are required to fully reconstruct signals in k-dimensional space. In practice, however, improved results are achieved through using an over-complete dictionary where there are n>k atoms and these atoms do not have to be orthogonal to one another.

A complete dictionary means that the number of dictionary atoms is the same as the dimensionality of the image patches and that the dictionary atoms are linearly independent (i.e. all orthogonal to each other and can represent the entire, or complete, dimensional space), so where 16×16 atoms represent 16×16 image patches, the dictionary is complete if it has 16×16=256 atoms. If more atoms than this are present in the dictionary, then the dictionary becomes over-complete.

An example of an over-complete dictionary is shown in FIG. 1, where a 16×16 pixel patch is represented by a linear combination of 16×16 dictionary atoms 5 that is drawn from the collection of atoms that is the dictionary 1. It is noted that the atoms are not selected locally within the dictionary, but instead are chosen as the linear combination that best approximates the signal patch for a maximum number of atoms allowed and irrespective of their location within the dictionary. Without a constraint that the atoms must be orthogonal to one another, larger dictionaries than the signal space that the dictionary is intended to represent are created.

Over-complete dictionaries are used because they provide better reconstructions, but at the cost of needing to store and transmit all of the new dictionaries and representations created during the dictionary learning process. In comparison with a predetermined library of representations, a significantly increased amount of data is created as a result of dictionary learning because it generates a data set significantly larger than the basis set in a predetermined library of representations and the atoms are not all orthogonal to one another.

In dictionary learning, where sufficient representations are not available in an existing library of representations (or there is no library available), machine learning techniques are employed to tailor dictionary atoms such that they can adapt to the image features (or subset of features) and obtain more accurate representations. Each new representation is then transferred along with the video data to enable the representation to be used when recreating the video for viewing.

The transform domain can be a dictionary of image atoms, which can be learnt through a training process known as dictionary learning that tries to discover the correspondence between low-resolution and high-resolution sections of images (or "patches"). Dictionary learning uses a set of linear representations to represent an image and, where an over-complete dictionary is used, a plurality of linear representations can be used to represent each image patch to increase the accuracy of the representation.

When using dictionary learning based super resolution techniques, there is a need for two dictionaries: one for the low-resolution image and a separate dictionary for the high-resolution image. To combine super resolution techniques with dictionary learning, reconstruction models are created to enhance the image based on mapping the coefficients of the low-resolution dictionary to coefficients in the high-resolution dictionary. Various papers describe this, including "On Single Image Scale-Up Using Sparse-Representations" by R. Zeyde et al and published in 2010, "Image super-resolution via sparse representation" by J. Yang and published in 2010, and "Coupled Dictionary Training for Image Super-Resolution" by J. Yang et al and published in 2012, which are incorporated by reference.

A disadvantage of using dictionary learning based super resolution techniques on low-resolution images to attempt to recreate the high-resolution image is the need for two dictionaries, one for the low-resolution image and a separate dictionary for the high-resolution image. It is possible to have a single combined dictionary, but in essence there is always in practice an explicit modelling for each resolution to enable representations to be matched between the two resolutions of image.

A further disadvantage of using dictionary learning, however, especially when used with an over-complete dictionary, is the amount of data that needs to be transferred along with the low-resolution image in order to recreate a high-resolution image from the low-resolution image.

Another disadvantage of dictionary learning approaches is that these tend to use a local patch averaging approach in the final step of reconstruction of a higher-resolution image from a lower-resolution image, which can result in unintentional smoothing in the reconstructed image.

Another further disadvantage of dictionary learning approaches is that it is very slow and can have high memory requirements, depending on the size of the dictionary.

Background—Artefact Removal in Visual Data

Visual data artefacts and/or noise can often be introduced into visual data during processing, particularly during processing to compress visual data or during transmission of the visual data across a network. Such introduced artefacts can include blurring, pixelation, blocking, ringing, aliasing, missing data, and other marks, blemishes, defects, and abnormalities in the visual data. These artefacts in visual data can degrade the user experience when viewing the visual data. Furthermore, these artefacts in visual data can also reduce the effectiveness of visual data processing techniques, such as image super resolution, as well as other visual tasks such as image classification and segmentation, that use processed images as an input.

Lossy compression, in which a visual data is encoded using inexact approximations, is a particularly common source of artefacts. Lossy compression is often required to reduce the size of a digital image or video in order to transmit it across a network without using an excessive amount of bandwidth. High visual data compression ratios can be achieved using lossy compression, but at the cost of a reduction in quality of the original visual data and the introduction of artefacts.

The transmission of visual data across a network can itself introduce artefacts to the visual data through transmission errors between nodes in the network.

Current methods of removing artefacts (herein referred to as visual data fidelity correction) generally only correct a specific types of artefact. Examples of such techniques include deblocking oriented methods, such as Pointwise Shape-Adaptive Discrete Cosine Transform (hereafter referred to as Pointwise SA-DCT), which deal with blocking artefacts. Such techniques do not perform well, and can also introduce further artefacts as a side effect, such as the over smoothing of visual data.

BRIEF DESCRIPTION OF DRAWINGS

Embodiments will now be described, by way of example only and with reference to the accompanying drawings having like-reference numerals, in which:

FIG. 27 illustrates the method steps of the encoding process to generate for transmission, from original visual data being recorded through to the transmitted package of a lower-resolution scene along with a hierarchical algorithm.

SPECIFIC DESCRIPTION

Various embodiments will now be described in detail with reference to the Figures referenced above.

Reduction of Complexity in Neural Networks

Figure 1:
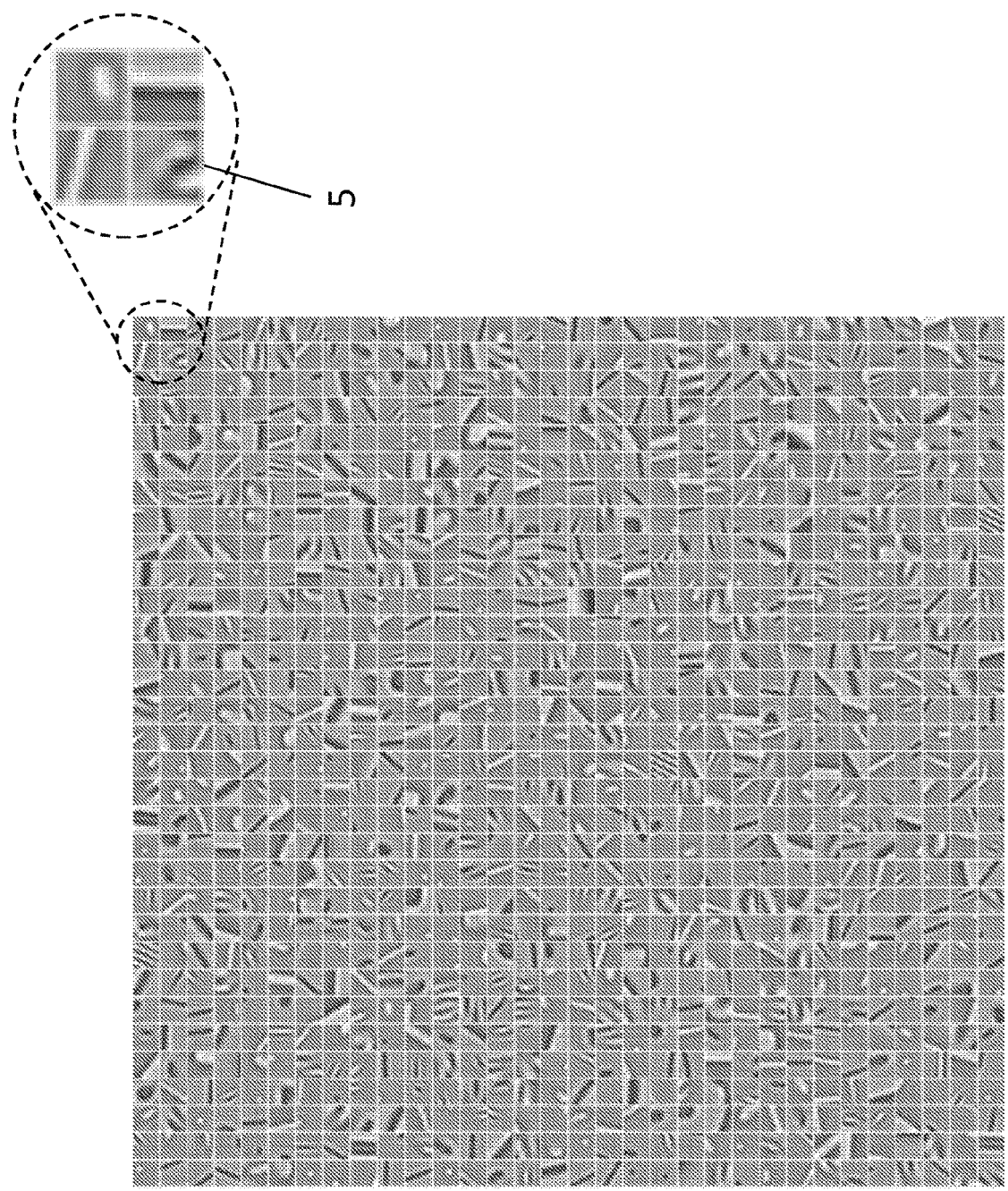
FIG. 1 illustrates an over-complete dictionary of 16×16 atoms.
Figure 2B:
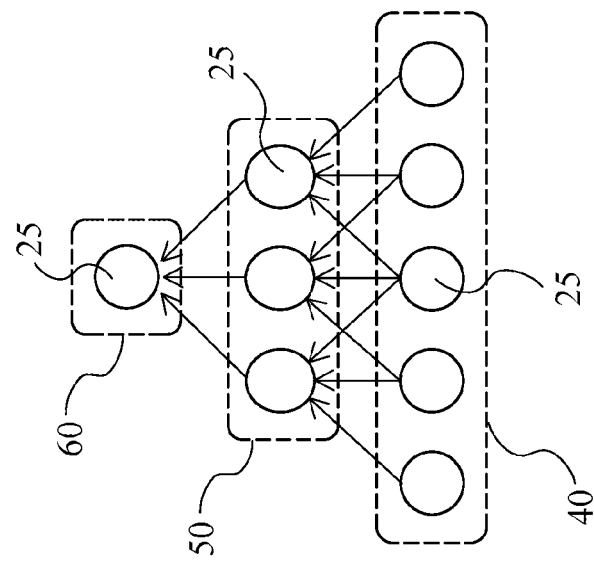
FIG. 2b illustrates the layers in a convolutional neural network with sparsity constraints.
Figure 2A:
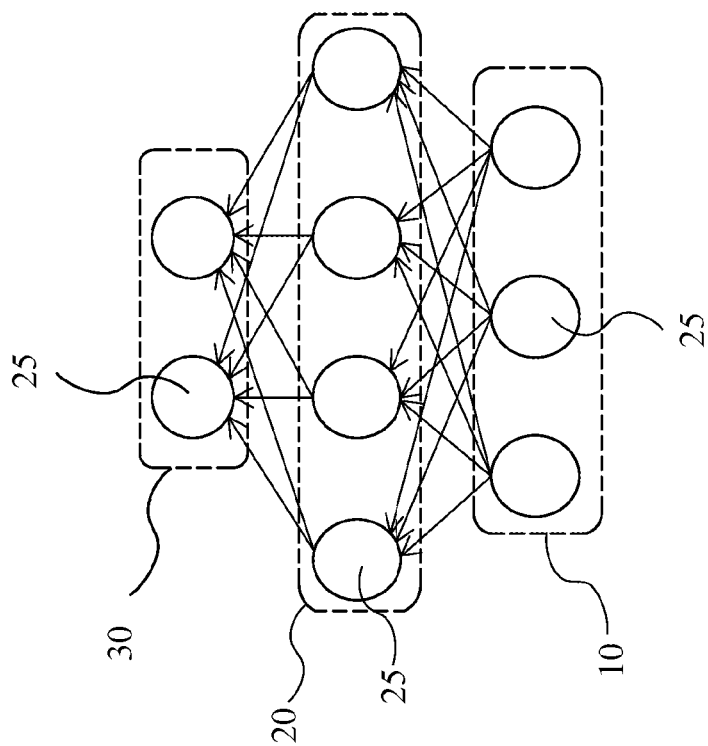
FIG. 2a illustrates the layers in a convolutional neural network with no sparsity constraints.

With reference to FIGS. 2a and 2b, various possible configurations of neural network for use in at least some embodiments shall now be described in detail.

An example layered neural network is shown in FIG. 2a having three layers (or hierarchical layers) 10, 20, 30, each layer 10, 20, 30 formed of a plurality of neurons 25, but where no sparsity constraints have been applied so all neurons 25 in each layer 10, 20, 30 are networked to all neurons 25 in any neighbouring layers 10, 20, 30. The example simple neural network shown in FIG. 2a is not computationally complex due to the small number of neurons 25 and layers. Due to the density of connections, however, the arrangement of the neural network shown in FIG. 2a won't scale up to larger sizes of network, i.e. the connections between neurons/layers, easily as the computational complexity soon becomes too great as the size of the network scales and scales in a non-linear fashion.

Where neural networks need to be scaled up to work on inputs with a high number of dimensions, it can therefore become too computationally complex for all neurons 25 in each layer 10, 20, 30 to be networked to all neurons 25 in the one or more neighbouring layers 10, 20, 30. A predetermined initial sparsity condition is used to lower the computational complexity of the neural network, for example when the neural network is functioning as an optimisation process, by limiting the number of connection between neurons and/or layers thus enabling a neural network approach to work with high dimensional data such as images.

An example of a neural network is shown in FIG. 2b with sparsity constraints, according to at least one embodiment. The neural network shown in FIG. 2b is arranged so that each neuron 25 is connected only to a small number of neurons 25 in the neighbouring layers 40, 50, 60 thus creating a neural network that is not fully connected and which can scale to function with, higher dimensional data—for example as an optimisation process for video. The smaller number of connections in comparison with a fully networked neural network allows for the number of connections between neurons to scale in a substantially linear fashion.

Alternatively, in some embodiments neural networks can be use that are fully connected or not fully connected but in different specific configurations to that described in relation to FIG. 2b.

Further, in some embodiments, convolutional neural networks are used, which are neural networks that are not fully connected and therefore have less complexity than fully connected neural networks. Convolutional neural networks can also make use of pooling or max-pooling to reduce the dimensionality (and hence complexity) of the data that flows through the neural network and thus this can reduce the level of computation required. In some embodiments, various approaches to reduce the computational complexity of convolutional neural networks can be used such as the winograd algorithm or low-rank matrix approximations.

End-to-End Super Resolution Enhancement Model Generation & Reconstruction

Although initially designed to enhance single image frames, super resolution techniques can also be used on multiple frames in some embodiments. To apply these techniques in such embodiments, multiple low-resolution frames can be gathered together and the sub-pixel shifts between the individual frames can be used to create a higher resolution image than the original. In such embodiments, a series of frames can be combined to form a higher resolution video than was originally provided.

To improve on the above described dictionary-based approach for encoding and decoding video using super resolution techniques, in at least some embodiments it is proposed to use deep learning techniques and convolutional neural network models instead of dictionary learning techniques and dictionary-based models.

Dictionary learning is closely related to sparse coding techniques, while deep learning is only more loosely connected with sparse coding. Sparse coding is an effective mechanism that assumes any natural image can be sparsely represented in a transform domain. Sparse coding is a technique used to automatically find a small number of representative patterns which, when combined in the right proportions, reproduce the original input patterns. The sparse coding for an input then consists of those representative patterns. From a signal processing perspective, it follows that complicated signals can be broken down into a small, i.e. sparse, number of simple signals.

The transform domain can be a dictionary of image atoms, which can be learnt through a training process known as dictionary learning that tries to discover the correspondence between low-resolution and high-resolution sections of images (or "patches"). Dictionary learning uses a set of linear representations to represent an image and where an over-complete dictionary is used, a plurality of linear representations can be used to represent each image patch to increase the accuracy of the representation.

In at least some embodiments, instead it is proposed to use machine learning with deep learning techniques that can instead create non-linear representations of an image or sequence of images.

When using machine learning and sparse coding principles, a training process is used to find optimal representations that can best represent a given signal, subject to predetermined initial conditions such as a level of sparsity.

When using convolutional neural networks in at least some embodiments, the efficiency in terms of computational and memory cost can be important.

In some embodiments, convolutional neural network models (or hierarchical algorithms) can be transmitted along with the low-resolution frames of video data because the convolutional neural network models reduce the data transmitted in comparison with learned dictionaries being transmitting along with the low-resolution images, especially in comparison to transmitting learned over-complete dictionaries with the low-resolution images, in the case where the models and dictionaries have the same level of reconstruction accuracy.

The convolutional neural network models of some embodiments allow the reconstruction process and image representation to be non-linear. This is in contrast to the dictionary-based approach, which represents images in a linear fashion, as described above. The convolutional neural network models of some embodiments offer reconstruction with a feed-forward mechanism based on image convolution that is able to be computed in parallel and for which methods with high computational speed are available, such as the AMD® Tiled Convolution approach which can be used for fast image filtering.

The series of convolutions in a convolutional neural network model of some embodiments allow the neural network to be used to search for pixel correlations in a region far larger than the initial patch decomposition, but applying a weighting to weaken the importance of correlations for locations further away from the pixel of interest. In contrast, linear sparse coding approaches like dictionary learning are restricted to looking for correlations in an initial patch size, to avoid the computational complexity of searching the entire image. As a result, the method of these embodiments can more fully exploit the natural or non-local redundancies of the video frames and between a sequence of video frames.

In some embodiments, optionally the convolutional neural network models only assume local spatial or spatio-temporal correlations in an image or video. This assumption is in contrast to the assumption that small data patches must be well represented by a restricted number of atoms from a dictionary, which is a sparsity constraint applied to dictionary learning and over-complete dictionary approaches.

In some embodiments, recurrent neural network models can be used. Recurrent neural network models have single layers that are used iteratively. The layers of a recurrent neural network model can be unrolled into a number of layers in order to be treated in a similar fashion to convolutional neural networks, in some embodiments.

Figure 3:
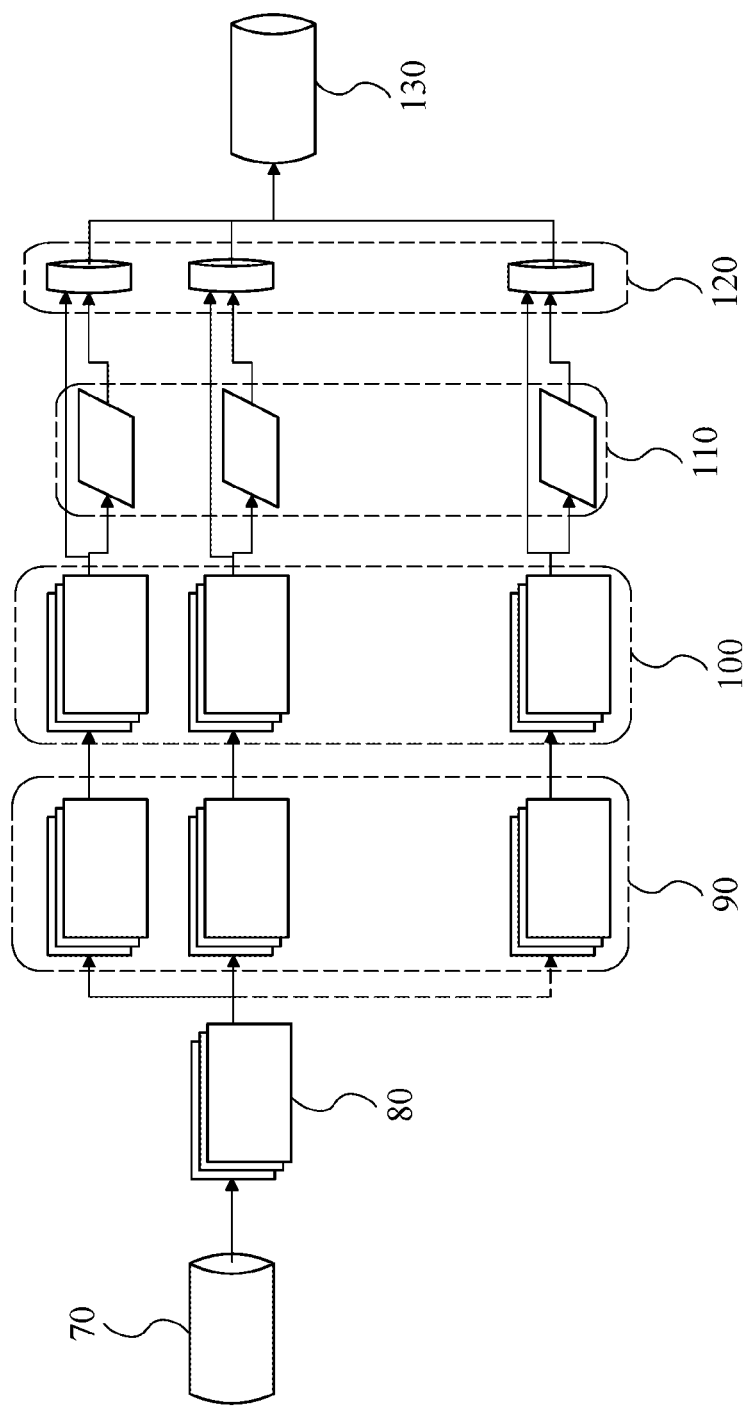
FIG. 3 illustrates the encoding process to generate for transmission, from high-resolution visual data, a combination of low-resolution visual data and convolution neural network able to use super resolution to increase the resolution of the low-resolution data.
Figure 5:
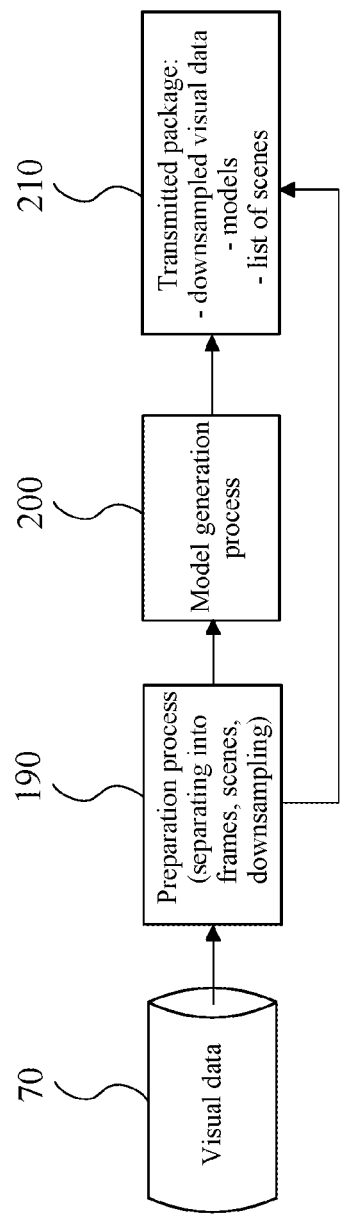
FIG. 5 is a flowchart illustrating the method steps for encoding a visual data for transmission using the process of FIG. 3.

Referring now to FIGS. 3 and 5, a technique that can be used in method, apparatus and/or system embodiments to encode video data will now be described in detail.

Original video data 70 is a high-resolution video, for example having a resolution of 1920 pixels by 1080 pixels (also known as "1080p" video) or 3840 pixels by 2160 pixels (also known as "4K" video). This video data can be encoded in a variety of known video codecs, such as H.264 or VP8, but can be any video data that can be decoded into the component frames of the video. The original video data 70 is provided as input visual data for encoding using the technique.

The original video data 70 is then split into single full-resolution frames at step 80 (or step 190), i.e. into a sequence of images at the full resolution and/or quality of the original video data 70. For some video codecs, this will involve "uncompressing" or restoring the video data as, for example, common video compression techniques remove redundant (non-changing) features (or subset of features) from sequential frames.

Optionally, at step 90 (or step 190), in some embodiments the full-resolution frames can be grouped into scenes or sections of frames having common features (or subset of features), otherwise known as "scene selection". The video data is split or clustered into scenes to enable more specific training and optimisation. By scene, it is meant a consecutive group or sequence of frames, which at the coarsest level can be the entire video, a single frame or at the most granular level can be or a section/segment of a frame.

The exact approach employed for splitting frames into scenes can be performed in many ways, depending on embodiment, with the four main approaches being described below:

A first approach is the use of the frame-type groupings of the underlying video codec. In this approach, a scene is defined in the encoded video by each group of pictures (sometimes referred to by the abbreviation "GoP"), for example between two I-frames. This is probably the simplest approach for scene selection and does not require much additional computation to perform scene analysis of the video, but the approach does not allow any flexibility in the level of granularity in the definition of each scene.

The second approach is the use of a scene or shot transition detector, for example as described in the paper "A Unified Model for Techniques on Video-Shot Transition Detection" by Jesús Bescós, Guillermo Cisneros, José M. Martinez, Jose M. Menéndez, and Julián Cabrera as published in IEEE TRANSACTIONS ON MULTIMEDIA, VOL. 7, NO. 2, APRIL 2005 on pages 293-307 which is incorporated herein by reference. This approach proposes a unified detection model to detect camera-shot transitions in video, detecting both abrupt and gradual camera-shot transitions.

The third approach is the use of a clustering approach after applying an unsupervised learning or dimensionality reduction approach such as K-means clustering or manifold learning or Principle Component Analysis (PCA) etc. A suitable K-means clustering approach is detailed in the paper "Constrained K-means Clustering with Background Knowledge" by Kiri Wagstaff, Claire Cardie, Seth Rogers and Stefan Schroedl as published in the Proceedings of the Eighteenth International Conference on Machine Learning, 2001, p. 577-584. A suitable manifold learning approach is proposed in the paper "Algorithms for manifold learning" by Lawrence Cayton published on Jun. 15, 2005. Both of these papers are herein incorporated by reference.

The fourth approach is to use a range of predefined scene classes and then automatically classifying scenes using the predefined classes. Examples of this approach can be found in the paper "Nonparametric Scene Parsing: Label Transfer via Dense Scene Alignment" by Ce Liu, Jenny Yuen and Antonio Torralba having IEEE reference 978-1-4244-3991-1/09 and the paper "80 million tiny images: a large dataset for non-parametric object and scene recognition" by Antonio Torralba, Rob Fergus and William T. Freeman. Both of these papers are herein incorporated by reference.

The exact approach for how a scene is defined is independent from the rest of the approach, and will vary by embodiment, although it will have an impact on the training time and the reconstruction performance so there is a level of optimisation required for each possible embodiment to find a balance between the speed and the accuracy of the scene detection step.

Alternatively, no scene matching needs to be performed at step 90 (or step 190) in some embodiments. A further alternative for some embodiments is to perform only very basic time-stamping of the video, to determine how to reassemble the video frames for later stages in the technique, for example during transmission or during playback of the video.

Regardless whether the video has been broken into frames or scenes (i.e. groups of multiple frames) in step 90 (or step 190) or remains as a sequence of frames from step 80 (or step 190), each frame is down-sampled into lower resolution frames at a suitably lower resolution. Optionally, in some embodiments this step can occur before the frames are grouped into scenes in step 80 (or step 190), so step 90 (or step 190) can be exchanged with step 90 (or step 190) in these alternative embodiments. The lower-resolution frame can, for example, be 33% to 50% of the data size relative to the data size of the original-resolution frame, but in should be appreciated that in embodiments the lower resolution can be any resolution that is lower than the original resolution of the video.

In step 110 (or step 200), in at least one embodiment super resolution techniques are employed to create a specific model using machine learning for each frame, so that the model can be used to substantially recreate the original resolution version of a lower-resolution frame and trained using machine learning based on knowledge of the original-resolution frame. This step is termed the training and optimisation process. In some embodiments, generic models can be developed for types of scene or frame. Alternatively, in other embodiments, models can be developed for each scene.

By employing a deep learning approach to generating the model in embodiments, a non-linear hierarchical model can be created in some of these embodiments to reconstruct a higher-resolution frame from the lower-resolution frame.

An example of a deep learning approach, but in respect of only still images and without use of the original image to optimise the reconstruction model, is described in the paper "Learning a Deep Convolutional Network for Image Super-Resolution" by Chao Dong, Chen Change Loy, Kaiming He, and Xiaoou Tang published in D. Fleet et al. (Eds.): ECCV 2014, Part IV, LNCS 8692, pp. 184-199, 2014 and this paper is incorporated herein by reference. This paper relates to using super resolution techniques when trying to obtain an unknown high resolution version of a given low resolution image and proposes the use of a convolutional neural network to learn mappings between low resolution and high resolution images.

While the creation of non-linear hierarchical models is more computationally complex than creating linear models using dictionary learning approaches, in at least some embodiments it can be more flexible. Further, the non-linear models created in some of these embodiments can use only a few coefficients to enable reconstruction in comparison to the dictionary-based approach, thus such models can require less data to be transmitted. Still further, the non-linear models used in some embodiments can be more accurate in reconstructing higher-resolution frames than dictionary-based approaches. The non-linear models created in some embodiments are small convolutional neural networks rather than over-complete dictionaries. In contrast to the local patch averaging approach that tends to be used in reconstruction by dictionary learning approaches, the use of a convolutional neural network model in embodiments also allows a more appropriate filter to be learned for final reconstruction where neighbouring patches are considered, which can avoid unintended smoothing of the reconstructed higher-resolution image.

The training and optimisation process in embodiments can be configured according to a desired trade-off between computational time spent and desired quality of results. In general, the number of iterations used during the training process yields approximately logarithmic gains in reconstruction accuracy, so in some embodiments it is preferred to use an automatic threshold to stop further optimisation. When favouring quality of results in embodiments, the automatic threshold can be set to a predetermined value of reconstruction error, for example by calculating the mean squared error, but other methods can be used. Alternatively, in some embodiments the automatic threshold can be set to limit the training and optimisation process to a predetermined number of iterations. As a further alternative, in some embodiments a combination of these two factors can be used.

In some embodiments, step 120 (or step 210), the portion of the low-resolution video and the reconstruction model for that portion of video are output for transmission. Optionally, in some embodiments the video and model can be stored together within a suitable data container format such as a Matroska Multimedia Container (otherwise known as a MKV container). Alternatively, in some embodiments the video and model can be combined with other sections or the entire video and placed into a suitable data container format. In some embodiments, at step 120 (or step 210), the low-resolution video frames can be re-encoded using either the original video codec applied to the original video data 70 or, alternatively, a more optimal video codec can be applied to the video data to produce output video data 130. Optionally, if scene detection or time stamping was performed, in some embodiments the data output for transmission can include either a list of scenes or time stamp data respectively, or this data could be stored within the data container.

In embodiments there can be a number of variations to the encoding framework described above. For the above described technique, it can be assumed in many embodiments that there would be a one-to-one mapping between scene and model, however this does not need to hold true as a local cluster of scenes could be used to train each model in some embodiments. Conversely, it could also be possible in some embodiments to use several similar models to initialise (by way of a weighted average) initial parameters for training new unseen scenes. It may also be sufficient to simply weight the models without requiring any further optimisation in some embodiments—similar to label fusion methods used in medical imaging for example.

Figure 4:
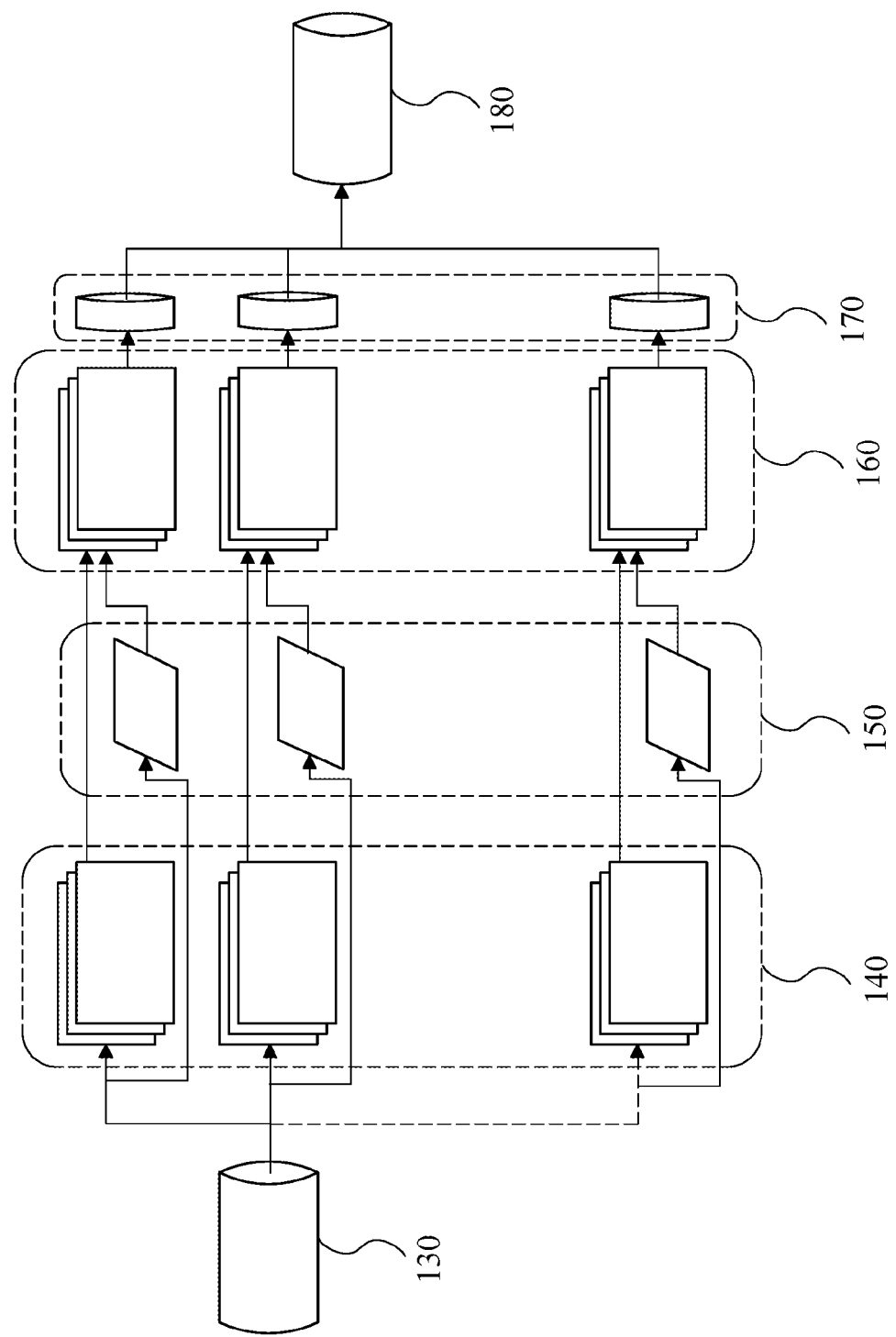
FIG. 4 illustrates the decoding process using the low-resolution visual data and convolution neural network to recreate a version of the high-resolution visual data.
Figure 6:
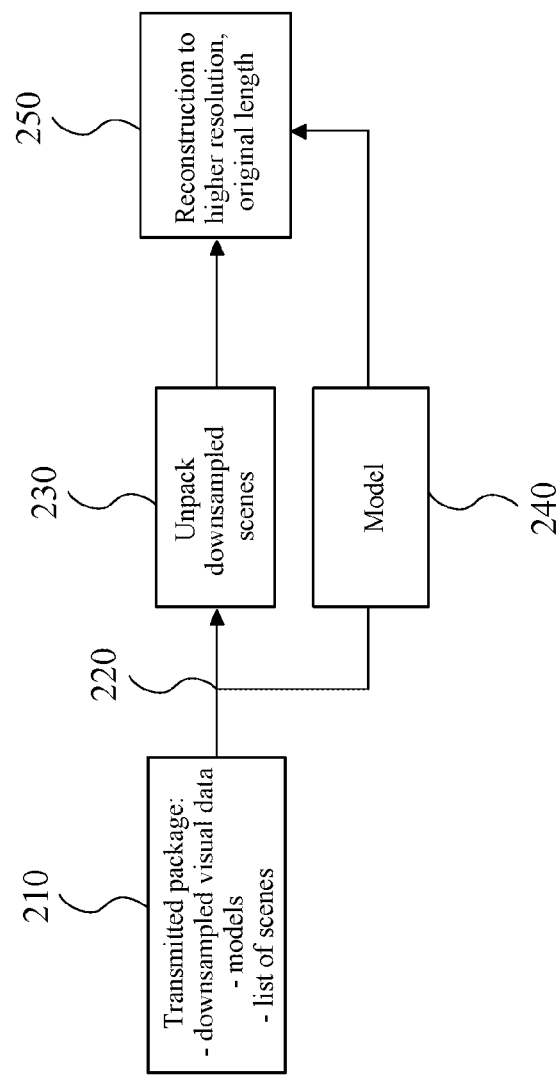
FIG. 6 is a flowchart illustrating the method steps for decoding the visual data and convolution neural network data generated using the method shown in FIG. 5.

Referring now to FIGS. 4 and 6, embodiments for reconstructing the video encoded using the technique will now be described in detail.

First, the data 130 is received from the network. In embodiments, the data received 130 depends on how the data was prepared for transmission in step 120 (or 210) as detailed above in the various possible embodiments and the prepared data can include the video data and one or more reconstruction models for that video data. In some embodiments, it is possible that the video data and one or more reconstruction models are not transmitted and/or received simultaneously so some buffering may be required to wait for all of the components required to decode or reconstruct the higher-resolution video from the data transmitted over the network.

At steps 140 and 150 (and step 220), the received data is prepared for reconstruction depending on the embodiment. In most embodiments, this step involves separating the low-resolution video from the reconstruction models (step 220). Optionally, in some embodiments the low-resolution video is decompressed using the video codec used for transmission into full-resolution image frames (step 230) and each of the frames is matched up with the corresponding reconstruction model, which are also unpacked into frame-by-frame order (step 240).

At step 160 (step 250), the reconstruction model is applied to each of the frames to output higher-resolution frames depending on the embodiment. The reconstruction, or decoding, process in most embodiments involves applying the optimised super resolution convolutional neural network model, or reconstruction model, for each scene in order to restore the lower-resolution video to its original resolution having substantially the same quality as the original high-resolution video. Given the corresponding models for each lower-resolution frame, the original higher-resolution frames can be reconstructed with high accuracy for at least some of these embodiments.

The complexity of the reconstruction process can be far simpler, i.e. require less computation, when compared to that of training the model in most embodiments. In most embodiments, the reconstruction process is very similar to a single iteration of the training process, however there is no optimisation required and the process simply applies the learnt convolutional neural network model to reconstruct the image on a patch-by-patch basis. In some embodiments, a singular model is applied to each scene and can be sent as accompanying data in the video container ahead of the scene in which it is used. In some embodiments, the model associated with each scene can either be indexed in a data stream, synchronised with the video and audio stream, or indexed in a frame-to-model look-up table which can be sent ahead of the video stream depending on the embodiment.

The image reconstruction in most embodiments has a linear computational complexity, dependent on the total number of pixels of each frame, as the reconstruction process requires a series of convolution functions (typically less than 3) to be applied for each relevant image patch centred around each pixel. A basic reconstruction step for each image is as described in the paper "Learning a Deep Convolutional Network for Image Super-Resolution" by Chao Dong, Chen Change Loy, Kaiming He, and Xiaoou Tang published in D. Fleet et al. (Eds.): ECCV 2014, Part IV, LNCS 8692, pp. 184-199, 2014, and this step can be used with or without modification in some embodiments however, in some of these embodiments these functions can be applied in parallel across multiple images and in some embodiments it can be feasible to perform real-time reconstruction for video playback.

Super resolution operates on a patch-by-patch basis in most embodiments, but it may not be necessary to perform super resolution for every single patch of an image in some embodiments. In some embodiments, where the patch is flat and smooth, using a bi-cubic upscaling can be sufficient. It may be faster in some embodiments, for both training and reconstruction, if these patches could be bypassed. To identify these patches, one approach as set out in the paper "Coupled Dictionary Training for Image Super-Resolution" by Jianchao Yang, Zhaowen Wang, Zhe Lin, Scott Cohen and Thomas Huang (as published in IEEE TRANSACTIONS ON IMAGE PROCESSING, VOL. 21, NO. 8, AUGUST 2012), incorporated by reference, can be used in some embodiments to filter out patches which have low variances and ignoring these areas of the image. Alternatively, in other embodiments edge detectors could be used instead to identify areas of interest.

Further still, in some embodiments some level of inter-frame comparison can be used to identify regions of the image which do not change from frame to frame, thereby eliminating areas of the image from duplicating the efforts of super resolution reconstruction which occur in a previous frame. In these embodiments the underlying video code for the low-resolution video can be used to identify the regions of change as part of its inter-frame compression mechanism and this information could be taken advantage for more efficient real-time super resolution reconstruction and video playback. In addition, in some embodiments an auxiliary data-structure, such as a random fern, can be used to keep track of the uniqueness of patches that have been reconstructed. Given that an image may contain many repeating patches, use of this approach in some embodiments could prevent unnecessary reconstruction of patches whereby the result is already known (in another patch). Similar approaches have been used in key frame detection for real-time camera localisation for augmented reality applications.

The proposed method and system of encoding and decoding video of at least some of the embodiments can augment existing video compression and decompression codecs. By using the same codec as used to create the video data, the low resolution video that is transmitted can be encoded with the same video codec but at a lower resolution than that of the original in some embodiments. Thus, in some embodiments the proposed method and system can be independent of the original codec used to create and compress the video. Alternatively, in some embodiments it is possible to select an alternative codec for transmission and to re-encode the video back into the original codec when the video data has been transmitted, uncompressed and restored to a high resolution version of the original video data.

By incorporating, for example in some embodiments, image enhancement techniques into a video compression process, a reduction in resolution of the video during transmission can be achieved and thus lower amounts of data are transmitted because the image can be enhanced at the node receiving the reduced-resolution video to recreate the video at the original resolution. By using super resolution as the image enhancement technique in such embodiments, and with the knowledge of the original high-resolution image before applying image enhancement techniques, it is possible to down-sample the original high-resolution image to a lower-resolution image and choose one or more representations from a library of representations that can be used to create a high-resolution image from the down-sampled image based on the knowledge of the original image. In such embodiments, this results in only a down-sampled image and the super resolution reconstruction model or parameter being transmitted over a network instead of the original high resolution video, thus decreasing the amount of data transferred while maintaining a similar level of image quality relative to the original once the high-resolution image has been recreated.

At step 170, in some embodiments each of the segments of video are output from the reconstruction process as higher-resolution frames at the same resolution as the original video 70. In these embodiments, the quality of the output video 180 is substantially similar to that of the original video 70, within the error bounds optionally applied by the machine learning process that develops the reconstruction model at step 110 (or step 200) of the encoding process.

At step 180, in some embodiments the segments of video are combined such that the video can be displayed. Optionally at step 170 or 180, in other embodiments the video can be re-encoded with the original codec used on the original video 70 or a more predetermined optimal codec, to enable playback on a decoder or display device.

In most embodiments, the proposed technique does not perform conventional compression by rearranging the original data and discarding redundant data or data deemed to be of least importance such that the majority of the data is intact. Instead, in these embodiments the technique determines a series of simple light-weight functions through machine learning that can be used to reconstruct the original data while minimising the reconstruction error given some pre-defined cost function (a number of optimisation or search frameworks common to machine learning can be used, such as gradient descent or stochastic gradient descent). Thus, it follows that the technique of these embodiments can be described as an optimisation process of the reconstruction functions rather than the data redundancy/reduction process of conventional compression techniques.

Sub-Pixel Convolution

Referring now to FIGS. 3 and 5, embodiments using another technique to encode visual data will now be described in detail. These embodiments can be used in combination with other embodiments and alternative and optional embodiments described elsewhere in this specification.

Again, in these embodiments, original video data 70 is provided into the method or system and is a high-resolution video, for example having a resolution of 1920 pixels by 1080 pixels (also known as "1080p" video) or 3840 pixels by 2160 pixels (also known as "4K" video). This video data can be encoded in a variety of known video codecs, such as H.264 or VP8 but can be any visual data for which the system or method is able to decode into the component sections.

The original video data 70 is then split into single full-resolution frames at step 80 (or step 190), i.e. into a sequence of images at the full resolution of the original video data 70. For some video codecs, this will involve "uncompressing" or restoring the video data as, for example, common video compression techniques remove redundant (non-changing) features (or subset of features) from sequential frames.

Optionally, at step 90 (or step 190), the full-resolution frames can be grouped into scenes or sections of frames having common features (or subset of features), otherwise known as "scene selection". The video data is split or clustered into scenes to enable more specific training and optimisation. By scene, it is meant a consecutive group or sequence of frames, which at the coarsest level can be the entire video or at the most granular level can be a single frame.

To super resolve a low-resolution image to high-resolution space, it is necessary to increase the dimensionality of the low-resolution image to match that of the high-resolution image at some point during the operation of the example based model or convolutional neural network. By upscaling the low-resolution image to a high-resolution as an input to an example-based model, the example-based model does not need to learn the super resolution filters to perform upscaling from the low-resolution space to a high-resolution space but this approach can sacrifice reconstruction accuracy and introduces computational complexity as all subsequent processing must occur at the high resolution dimensionality.

Figure 7:
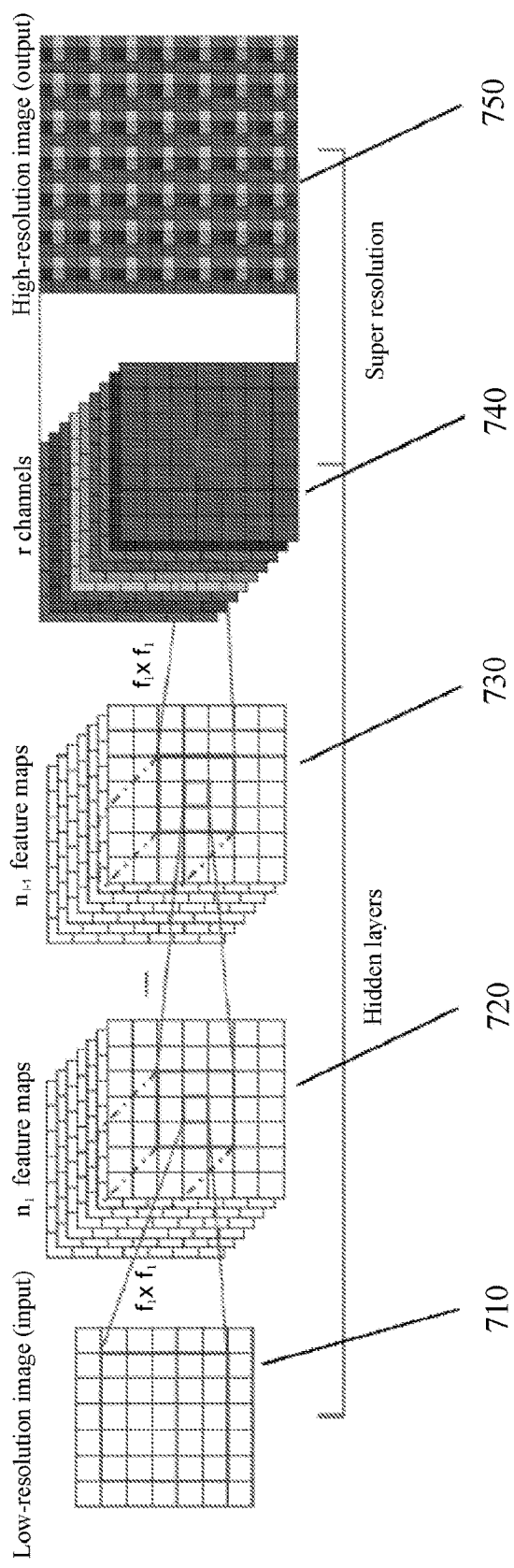
FIG. 7 is a diagram of an efficient sub-pixel convolutional network according to an embodiment, featuring two feature map extraction layers built with convolutional neural networks, and a sub-pixel convolution layer that aggregates the feature maps from low-resolution space and builds the super resolution image in a single step.

Referring to FIG. 7, there is shown an efficient sub-pixel convolutional neural network (ESPCN) 700 having a low-resolution input image 710 with two feature map extraction layers 720, 730 built with convolutional neural networks and a sub-pixel convolution layer 740 that aggregates the feature maps from low-resolution space and builds the super resolution image 750 in a single step.

In an embodiment, as shown in FIG. 7, the high-resolution data is super resolved from the low-resolution feature maps only at the very end of the network, in the final or last layer of the network, therefore avoiding the need to perform most of the computation in the larger high-resolution dimensionality. As processing speed depends substantially directly on the input image dimensionality, operation in the low-resolution space will allow for faster processing. Further, by performing feature map extraction before upscaling, more complex and more accurate upscaling (i.e. additional reconstruction accuracy) is possible by the final or last layer of the network as an upscaling or resampling function can be learned and is content and data adaptive as compared to the applying an explicit generic or handcrafted interpolation filter to perform upscaling (for example, a bicubic interpolation filter) that is heuristically chosen beforehand.

The task of the example based model, in some embodiments a single image super resolution network, is to estimate a high resolution image given a low resolution image that is downscaled or downsampled from a corresponding high resolution image. In some cases, for example video compression, the down sampling operation can be deterministic and known: to produce the low resolution image from the high resolution image, the high resolution image can be convolved using a Gaussian filter (but other filters can be used), thus simulating a point spread function in a camera, then downsampled by a upscaling ratio r. However general super resolution and upscaling are typically not deterministic and in some embodiments, in order to mitigate for non-deterministic operations, training can be performed for a range of different down sampling operations. In other embodiments, estimation can be performed, for example by training a classifier or some visual comparison, and optionally this could be parametised for the super resolution process in some embodiments. In general, both the low and high resolution image have C colour channels, thus can be represented as real-valued tensors of size H×W×C and rH×rW×C respectively. In some embodiments, rather than recovering an high resolution image from an upscaled and interpolated version of the low resolution image, instead the low resolution image is used by a three layer convolutional network to avoid upscaling before the low-resolution image is fed into the network. In the network, a sub-pixel convolution layer is applied to upscale the low resolution feature maps to produce a high resolution image using super resolution.

For a network composed of L layers, the first L−1 layers can be described as follows:

$$f^1(I^{LR};W_1,b_1)=\emptyset(W_1*I_{LR}+b_1),$$

$$f^l(I^{LR};W_{1:l},b_{1:l})=\emptyset(W_l*f^{l-1}(I_{LR})+b_l)$$

where $W_l$, $b_l$, $l \in (1, L-1)$ are learnable network weights and biases respectively. $W_1$ is a 2D convolution tensor of size $n_{l-1} \times n_l \times k_L \times k_L$, where $n_l$ is the number of features (or subset of features) at level l, $n_0=C$, and $k_L$ is the filter size and level l. The biases $b_l$ are vectors of length $n_l$. The non-linearity function Ø applies element-wise and is fixed. The last layer $f^l$ has to convert the low resolution feature maps to a high resolution image $I^{SR}$.

In an embodiment, the high-resolution data is super resolved from the low-resolution feature maps by a sub-pixel convolution layer, to learn the upscaling operation for image and video super resolution. If the last or final layer performs upscaling, feature extraction occurs through non-linear convolutions in the low-resolution dimensions, so a smaller filter size can be used to integrate the same information relative to doing so in the high-resolution dimensions thus reducing computational complexity.

In an embodiment, the convolutional neural network consists of a plurality of non-linear mapping layers followed by a sub-pixel convolution layer. The benefit is the reduced computational complexity compared to a three-layer convolutional network used to represent the patch extraction and representation, non-linear mapping and reconstruction stages in the conventional sparse-coding-based image reconstruction methods and using an upscaled and interpolated version of the low-resolution input. The convolutional neural network of the embodiment uses learned filters on the feature maps to super resolved the low-resolution data into high-resolution data (instead of using hand crafted interpolation or a single filter on the input images/frames).

Instead of using a deconvolution layer to recover resolution from max-pooling and other image down-sampling layers, according to some embodiments upscaling of a low-resolution image is performed by convolution.

In an embodiment, convolution is performed with a fractional stride of $$\frac{1}{r}$$

in the low-resolution space, which can be implemented by interpolation, perforate or un-pooling from low-resolution space to high-resolution space followed by a convolution with a stride of 1 in high-resolution space.

In another embodiment, convolution with a stride of $$\frac{1}{r}$$

in the low-resolution space is performed with a filter $W_d$ of size $k_s$ with a weight spacing $$\frac{1}{r}$$

to activate different parts of $W_d$ for the convolution. The weights that fall between the pixels are not activated and therefore not calculated. The number of activation patterns is r2 and each activation pattern, according to its location, has at most $$\left(\frac{k_s}{2}\right)^2$$

weights activated. These patterns are periodically activated during the convolution of the filter across the image depending on different sub-pixel: mod (x, r), mod (y, r) where x, y are the output pixel coordinates in high-resolution space. In the situation where mod ($k_s$, rks)=0, for a neural network with l layers, the low-resolution feature maps $f^{l-1}(I^{LR})$ from the last non-linear mapping layer are aggregated to produce the final estimate of the high-resolution image $f^l(I^{LR})$ using the following formula:

$$I^{SR}=f^l(I^{LR})=PS(W_L*f^{l-1}(I^{LR})+b_L$$

where $W_L$ and $b_L$ represent learnable filters and biases respectively. The final convolution filter $W_L$ is of size $n_{L-1} \times r^2 C \times k_L \times k_L$, where C is the number of colour channels in the original image and r the resampling ratio. PS is a periodic shuffling operator. Thus, after the convolution, but before applying PS, we have a tensor that has dimension $rH \times rW \times C \cdot r^2$, where h and v are horizontal and vertical dimensions of the high-resolution image. The result of applying PS is a $rH \times rW \times C$ array, i.e. the same dimensions as the high-resolution image. This is achieved by periodic shuffling PS described in the following way:

$$PS(T)_{x,y,c} = T_{[\frac{x}{r}],[\frac{y}{r}],c \cdot r \cdot mod(y,r)+c \cdot mod(x,r)}$$

It is easy to see that when $$k_L = \frac{k_s}{r}$$

and mod ($k_s$, r)=0 it is equivalent to sub-pixel convolution in the low-resolution space with the filter $W_d$. This last layer, or sub-pixel convolution layer, produces a high resolution image from the low resolution feature maps directly, with a more distinguishable filter for each feature map and can operate with increased efficiency as the operation of the periodic shuffling described can be processed in parallel in a single cycle.

Given a training set consisting of high resolution image examples $I_n^{HR}$, n=1 ... N, the corresponding low resolution images $I_n^{LR}$, n=1 N are generated, and the pixel-wise mean squared error (MSE) of the reconstruction is calculated as an objective function to train the network:

$$l(W_{1:L}, b_{1:L}) = \frac{1}{r^2HW}\sum_{x=1}^{rH}\sum_{x=1}^{rW}(I_{x,y}^{HR}-f_{x,y}^L(I^{LR}))^2$$

Figure 8:
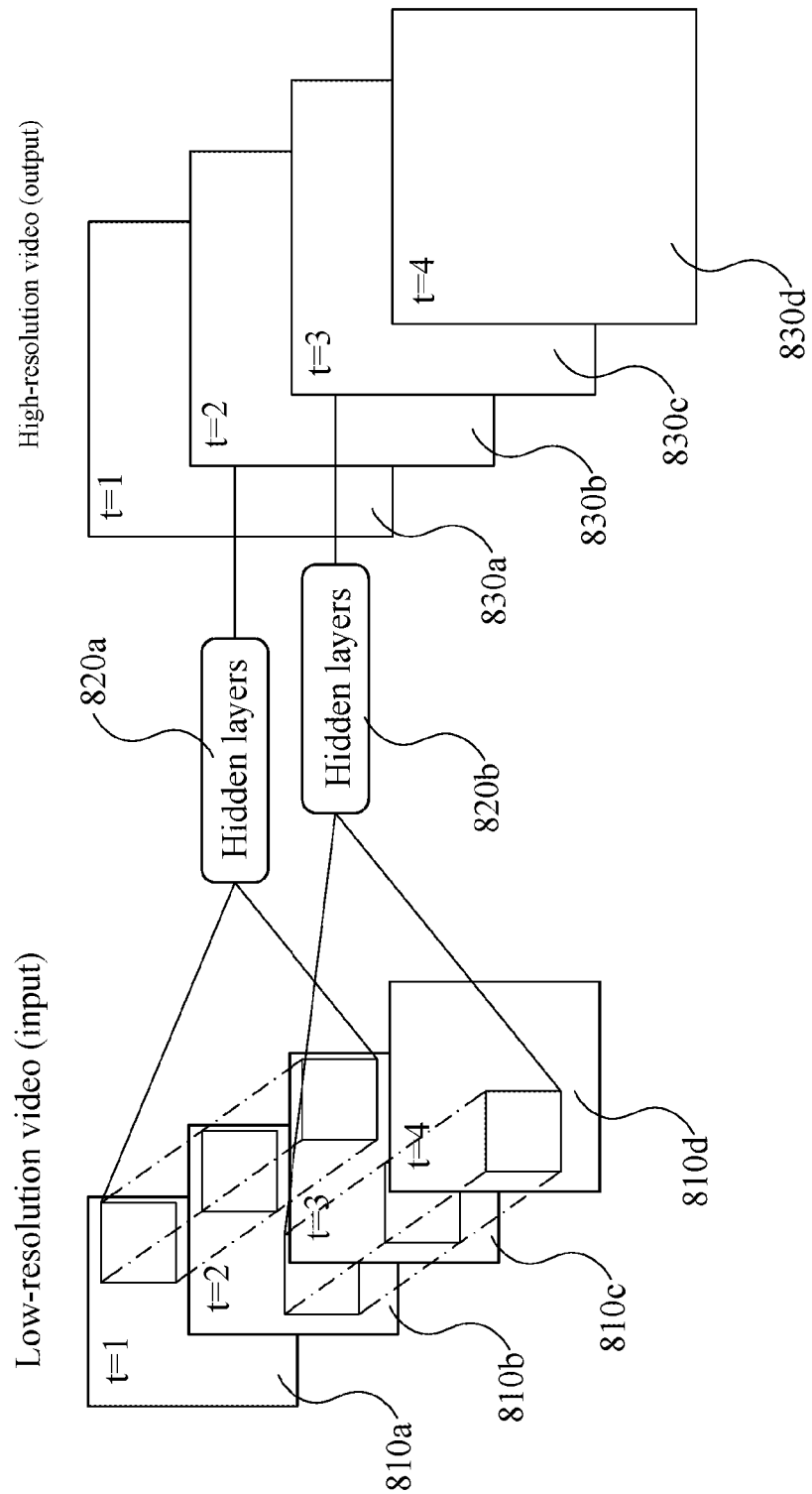
FIG. 8 is a diagram of the network architecture according to an embodiment for super resolution using three input frames where only the input layer is modified to jointly handle three input frames for the super resolution prediction of only the middle frame while the hidden layers are identical to those in FIG. 7.

Referring to FIG. 8, there is shown a network architecture 800 for super resolution using three input frames 810a, 810b and 810c (and then 810b, 810c and 810d). Only the input layer of the neural network is modified to jointly handle three input frames for the super resolution prediction of only the middle frame 830b (or 830c). The hidden layers 820a, 820b) are identical to those shown in FIG. 7.

As shown in FIG. 8, in an embodiment, spatio-temporal convolutions are performed in the initial layer of the neural network. Using a spatio-temporal input layer as an extension of the network to handle video data allows reconstruction performance to be improved for video data by exploiting the temporal redundancy between consecutive frames in a video.

In some embodiments, the settings l=3, ($f_1$, $n_1$)=(5, 64), ($f_2$, $n_2$)=(3, 32), and $f_3$=3 can be used. In the training phase of these embodiments, 17r×17r pixel sub-images were randomly selected from the training ground truth images $I^{HR}$, where r is the upscaling factor. In other embodiments, other parameters can be chosen based on the available computing hardware and/or training time. To synthesise the low resolution samples $I^{LR}$, $I^{HR}$ were blurred using a Gaussian filter in these embodiments and were sub-sampled by the upscaling factor. In these embodiments, the sub-images were extracted from original images with a stride of (17−Σ mod (f, 2))×r from $I^{HR}$ and a stride of (17−Σ mod (f, 2)) from $I^{LR}$. In other embodiments, arbitrary sized sub-images can be selected: smaller sub-images can enable faster updates in training (as updates can be made faster since fewer convolutions are required per sub-image) and can also allow more individual training examples to be used and can further allow an increase in representations; while larger sub-images can be more process-efficient for batch systems, particularly where there is sufficient training data available. It can be noted that in most embodiments the lower limit on sub-image size is dependent on the filter sizes used in a neural network while the upper limit is memory- and data-set-related. This ensures that all pixels in the original image appear once and only once as the ground truth of the training data. tan h may be used as the activation function in these embodiments. In some embodiments, the training may stop after no improvement of the cost function is observed after 100 epochs. In some of these embodiments, the initial learning rate may be set to 0.01 and final learning rate may be set to 0.0001 and updated gradually when the improvement of the cost function is smaller than a threshold µ.

In some embodiments, the network is adapted for video super-resolution with a modification to the input layer. Instead of handling single frames independently, consecutive frames are jointly processed by feeding the consecutive multi-frame data such that the input can be expressed or converted into a three-dimensional vector of corresponding patches from multiple frames such that the temporal changes between consecutive frames are captured to the network. In an alternative embodiment, fixed temporal sampling can be used where videos have varying or different frame rates, optionally selecting the lowest frame rate when the network is trained. After patch extraction, the data is processed by hidden layers through the network and results in an output layer producing a single frame of high-resolution image corresponding to the network prediction of the middle frame in the input consecutive frames. In some alternative embodiments, there are both multiple input frame and multiple output frames.

In use for video processing, blocks of 3, 5 and 7 (or more) consecutive video frames may be used to super resolve the middle frame or frames. It should be noted that an increased number of frames could become impractical as each additional frame provides decreasingly less of a gain in accuracy. In order to handle the first and last frames of videos that do not have enough neighbouring frames to form a block of consecutive frames, the first and last frame may be repeated 1, 2 and 3 times respectively. The peak signal to noise ratio (PSNR) may be used as the performance metric to evaluate the models used.

Referring now to FIGS. 4 and 6, an embodiment for reconstructing the video encoded using the technique will now be described in detail.

First, the data 130 is received from the network. The data received 130 depends on how the data was prepared for transmission in step 120 (or 210) as detailed above and will include the video data and one or more reconstruction models for that video data. It is possible that the video data and one or more reconstruction models are not transmitted and/or received simultaneously so some buffering may be required to wait for all of the components required to decode or reconstruct the higher-resolution video from the data transmitted over the network.

At steps 140 and 150 (and step 220), the received data is prepared for reconstruction. This step generally involves separating the low-resolution video from the reconstruction models (step 220). Optionally, the low-resolution video is decompressed using the video codec used for transmission into full-resolution image frames (step 230) and each of the frames is matched up with the corresponding reconstruction model, which are also unpacked into frame-by-frame order (step 240).

At step 160 (step 250), the reconstruction model is applied to each of the frames to output higher-resolution frames. The reconstruction, or decoding, process involves applying the optimised super resolution convolutional neural network model, or reconstruction model, for each scene in order to restore the lower-resolution video to its original resolution having substantially the same quality as the original high-resolution video. Given the corresponding models for each lower-resolution frame, the original higher-resolution frames can be reconstructed with high accuracy.

In a further embodiment, at least a portion of the process described within FIG. 3 can take place within a 'cloud computing' system. In this embodiment, original video data 70 is transmitted to an off-site computing system wherein one or more of the processes outlined in this specification take place. A different section of video data may be processed in parallel on the off-site computing system. The limit of the number of sections of video processed in parallel is dependent on the computational complexity of the sections of video and the processing power of the cloud servers. Once the cloud-based processing is complete, data can be transmitted back to a local computing system. The cloud service can be used as a real-time relay server, receiving lower-resolution videos, the resolutions of which are then to be increased before being re-transmitted. This arrangement can relay data from bandwidth-restrained locations to locations where there is not such a constraint on bandwidth.

In a further embodiment, the training process for the example based models takes place exclusively for the reconstruction of the high-frequency components of the higher-resolution section of video. The results may then be added as a residue to a section of video reconstructed using bi-cubic interpolation.

In a further embodiment, the architecture of any convolutional neural networks used in the reconstruction process is amended such that the upscaling, in terms of physically changing the number of pixels, occurs in the middle or the last layer of the network by way of a deconvolution function. The first layer of the network is described as obtaining low resolution features (or subset of features) whilst the high resolution features (or subset of features) are only learnt in the last layer. It is not necessary to learn the low resolution features in a high resolution space. By keeping the resolution low for the first couple of layers of convolutions, the number of operations required can be reduced. The computational performance then depends more on the resolution of the input rather than resolution of the output. Alternatively, the network layers can be reorganised such that the output of the sub-pixel convolution layer of the convolutional neural network (which can be the last layer or a preceding layer, depending on the embodiment) predicts the square of the upscaling factor number of pixels (e.g. $r^2$) instead of the number of upscaling factor pixels (e.g. r). The other pixels represent the neighbouring pixel to the original input pixel in low resolution. Every 4 pixels must then be reshaped and reordered to form the high resolution image. A higher video processing speed can be obtained using this approach whilst maintaining a high level of quality for the output. The number of convolutions required is therefore reduced. This embodiment may be used in conjunction with any other embodiment.

In some and other embodiments, a neural network can have multi-stage upscaling (or other function) where an earlier layer upscales and then a later layer upscales, for example a middle layer upscales by 2× and then the last layer upscales by 2×. This type of "chained" approach can allow for neural networks to be trained in a long network (or "chain") of functional layers, for example having a range of upscaling factors (e.g. 2×, 3× and 4×) with multiple upscaling layers and output layers. One of more of these layers can be sub-pixel convolution layers of the described embodiments.

The complexity of the reconstruction process is far simpler compared to that of training the model. The process is very similar to a single iteration of the training process however there is no optimisation required and it is simply applying the learnt convolutional neural network model to reconstruct the image on a patch-by-patch basis. The size of a single patch may vary, according to the resolution requirements of the output section of video. The patch size will be determined offline via hyper-parameter optimisations when training models. Generally, a larger patch size will reduce the computational requirements for processing a section of video, and also reduce the bandwidth required to transmit the section of video. When bandwidth is particularly limited, the processing power of an end user terminal is low, or a user is willing to endure a lower quality section of video, the patch size may be increased to allow for video transmission under one or more of those circumstances. The quality of the reconstruction will be compromised but the processing power required at the end-user terminal will be significantly reduced.

A singular model is applied to each scene and can be sent as accompanying data in the video container ahead of the scene in which it is used. The model associated with each scene can either be indexed in a data stream, synchronised with the video and audio stream, or indexed in a frame-to-model look-up table which can be sent ahead of the video stream.

At step 170, each of the segments of video are output from the reconstruction process as higher-resolution frames at the same resolution as the original video 70. The quality of the output video 180 is substantially similar to that of the original video 70, within the error bounds optionally applied by the machine learning process that develops the reconstruction model at step 110 (or step 200) of the encoding process.

At step 180, the segments of video are combined such that the video can be displayed. Optionally at step 170 or 180, the video can be re-encoded with the original codec used on the original video 70 or a more predetermined optimal codec, to enable playback on a decoder or display device.

The use of the final layer to perform super resolution can be used to perform upscaling for low-resolution images and/or video without knowledge of any original high-resolution content or where there is no higher-resolution content for the low-resolution images and/or video. Additionally, the use of the spatio-temporal approach can be used to perform upscaling for low-resolution images and/or video without knowledge of any original high-resolution content or where there is no higher-resolution content for the low-resolution images and/or video. Further, both the use of the final layer to perform super resolution and the use of the spatio-temporal approach can be used in combination to perform upscaling for low-resolution images and/or video without knowledge of any original high-resolution content or where there is no higher-resolution content for the low-resolution images and/or video. Specifically, some embodiments can use one or more generic example based models, for example selecting these from a library of generic example based models and for example applying some criteria in selecting such example based models, that use either or both of example based models having a final layer that performs super resolution and/or use a spatio-temporal approach in the input layer of the example based model.

Real Time Model Development/Selection

Referring now to FIG. 27, an embodiment using the technique to encode visual data will now be described in detail. These embodiments can be used in combination with other embodiments, and alternative and optional portions of embodiments, described elsewhere in this specification.

Original video data 2740 can be provided into the method or system of the embodiment using a camera 2735 and usually comprises a high-resolution video, for example having a resolution of 1920 pixels by 1080 pixels (also known as "1080p" video) or 3840 pixels by 2160 pixels (also known as "4K" video). This video data can be encoded in a variety of known video codecs, such as H.264 or VP8, but can be any video data for which the system or method is able to decode into the component frames of the video depending on the embodiment.

In some embodiments. the original video data 2740 is then split into single full-resolution frames within step 150 i.e. into a sequence of images at the full resolution of the original video data 2740. In some of these embodiments, for some video codecs, this will involve "uncompressing" or restoring the video data as, for example, common video compression techniques remove redundant (non-changing) features (or subset of features) from sequential frames.

In some embodiments, model selection or at least initial model selection can be performed based on the uncompressed video data.

Optionally, within step 2750, in some embodiments the full-resolution frames can be grouped into scenes or sections of frames having common features (or subset of features), otherwise known as "scene selection". The video data is split or clustered into scenes to enable more specific optimisation. By scene, it is meant a consecutive group or sequence of frames comprising a section of video, which at the coarsest level can be the entire video or at the most granular level can be a single frame. In some embodiments, the scenes can be arranged according to the order in which they were filmed or into a sequence for appropriate decoding of any group of pictures (as scenes will typically comprise related visual content and appropriate ordering can allow compression to work efficiently, for example).

In some embodiments, regardless whether the video has been broken into frames or scenes (i.e. groups of multiple frames) in step 150 or remains as a sequence of frames from step 140, each frame can down-sampled into lower-resolution frames at a suitably low resolution. Optionally, in some embodiments this step can occur before the frames are grouped into scenes in step 150. In some embodiments, the lower-resolution frame is optionally 33% to 50% of the data size relative to the data size of the original-resolution frame, but can be any resolution that is lower than the original resolution of the video. In other embodiments, the quality can be reduced by quantisation and/or compression instead of reducing the resolution of the visual data or in addition to reducing the resolution of the visual data.

At step 2755, a scene is selected in some embodiments. In this embodiment used for real-time encoding, this scene can initially be the first frame chronologically that was recorded by the camera 2735, or the first frame appearing in the original video file 2740. Following this frame, a second frame to be recorded or a second frame appearing in the original video file 2740 can next be selected. After that would appear a third frame, and so on, until the broadcast was complete.

A first example based model is taken from a library of example based models and analysed for use in the reconstruction of data in step 2760. A second example based model can be taken and analysed in parallel in step 2770, as can a third example based model as shown in step 180. There is no fixed upper limit to the variable n, variable n being the number of example based models which can be analysed in parallel, where n is at least two.

In step 2795, the most accurate example based model is chosen to be used for the reconstruction of data. The most accurate example based model can be defined as an example based model which would result in the highest quality of reconstruction, wherein quality can be defined using any of: an error rate; a peak signal-to-noise ratio; or a structural similarity index when compared to the original video file 2740.

In step 210, the lower-resolution scene and the example based model for the reconstruction of that scene are output for transmission over a network. Optionally, a reference to the model can be transmitted in lieu of the actual model. This requires a synchronised or matched library at both the transmitting and receiving nodes of the process, such that the reference can be used by the library at the transmitting node, and the model identified from the reference to the same model in the library at the receiving node as in the library at the transmitting node.

Optionally, the video and model (or model reference) can be stored together within a suitable data container format such as a Matroska Multimedia Container (otherwise known as a MKV container). Alternatively, the video and model can be combined with other sections, or the entire video and placed into a suitable data container format. At step 210 the low-resolution video frames can be re-encoded using either the original video codec applied to the original video data 2740 or, alternatively, a more optimal video codec can be applied to the video data to produce a smaller output file. Optionally, if scene detection or time stamping was performed, the data output for transmission can include either a list of scenes or time stamp data respectively, or this data could be stored within the data container.

There can be a number of variations to the encoding framework described above. For the above described technique, it can be assumed that there would be a one-to-one mapping between scene and example based model, however this does not need to hold true as each scene could be accompanied by more than one example based model.

Referring now to FIG. 5, an embodiment for reconstructing the video encoded using the technique will now be described in detail.

First, the transmitted data 210 is received from the network. The data received 210 depends on how the data was prepared for transmission in step 2750 as detailed above and will include the video data and one or more reconstruction models for that video data. It is possible that the video data and one or more reconstruction models are not transmitted and/or received simultaneously so some buffering may be required to wait for all of the components required to decode or reconstruct the higher-resolution video from the data transmitted over the network.

At step 220, the transmitted data is prepared for reconstruction. This step comprises separating the low-resolution video from the one or more example based models. Optionally, the low-resolution video is decompressed using the video codec used for transmission into full-resolution image frames and each of the frames is matched up with the corresponding reconstruction model, which are also unpacked into frame-by-frame order.

At step 250, the reconstruction model is applied to each of the scenes to output higher-resolution scenes. The reconstruction, or decoding, process involves applying the optimised super resolution convolutional neural network model, or reconstruction model, for each scene in order to restore the lower-resolution video to its original resolution having substantially the same quality as the original high-resolution video. Given the corresponding models for each lower-resolution scene, the original higher-resolution scenes can be reconstructed with high accuracy, where accuracy is defined as above.

This embodiment may require no optimisation, and comprises applying a previously learnt example based model to reconstruct a scene, and does not necessarily include any adaptation or modification of the existing example based models in the library. The one or more example based models associated with each scene can be indexed in a data stream, synchronised with the video and audio stream, or indexed in a frame-to-model look-up table that can be sent ahead of the video stream.

The image reconstruction has a linear computational complexity dependent on the total number of pixels of each frame, as it requires a series of convolution functions (typically less than 3) to be applied for each relevant image patch centred around each pixel. The basic reconstruction step for each image can be used with or without modification in some embodiments from the approach described in the paper "Learning a Deep Convolutional Network for Image Super-Resolution" by Chao Dong, Chen Change Loy, Kaiming He, and Xiaoou Tang published in D. Fleet et al. (Eds.): ECCV 2014, Part IV, LNCS 8692, pp. 184-199, 2014, however these functions can be applied in parallel across multiple images and it is feasible to perform real-time reconstruction for video playback.

Within step 250, each of the segments of video is output from the reconstruction process as higher-resolution frames and at substantially the same resolution as the original video 2440.

Further within step 250, the segments of video are combined such that the video can be displayed. Optionally the video can be re-encoded with the original codec used on the original video 2740 or a predetermined more optimal codec, to enable playback on a decoder or display device.

In a further embodiment, at least a portion of the process described within FIG. 27 can take place within a 'cloud computing' system. In this embodiment, the original video file 2740 is transmitted to an off-site computing system, preferably a scalable computing system, where the first scene is prepared 2750. As before, a plurality of example based models 2760, 2770, 2780, 2790 can then be analysed for their use in reconstruction of the data, before a most accurate model 2795 is chosen and a transmitted package 210 prepared. The transmitted package 210 is then sent from the cloud server to a local server, where the reconstruction process 220, 230, 240, 250 can take place. While the first scene is being processed in this way, a second section of video can be processed in parallel on the off-site computing system. The limit of the number of sections of video processed in parallel is dependent on the computational complexity of the sections of video and the processing power of the cloud servers. The cloud service can be used as a real-time relay server, receiving lower-resolution videos, the resolutions of which are then to be increased before being re-transmitted. This arrangement can relay data from bandwidth-restrained locations to locations where there is not such a constraint on bandwidth.

In a further embodiment, one or more sections of video are transmitted via the process outlined above, in advance of a live recording. Example based models that are likely to be useful can therefore be identified before they are required, and the library of models from which they are selected reduced to those more likely to be used. The selection procedure 2795 can therefore be made faster or with reduced computation, as there are fewer models to choose between, hence the lag between the recording of an event and the higher-resolution reconstruction being displayed can be reduced compared to comparing the performance of all of the models in the library of models.

Model Libraries

Figure 25:
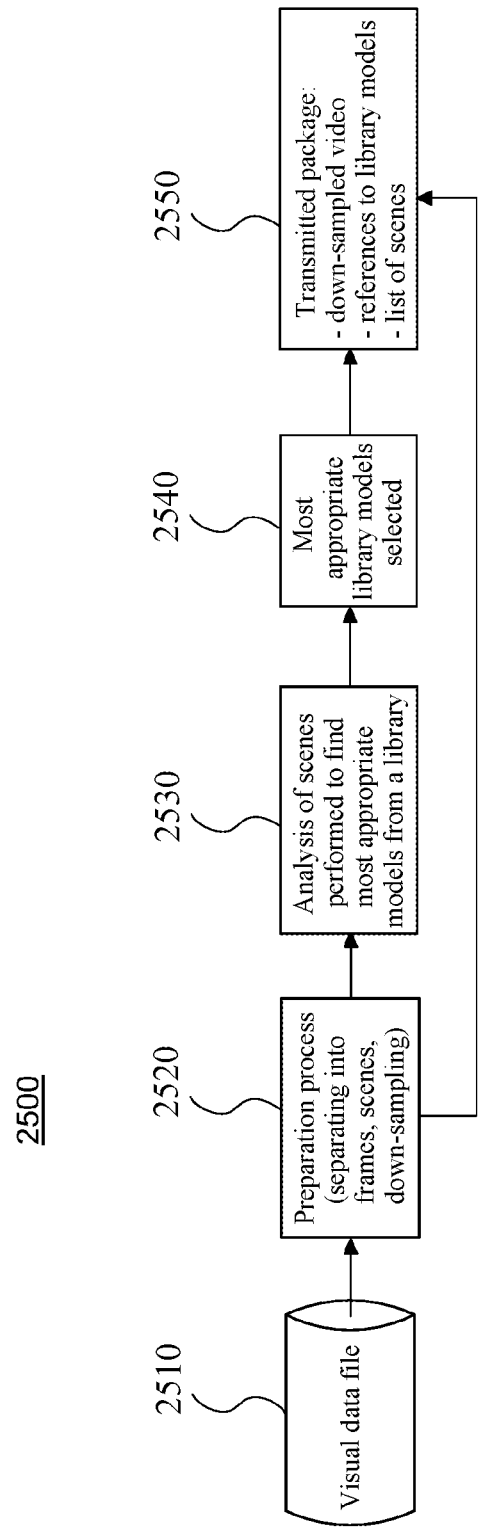
FIG. 25 illustrates the encoding process to generate, for transmission, from high resolution video data, a combination of low resolution visual data and a reference to an algorithm able to use super resolution to increase the resolution of the low resolution visual data.

Referring now to FIG. 25, an embodiment using another technique to encode visual data will now be described in detail. These embodiments can be used in combination with other embodiments, and alternative and optional portions of embodiments, described elsewhere in this specification.

Original video data 2510 is provided into the method or system using the technique and is a high-resolution video, for example having a resolution of 1920 pixels by 1080 pixels (also known as "1080p" video) or 3840 pixels by 2160 pixels (also known as "4K" video). This video data can be encoded in a variety of known video codecs, such as H.264, VP8 or VP9 but can be any video data for which the system or method is able to decode into the component frames of the video.

The original video data 2510 is then split into single full-resolution frames at step 2520, i.e. into a sequence of images at the full resolution of the original video data 2510. For some video codecs, this will involve "uncompressing" or restoring the video data as, for example, common video compression techniques remove redundant (non-changing) features from sequential frames.

Optionally, at step 2520, the full-resolution frames can be grouped into scenes or sections of frames having common features, otherwise known as "scene selection". The video data is split or clustered into scenes to enable more specific training and optimisation. By scene, it is meant a consecutive group or sequence of frames, which at the coarsest level can be the entire video or at the most granular level can be a single frame.

Regardless of whether the video has been broken into frames or scenes (i.e. groups of multiple frames) or remains as a sequence of frames, each frame is down-sampled into lower resolution frames at a suitably lower resolution for transmission over a network, for example the Internet. Optionally, this step can occur before the frames are grouped into scenes in step 2520. The lower-resolution frame is optionally 25% to 50% or 10% to 50% of the data size relative to the data size of the original-resolution frame, but the lower resolution can be any resolution that is lower than the original resolution of the video. This will result in the full lower resolution video being smaller in size than the original-resolution video.

An analysis step 2530 is performed on the frames of the down-sampled video in order to find a reconstruction model from a library (e.g., a library of algorithms) that can be used to increase the resolution of the scene and enhance the quality of the video. A model is selected based on one or more metrics of the selected scene that can be compared to metrics associated with the reconstruction models stored in the library, and an image enhancement procedure is performed on the down-sampled scene. The quality of the enhanced scene is compared with the original using objective metrics such as error rate, PSNR and SSIM and/or subjective measures. An appropriate model is then selected at step 240 based on these quality comparisons. The library from which the models are selected comprises a set of pre-trained models which have been generated from example, or training, videos and which are associated with metrics to enable comparison of the video from which the models were generated with the selected scene being enhanced. The library from which the model is selected may be stored at one or more specific nodes in the network, or may be distributed over two or more nodes.

By employing a deep learning approach when creating the models, a non-linear hierarchical model can be selected to reconstruct a higher-resolution frame from the lower-resolution frame.

The non-linear models are more accurate in reconstructing higher-resolution frames than dictionary-based approaches. The non-linear models selected are small convolutional neural networks rather than over-complete dictionaries. In contrast to the local patch averaging approach that tends to be used in reconstruction by dictionary learning approaches, the use of a convolutional neural network model also allows a more appropriate filter to be selected for final reconstruction where neighbouring patches are considered, which can avoid unintended smoothing of the reconstructed higher-resolution image.

In step 2550, the portion of the low-resolution video and a library reference for reconstruction model for that portion of video are output for transmission. Optionally, the video and library reference can be stored together within a suitable data container format such as a Matroska Multimedia Container (otherwise known as a MKV container). Alternatively, the video and library reference can be combined with other sections or the entire video and placed into a suitable data container format. At step 2550, the low-resolution video frames can be re-encoded using either the original video codec applied to the original video data 2510 or, alternatively, a more optimal video codec can be applied to the video data to produce output video data. Optionally, if scene detection or time stamping was performed, the data output for transmission can include either a list of scenes or time stamp data respectively, or this data could be stored within the data container. Optionally, a list (or data stream) of model references that is synchronised with the output low resolution video frames can also be included. Alternatively, the transmission package can include a list of references to library content/models/parameters for each frame, which can be ordered by either frame playback or decode order, and this can be synchronised to the video frames. A further alternative is that the transmission package can include a list of scene transitions (at defined frame intervals) and then a list of references to library content/models/parameters for a matching number of scenes or transitions.

Figure 26:
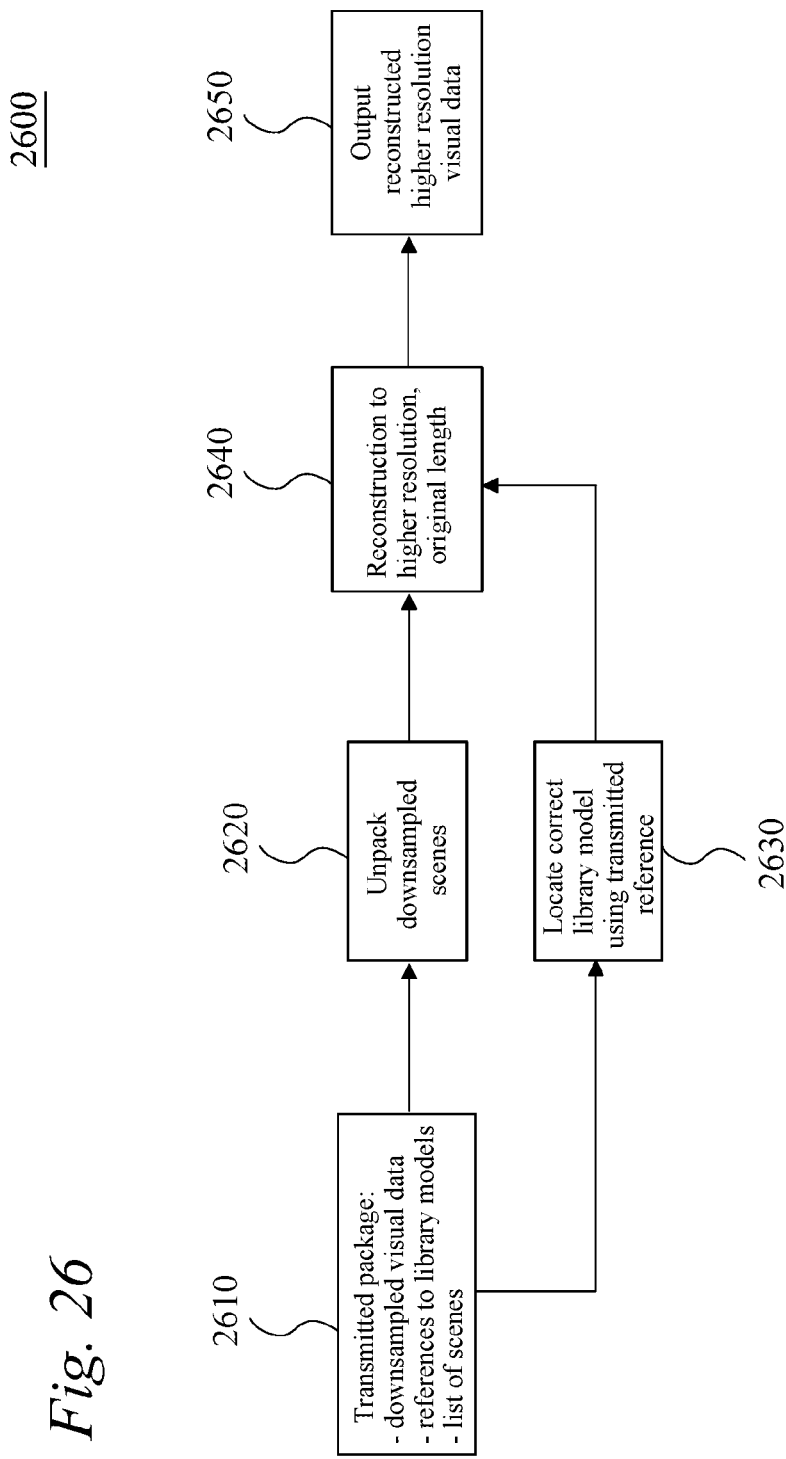
FIG. 26 illustrates the decoding process using the low resolution visual data and the algorithm corresponding to the received reference to recreate a version of the high resolution visual data.

Referring now to FIG. 26, an embodiment for reconstructing the video encoded using the technique will now be described in detail.

First, the data 2610 is received from the network. The data received 2610 depends on how the data was prepared for transmission in step 2550 as detailed above and will include the video data and one or more library references to reconstruction models for that video data. It is possible that the video data and one or more library references are not transmitted and/or received simultaneously so some buffering may be required to wait for all of the components required to decode or reconstruct the higher-resolution video from the data transmitted over the network.

At steps 2620 and 2630, the received data is prepared for reconstruction. These steps generally involve separating the low-resolution video from the library references to reconstruction models. Optionally, the low-resolution video is decompressed using the video codec used for transmission into full-resolution image frames and each of the frames is matched up with the corresponding library reference to a reconstruction model, which are also unpacked into frame-by-frame order.

At step 2630, the reconstruction model corresponding to the library reference is obtained from a stored library of reconstruction models and at step 2640 is applied to each of the frames to output higher-resolution frames. The reconstruction, or decoding, process involves applying the reconstruction model for each scene in order to restore the lower-resolution video to its original resolution having substantially the same quality as the original high-resolution video. Given the corresponding models for each lower-resolution frame, the original higher-resolution frames can be reconstructed with high accuracy.

The complexity of the reconstruction process is far simpler compared to that of training the model. The process, known as the feed-forward process or pass for neural networks, is very similar to a single iteration of the training process however there is no optimisation required and it is simply applying the selected convolutional neural network model to reconstruct the image on a patch-by-patch basis. In comparison, training neural networks can also incorporate a back-propagation process or pass, depending on embodiment. A singular model is applied to each scene and the library reference to it can be sent as accompanying data in the video container ahead of the scene in which it is used. The library reference associated with each scene can either be indexed in a data stream, synchronised with the video and audio stream, or indexed in a frame-to-model look-up table which can be sent ahead of the video stream.

At step 2650, each of the segments of video are output from the reconstruction process as higher-resolution frames at the same resolution as the original video 210. The quality of the output video is substantially similar to that of the original video 210, within the error bounds optionally applied by the machine learning process that selects the reconstruction model at step 2650 of the encoding process.

At step 2650, the segments of video are combined such that the video can be displayed. Optionally at step 2650, the video can be re-encoded with the original codec used on the original video 2510 or a more predetermined optimal codec, to enable playback on a decoder or display device.

Upscaling & Visual Data Enhancement

Super resolution approaches are usually split into learning- or example-based approaches and interpolation-based (multi-frame) approaches. Some embodiments are concerned only with learning- or example-based approaches to super resolution. Specifically, these embodiments can work with most or all learning- or example-based techniques where there can be a set of different upscaling results depending on the selected parameters for the techniques.

In some embodiments, super resolution techniques can output representations that can be used to enhance the higher-resolution images created from lower-resolution images. To improve the effectiveness of these representations in some embodiments, learning- or example-based approaches incorporate machine learning. When using dictionary representations for images, this combination is generally referred to as dictionary learning. In dictionary learning, where sufficient representations are not available in an existing library of representations (or there is no library available), machine learning techniques are employed to tailor dictionary atoms such that they can adapt to the image features (or subset of features) and obtain more accurate representations.

It is noted that atoms are not selected locally within the dictionary, but instead are chosen as the linear combination that best approximates the signal patch for a maximum number of atoms allowed and irrespective of their location within the dictionary. Without a constraint that the atoms must be orthogonal to one another, larger dictionaries than the signal space that the dictionary is intended to represent can be created.

Embodiments can use dictionary learning reconstruction models or convolutional neural network reconstruction models for up-scaling, or a mixture of these two techniques. In some embodiments, a library of reconstruction models is stored that can be generated from example, or training, video data where both the original and reduced-resolution video can be compared. Along with the reconstruction models, in some embodiments data needs to be stored relating to the example or training video for each reconstruction model in the library to enable each model to be matched to a scene that is being up-scaled. In these embodiments the data stored relating to the example or training video can be metadata or metrics related to the video data, or it can be samples or features (or subset of features) of the example or training video.

Figure 15:
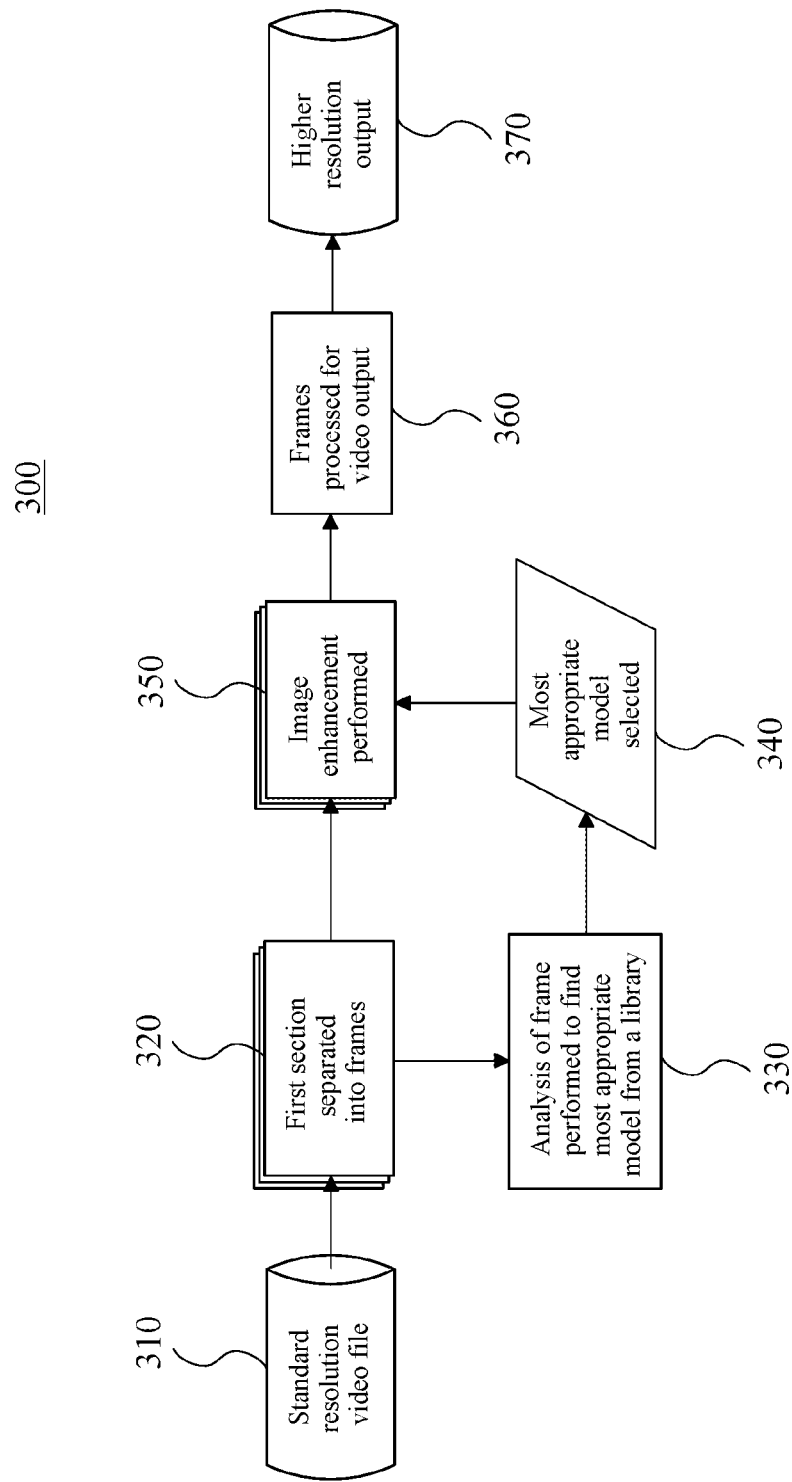
FIG. 15 is a flowchart illustrating the method steps for an image enhancement process according to an embodiment, where visual data is up-scaled from a lower-resolution original visual data to a higher-resolution visual data, using a combination of the received visual data and a convolutional neural network selected from a library, the convolutional neural network able to use super resolution techniques to increase the resolution of the received visual data.

Referring now to FIG. 15, embodiments using a technique 1500 to increase the resolution of visual data will now be described in detail. These embodiments can be used in combination with other embodiments, and alternative and optional portions of embodiments, described elsewhere in this specification.

In these embodiments, received video data 1540 is provided into a decoder system and is a lower-resolution video encoded in a standard video format. This video format can be a variety of known video codecs, depending on the embodiment, and in embodiments can be codecs such as H.264 or VP8 or can be any visual data which the system is able to decode into component sections.

In embodiments, the system then separates video data 1510 into single frames at step 1520, i.e. into a sequence of images at the full resolution of the received video data 310. For some video codecs, depending on the embodiment, this will involve "uncompressing" or restoring the video data as, for example, common video compression techniques remove redundant (non-changing) features (or subset of features) from sequential frames.

Figure 16:
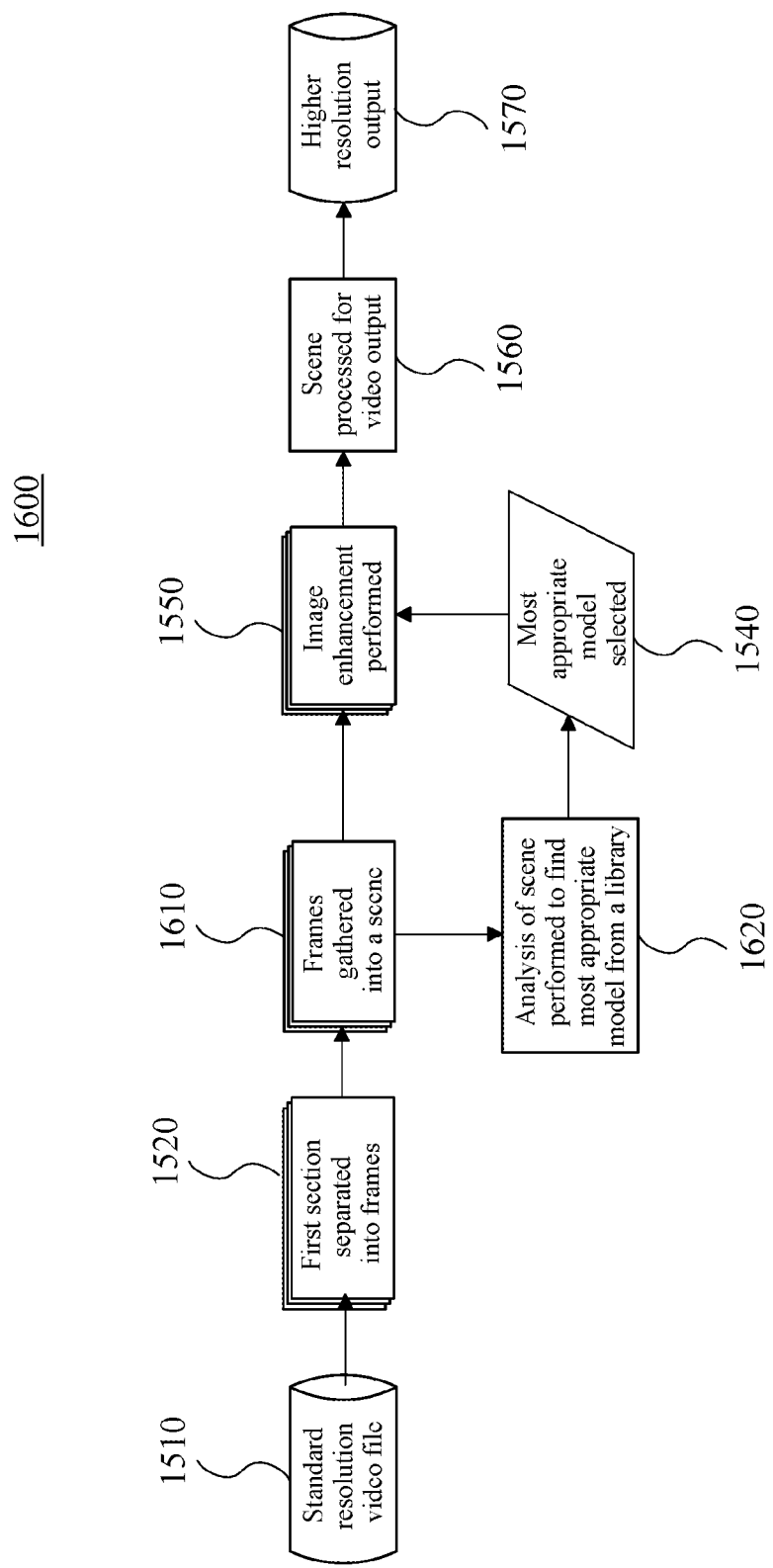
FIG. 16 is a flowchart illustrating the method steps for an image enhancement process to: generate a down-sampled visual data for transmission from a higher-resolution original visual data; the transmission of the down-sampled visual; and an image enhancement process to upscale from the down-sampled visual data to a higher-resolution visual data, using a combination of the received down-sampled visual data and a convolutional neural network selected from a library, the convolutional neural network able to use super resolution techniques to increase the resolution of the received down-sampled visual data.

Optionally, as shown in FIG. 16, in some embodiments the frames extracted in step 1520 from the video 1510 can be grouped into scenes or sections of frames having common features (or subset of features), otherwise known as "scene selection" in step 1610. In these embodiments step 1610 involves identifying sequential scenes once these are detected. In some of these embodiments, the detected scenes can enable a more accurate reconstruction model or models to be selected from the library of reconstruction models as appropriate from the scene or frames within the scene in step 1620, which is a modified version of step 1530 in process 1500 where the most appropriate model is selected on a frame-by-frame basis. By scene, it is meant a consecutive group or sequence of frames, depending on embodiment, which at the coarsest level can be the entire video or at the most granular level can be a single section of a frame.

Alternatively, and in order for any delay to be reduced between the arrival of the lower resolution video 1510 and the generation of a higher resolution output video 370, in some embodiments basic scene selection in step 1610 can be accomplished by grouping frames into scenes chronologically, for example by applying time stamps and collecting together a predetermined range of timestamps. Initially, in these embodiments the first frame or section of frame can be analysed and a metric created to enable reference to the library of reconstruction models in step 1620. In such embodiments, if a subsequent frame or section of a subsequent frame is sufficiently similar according to a comparison metric, then the subsequent frame or frames can be included as part of a group of frames with the first frame. In these embodiments, this process can continue until a subsequent frame is not sufficiently similar to the previous frame or frames, at which point the frame or group of frames are collated into a scene in step 410. in these embodiment the process then starts to find the next scene, starting from the insufficiently similar scene. In such embodiments, each scene is processed in the order in which it was decoded from the received video 1510.

Returning to the method 1500 shown in FIG. 15, in some embodiments an analysis step 1530 is performed on the frames of the received video in order to find a reconstruction model from a library in step 1540 which can be used to increase the resolution of the scene and enhance the quality of the video in step 1550, based on a metric of the selected scene that can be compared to metrics associated with the reconstruction models stored in the library. A model in step 1540 is selected, and an image enhancement procedure is performed in step 1550 using both the model selected in step 1540 on the selected frame generated in step 1520 from the received video 1510. The library from which the model is selected in step 1540 comprises a set of pre-trained models which have been generated from example, or training, videos and which are associated with metrics to enable comparison of the video from which the models were generated with a selected frame being enhanced in step 1550.

There are a number of methods for feature extraction approaches that can be used to create metrics for each frame and therefore which can be stored in the library in association with the pre-trained reconstruction models. In many computer vision applications, a common approach is to use a visual bag-of-words approach. Other popular methods include histogram extraction and scale invariant feature transform (SIFT) or GIST features. After feature extraction in step 1530, each scene from a target video can be matched to the "most similar" scene from a library in a number of ways in step 1540. The simplest approach is to use a pre-defined similarity or distance metric such as, Manhattan distance, Euclidean distance or structural similarity (SSIM) or additionally, a learned distance metric. A k-nearest neighbour (kNN) data-structure such as a ball-tree or a locality-sensitive hash table can be used to facilitate a direct nearest-neighbour search. Alternatively, each unique scene can be thought of as being "labelled", then a variety of machine learning scene recognition and matching approaches can be used to classify new scenes into the "labelled" scenes of the library such as adversarial training techniques, where such techniques involve training another neural network to indicate whether the scene is labelled correctly.

In step 1560, the reconstructed scene for that section of video is optionally prepared for output 1510. Optionally at step 1560, the output video 1570 can be re-encoded with the original codec used on the original video 1510 or a more predetermined optimal codec, to enable playback on a decoder or display device.

It should be appreciated that the term 'frame', particularly in reference to grouping multiple frames into scenes, can refer to both an entire frame of a video and an area comprising a smaller section of a frame.

The video 1510 in process 1500 or 1600 can originate from physical media such as a DVD or other physical data storage medium, but can also originate from a local or remote streaming network service.

Figure 17:
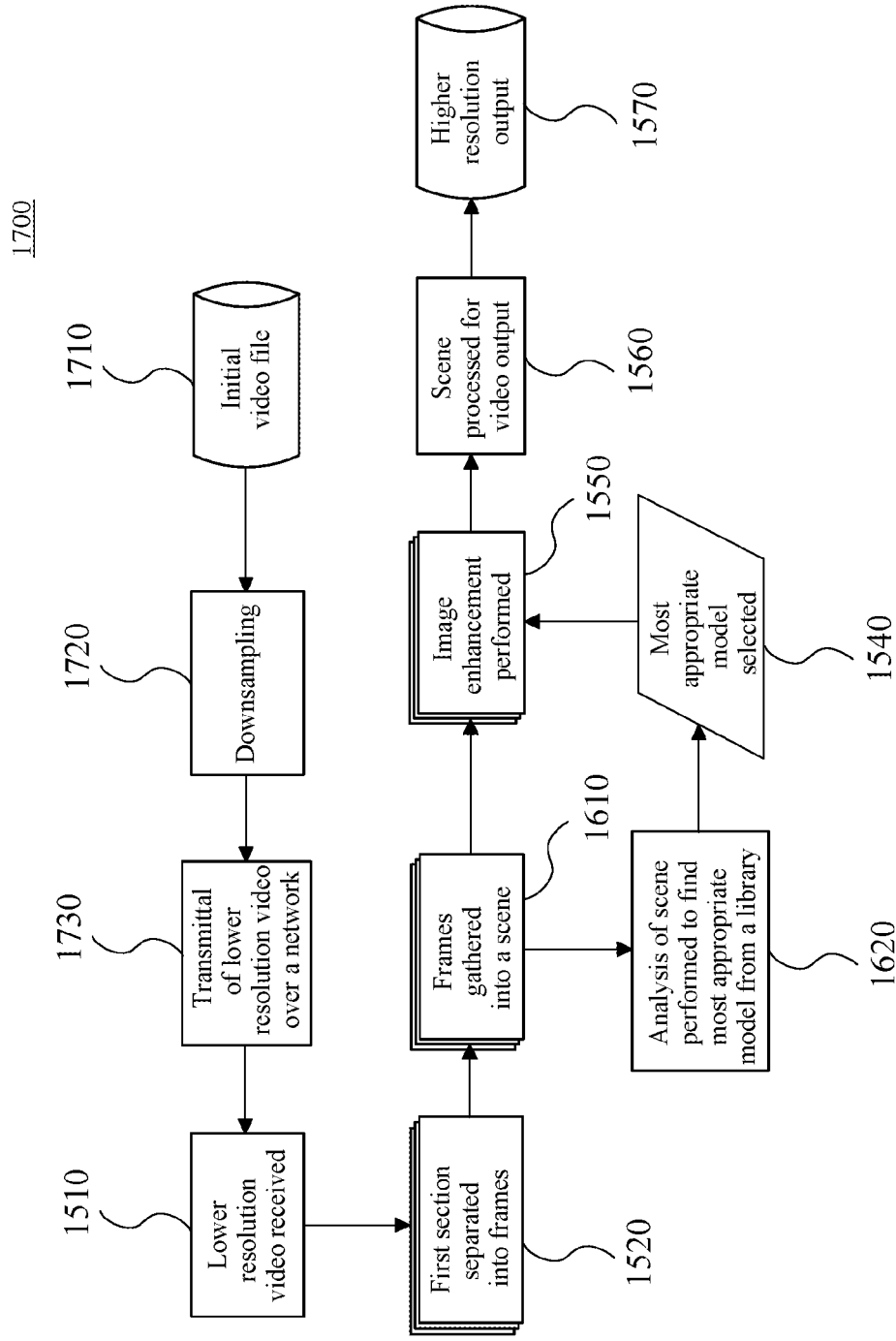
FIG. 17 is a flowchart illustrating the method steps for an image enhancement process according to the embodiment in FIG. 16, with additional steps for encoding visual data at another node prior to transmitting the encoded visual data to the node performing the method of FIG. 16.

Referring now to FIG. 17, a modified process 1700 (based on process 1600 but which could equally be a modified version of process 1500) is shown.

Here, process 1600 in some embodiments is modified with further steps. Specifically, step 1710 begins with a high resolution video file, for example at HD resolution. Then, at step 1720, the video is down-sampled to, for example, SD resolution to enable transmission over a bandwidth-restricted network. Optionally, in other embodiments, quantisation can be used to lower the bitrate of visual data such as video. At step 1730, the lower-resolution or quantised video (depending on embodiment) is transmitted over a network becoming the input video data 1510 of either process 1500 or 1600 described above in relation to FIG. 15 or 16 respectively.

Further, output video 1570 in process 1500 or 1600 can be output directly to a display or may be stored for viewing on a display on a local or remote storage device, or forwarded to a remote node for storage or viewing as required.

In alternative embodiments, the input video concerned may be media for playback, such as recorded video or live streamed video, or it can be videoconference video or any other video source such as video recorded or being recorded on a portable device such as a mobile phone or a video recording device such as a video camera or surveillance camera.

It should also be appreciated that particular combinations of the various features described and defined in any aspect described herein can be implemented and/or supplied and/or used independently.

Specific Description—Machine Learning Optimisation

Embodiments relating to a dictionary learning approach with dictionary-based models and embodiments relating to a deep learning approach using convolutional neural network models will now be described. Other suitable machine learning techniques will also be able to benefit from using a library of pre-trained model. These embodiments can be used in combination with other embodiments, and alternative and optional portions of embodiments, described elsewhere in this specification.

Figure 9:
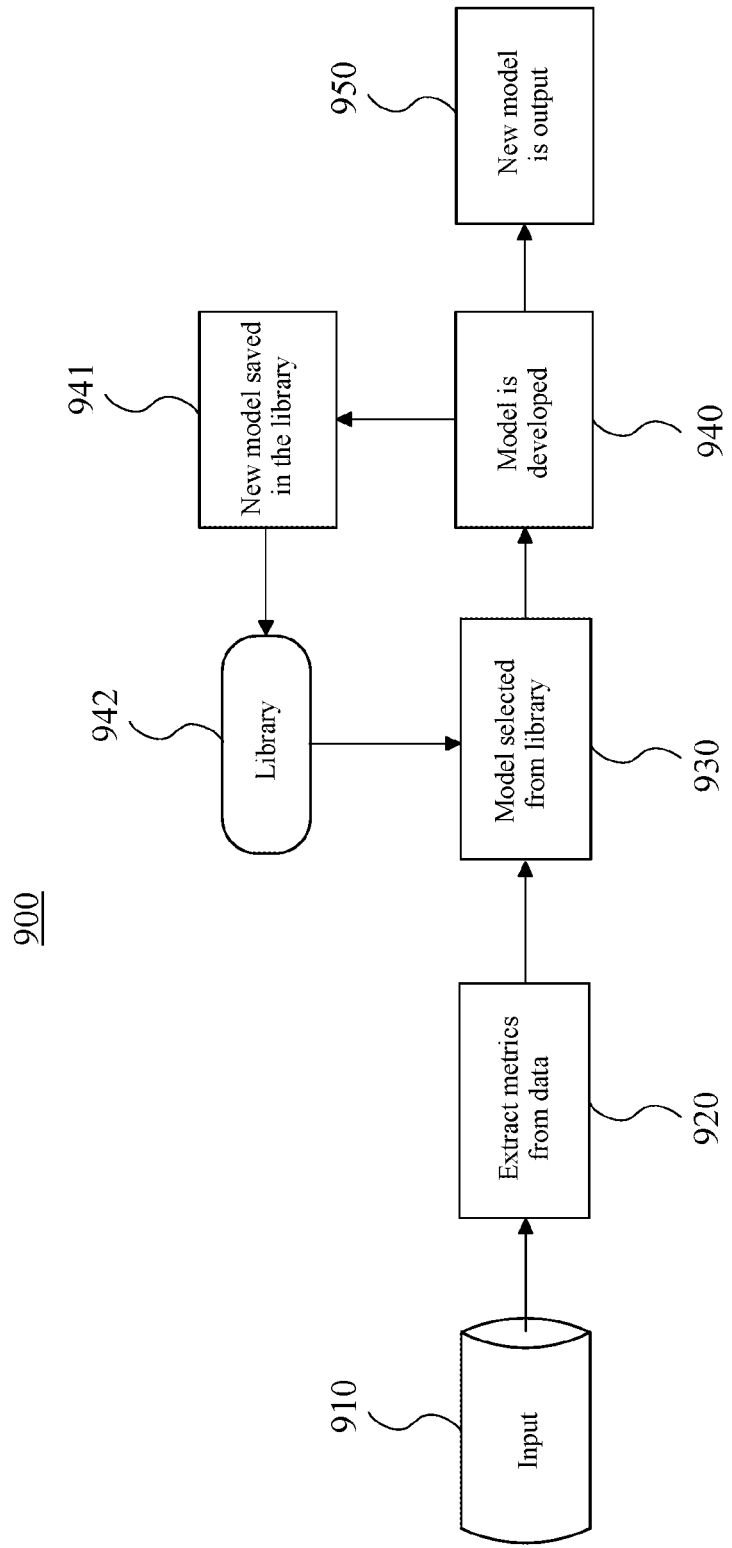
FIG. 9 is a flow chart illustrating the method steps for a machine learning process.

Referring now to FIG. 9, an embodiment of a machine learning process will now be described in detail.

Data 910 is provided to the method or system 900, and may for example be in the form of a video data file or image data. Other data formats may also be used. Specific metrics are extracted from, or generated based on, the data in step 920. The metrics can based on measuring which of the pre-trained models generates the highest quality output data. Quality can be defined using any or a combination of: an error rate; a peak signal-to-noise ratio; or a structural similarity index. These metrics are then used to select a pre-trained model from a library 942 in step 930. The selected pre-trained model is then developed in step 940 so as to be more accurately able to perform the desired output function on the input data 910. The output model 950 can then be used on the input data 910 either immediately or at in future.

To generate the initial pre-trained models, the same process 900 can be used but instead of inputting live data 910, training or example data is used.

The developed model is then saved in the library 942 in step 941, to be used if required in the future. A model does therefore not have to be redeveloped if similar data is input in the future. The library 942 therefore grows as the system is used.

If employing a deep learning approach to generating the model in step 940, a non-linear hierarchical model 950 can be created.

The training and optimisation process 900 can be configured according to a desired trade-off between computational time spent and desired quality of results. In general, the number of iterations used during the training process 940 yields approximately logarithmic gains in reconstruction accuracy, so it is preferred to use an automatic threshold to stop further optimisation. When favouring quality of results, the automatic threshold can be set to a predetermined value of reconstruction error, for example by calculating the mean squared error, but other methods can also be used. Alternatively, the automatic threshold can be set to limit the training and optimisation process to a predetermined number of iterations. As a further alternative, a combination of these two factors can be used.

This process 900 can be of use in the fields of image and video enhancement. If the input data 910 is in the form of a section (frame or frames) of video, the selection of an initial model from the library 942 can be based on metrics associated with the style of video being processed, for example a fast-moving action scene, or a stationary background scene. The model 950 can then be developed in step 940 to more closely represent the section of video for which it is to be used.

The training and optimisation process 900 can also be considered in the case of image registration and alignment. An initialisation can be provided which is closer to the most optimal image alignment with regards to a metric, for example a distance metric cost function.

Specific Description—Enhanced Libraries

Figure 10:
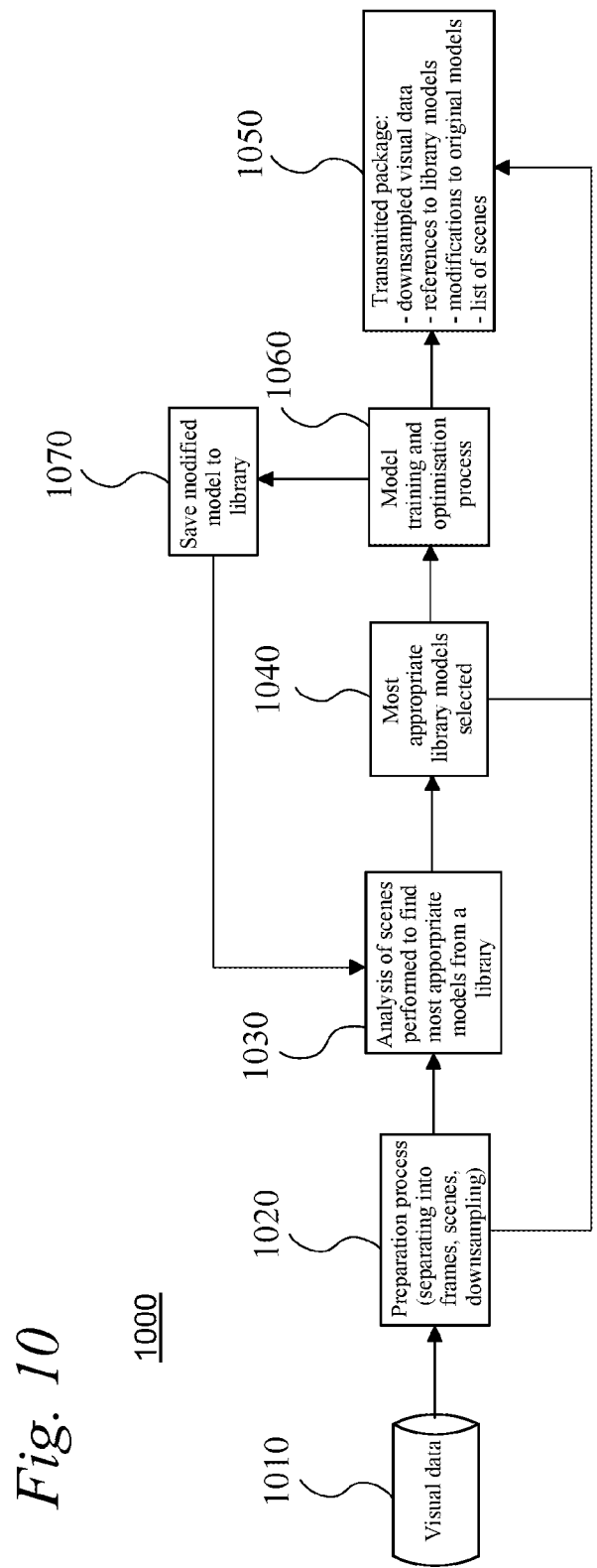
FIG. 10 illustrates the encoding process to generate for transmission, from high resolution visual data and known convolutional neural networks, low resolution visual data and modifications to the known convolutional neural network.

Referring now to FIG. 10, an embodiment using the technique to encode visual data will now be described in detail. These embodiments can be used in combination with other embodiments, and alternative and optional portions of embodiments, described elsewhere in this specification.

Original video data 1010 is provided into the method or system using the technique and is a high-resolution video, for example having a resolution of 1920 pixels by 1080 pixels (also known as "1080p" video) or 3840 pixels by 2160 pixels (also known as "4K" video). This video data can be encoded in a variety of known video codecs, such as H.264 or VP9 but can be any video data for which the system or method is able to decode into the component frames of the video.

The original video data 1010 is then split into single full-resolution frames at step 1020, i.e. into a sequence of images at the full resolution of the original video data 210. For some video codecs, this will involve "uncompressing" or restoring the video data as, for example, common video compression techniques remove redundant (non-changing) features (or subset of features) from sequential frames.

Optionally, at step 1020, the full-resolution frames can be grouped into scenes or sections of frames having common features (or subset of features), otherwise known as "scene selection". The video data is split or clustered into scenes to enable more specific training and optimisation. By scene, it is meant a consecutive group or sequence of frames, which at the coarsest level can be the entire video or at the most granular level can be a single frame.

Regardless whether the video has been broken into frames or scenes (i.e. groups of multiple frames) in step 1020 or remains as a sequence of frames, each frame is either down-sampled into lower resolution frames at a suitably lower resolution, or reproduced as a set of representations of the frame such as a matrix of vectors with generalised information for portions of the frame or groups of one or more pixels. Optionally, this step can occur before the frames are grouped into scenes. The lower-resolution frame is preferably 33% to 50% of the data size relative to the data size of the original-resolution frame, while the representations of the frame can be anything from 1% to 50% of the data size of the original-resolution frame. The lower resolution frame can have any resolution that is lower than the original resolution of the video.

In step 1030, an analysis is performed on frames of the downsampled video, or on the representations, or on the models alone in order to find a reconstruction model from a library of models which can be used to either recreate a close approximation of the high-resolution video purely from a model, or recreate a close approximation of the high-resolution video from a set of representations of the high-resolution video, or increase the resolution of the down-sampled video and enhance the quality of the video. An initial model is selected based on a metric of the selected scene that can be compared to metrics associated with the reconstruction models stored in the library. The selection of the initial model may be based on only these metrics, or alternatively multiple initial models may be applied independently to the downsampled video to produce an enhanced lower-resolution frame or recreate a frame, the quality of the enhanced or recreated frame being compared with the original scene to select the most appropriate initial model from the group. The quality of the recreated or enhanced scene is compared with the original using objective metrics such as error rate, PSNR and SSIM and/or subjective measures. An appropriate model is then selected at step 1040 based on these quality comparisons as well as whether to use solely a model, or a set of representations of the frame, or the lower-resolution frame. The library from which the models are selected comprises a set of pre-trained models which have been generated from example, or training, videos and which are associated with metrics to enable comparison of the video from which the models were generated with the selected scene being enhanced.

In step 1060, super resolution techniques are employed to create a specific model using the model selected at step 1040 as the initial model and using machine learning for each frame, so that the model can be used to substantially recreate the original resolution version of a lower-resolution frame, or a set of representations, or without use of either the original or lower-resolution frame or representations, and trained using machine learning based on knowledge of the original-resolution frame. This step is termed the training and optimisation process.

At step 1070, the optimised reconstruction model is saved to the library for future use as an initial model in step 1030.

Alternatively, the modified model can be developed from scratch, without using a known model as a starting point. A known model can then be compared with the generated model to produce a list of modifications required to produce the modified model from the known one.

In step 1050, the portion of the low-resolution video, or the representations and/or the reconstruction model for that frame or portion of video are output for transmission. Rather than transmit the full reconstruction model, a library reference to the initial model selected at step 1040 can be output, together with the modifications required to produce the reconstruction model from it. Alternatively, instead of the lower-resolution video, transmitting a representation of the image can further reduce the data transmitted. As a further alternative, only transmitting a model still further reduces the data transmitted. Optionally, the video or representations and model can be stored together within a suitable data container format such as a Matroska Multimedia Container (otherwise known as a MKV container). Alternatively, the video or representations and model can be combined with other sections or the entire video and placed into a suitable data container format. At step 250, the low-resolution video frames can be re-encoded using either the original video codec applied to the original video data 1010 or, alternatively, a more optimal video codec can be applied to the video data to produce output video data 1050. Optionally, if scene detection or time stamping was performed, the data output for transmission can include either a list of scenes or time stamp data respectively, or this data could be stored within the data container. Alternatively, a list of frame by frame references (which are ordered by either frame playback or decode order) can be used which is synced to the video frames. Another alternative is to include a list of scene transitions (as defined by frame numbers) along with an ordered list of references matching the number of scenes. The skilled person will appreciate that other examples are possible.

Figure 11:
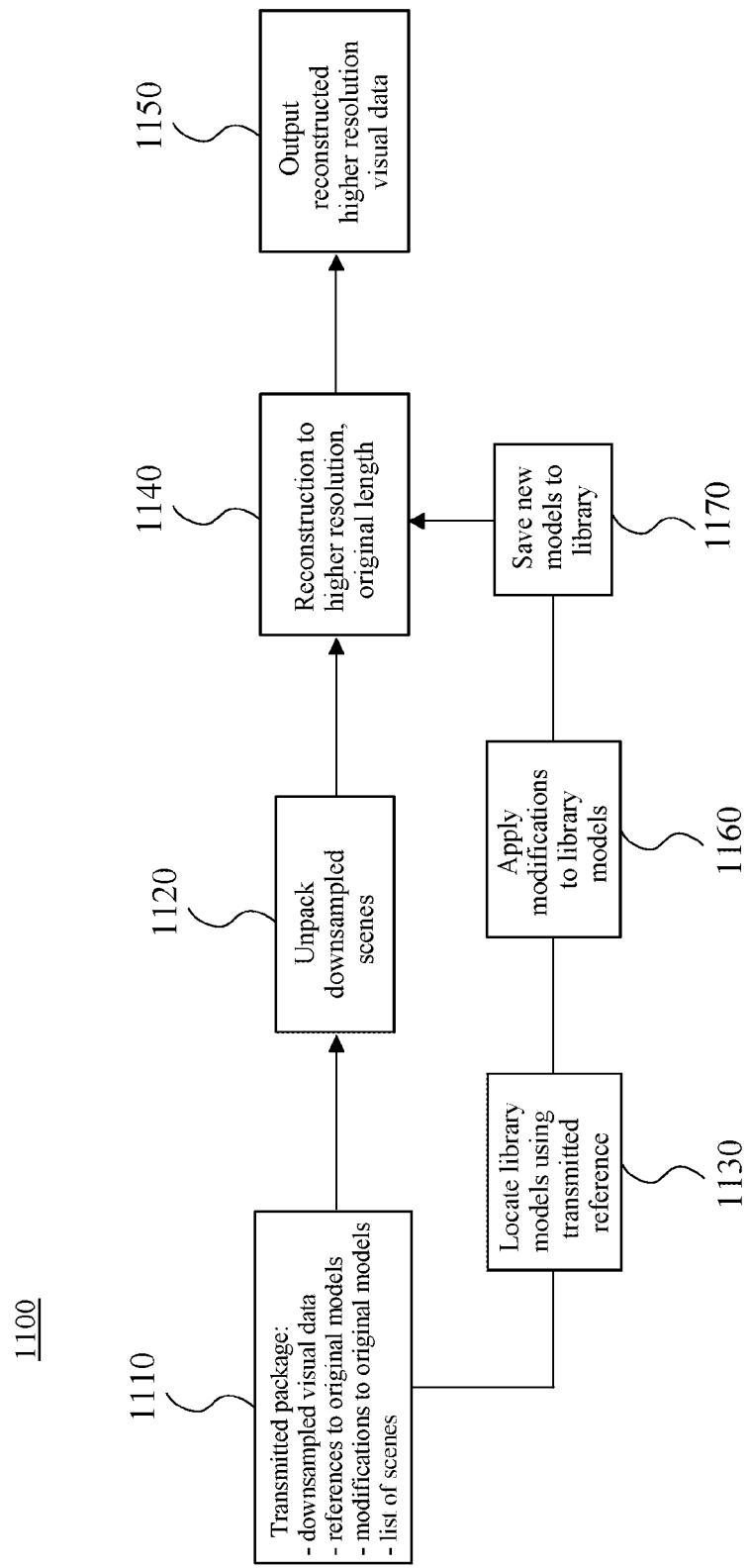
FIG. 11 illustrates the decoding process using the low resolution visual data and a reference to a known convolutional neural network, along with modifications to that network, to recreate a version of a high resolution visual data.

Referring now to FIG. 11, an embodiment for reconstructing the video encoded using the technique will now be described in detail.

First, the data 1100 is received from the network. The data received 1100 depends on how the data was prepared for transmission in step 1050 as detailed above and will include the video data or representations of the video data and/or references to one or more initial reconstruction models for to recreate high-resolution video data, along with any modifications to the referenced models required to reproduce the final reconstruction models. It is possible that the video data or representations, references to the one or more initial reconstruction models and the modifications to those models are not transmitted and/or received simultaneously so some buffering may be required to wait for all of the components required to decode or reconstruct the higher-resolution video from the data transmitted over the network.

At steps 1120 and 1130, the received data is prepared for reconstruction. This step generally involves separating the low-resolution video or representations if transmitted from the references to known reconstruction models and the modifications to those models required to reproduce the optimised reconstruction model. Optionally, the low-resolution video is decompressed at step 1120 using the video codec used for transmission into full-resolution image frames and each of the frames is matched up with the corresponding reconstruction model, which are also unpacked into frame-by-frame order.

The reconstruction models developed at step 1170 are recreated from the reference to a known reconstruction model and the modifications received at step 1110. At step 1130 the received reference is used to locate the known reconstruction model from which the optimised reconstruction model was developed in a library of models stored at the second node. The received modifications are then applied to this known reconstruction model at step 1160, recreating the optimised reconstruction model. After this reconstruction has taken place, the optimised reconstruction model is saved in the library at the second node for future reference at step 1170 using the same reference as was used when saving the model to the first node's library at step 1170. An incremental (or decremental) counter can be used to create new references for the modified algorithm that would then be the same for both nodes (in a distributed system). Alternatively this could be performed via a centralised database.

At step 1140, the modified reconstruction model is applied to each of the frames or representations if transmitted to output higher-resolution frames, else are used to reproduce the higher-resolution frames without a low resolution frame or representations. The reconstruction, or decoding, process involves applying the optimised super resolution convolutional neural network model, or reconstruction model, for each scene in order to recreate higher resolution video having substantially the same quality as the original high-resolution video. Given the corresponding models and if transmitted each lower-resolution frame or set of representations, a higher resolution frame that is substantially visually identical to the original higher-resolution frames can be reconstructed with high accuracy.

At step 1150, each of the segments of video are output from the reconstruction process as higher-resolution frames at the same resolution as the original video 210. The quality of the output video 1150 is substantially similar to that of the original video 210, within the error bounds optionally applied by the machine learning process that develops the reconstruction model at step 1060 of the encoding process.

At step 1140, the segments of video are combined such that the video can be displayed. Optionally at step 1140, the video can be re-encoded with the original codec used on the original video 1010 or a more predetermined optimal codec, to enable playback on a decoder or display device.

A modified embodiment of the above-described method is shown in FIGS. 4 and 5. In this embodiment, the downsampled video is not transmitted from the first node to the second node. Instead, any data required to produce the reconstructed video can be included in the transmitted modifications to a known reconstruction model. It is possible that no data is required and that only the use of a model is required to reconstruct substantially the high-resolution video. The second node reconstructs the video using only the modified reconstruction model obtained by applying the modifications to the known reconstruction model referenced in the transmission and, if required, the data required to produce the reconstructed video. This method can advantageously be used to reduce further the amount of data transmitted across the network, reducing the amount of data required to be transmitted.

Figure 12:
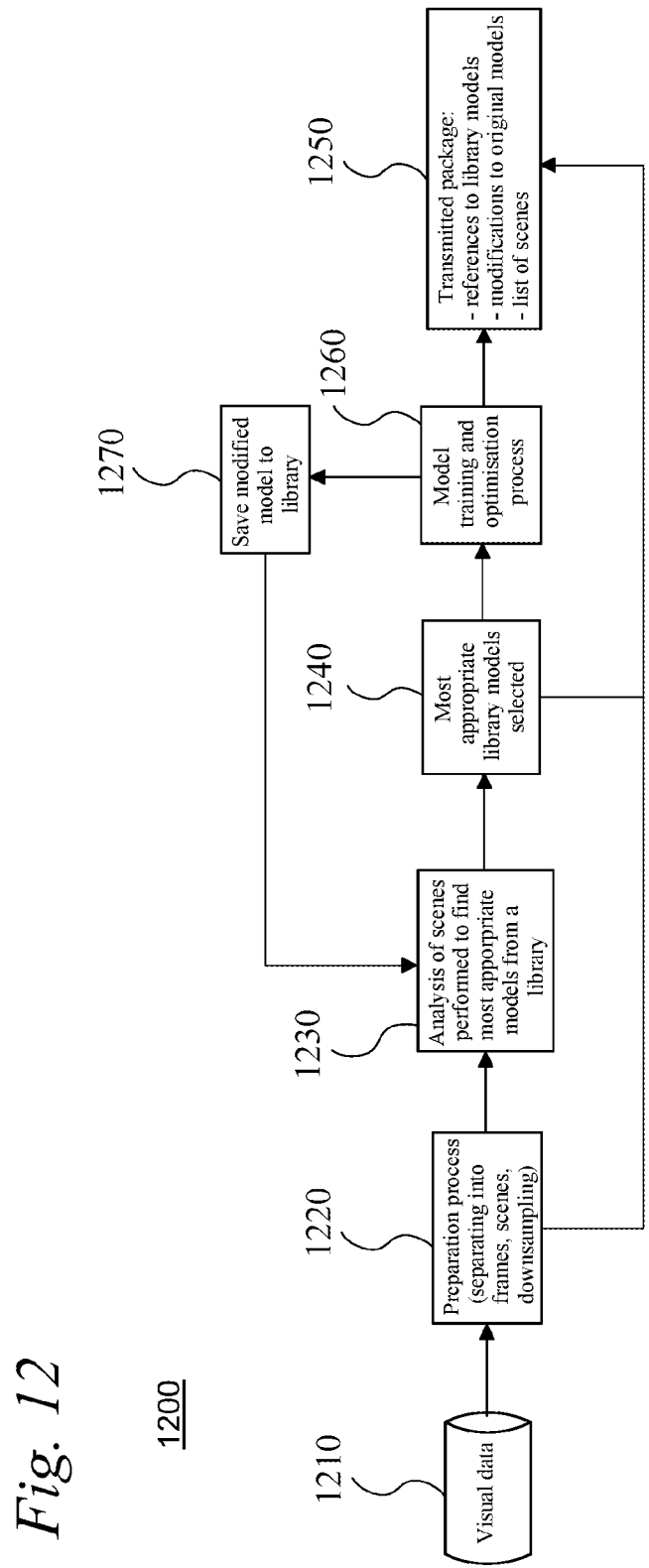
FIG. 12 illustrates a further encoding process to generate for transmission, from high resolution visual data and known convolutional neural networks a modified convolution neural network.

FIG. 12 shows a further method for encoding video. The initial steps proceed as in FIG. 10. The higher resolution video 1210 is prepared by separating it into scenes and down sampling at step 1220. An analysis of each scene is performed in step 1230 to determine which known models will be used as a starting point for the model optimisation process. One or more appropriate models are selected at step 1240 based on a metric of each scene or frame that can be compared to metrics associated with the reconstruction models stored in the library. The selected known models are optimised at step 1260 using machine learning. However, instead of being trained to reproduce the higher resolution video from the downsampled one, they are instead trained to substantially reproduce the higher resolution video 1210 using only the optimised model itself or the optimised model and any data that can be incorporated into the model to seed recreation of the video frame or scene. A reference to the starting known reconstruction model together with the modifications required to reproduce the optimised reconstruction model for each scene or frame are transmitted to the second node at step 1260, along with a list of scenes if known.

Figure 13:
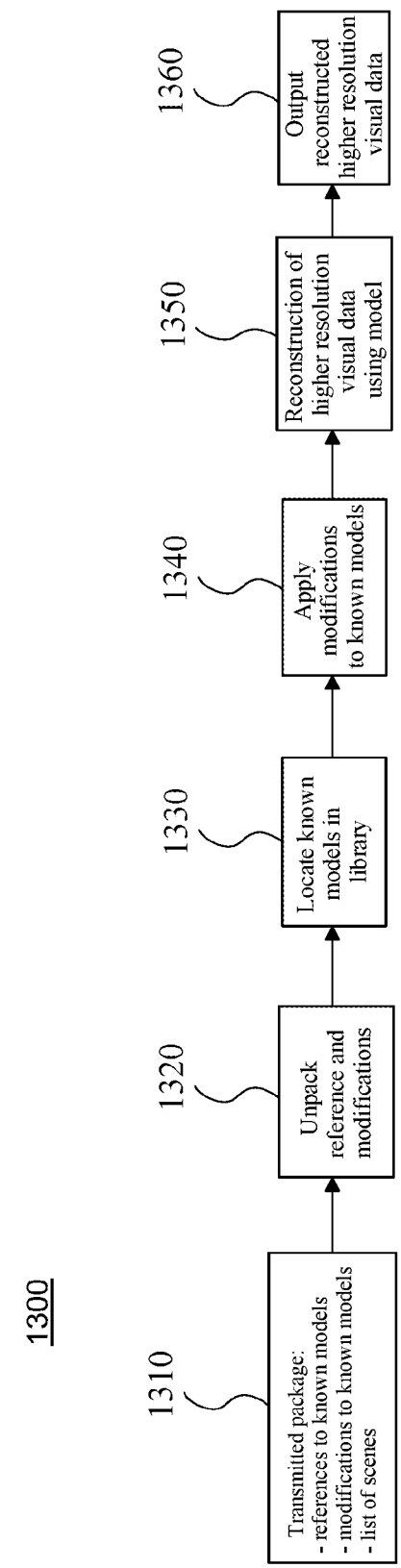
FIG. 13 illustrates a further decoding process using a reference to a known convolutional neural network, along with modifications to that network, to recreate a version of a high resolution visual data.
Figure 14:
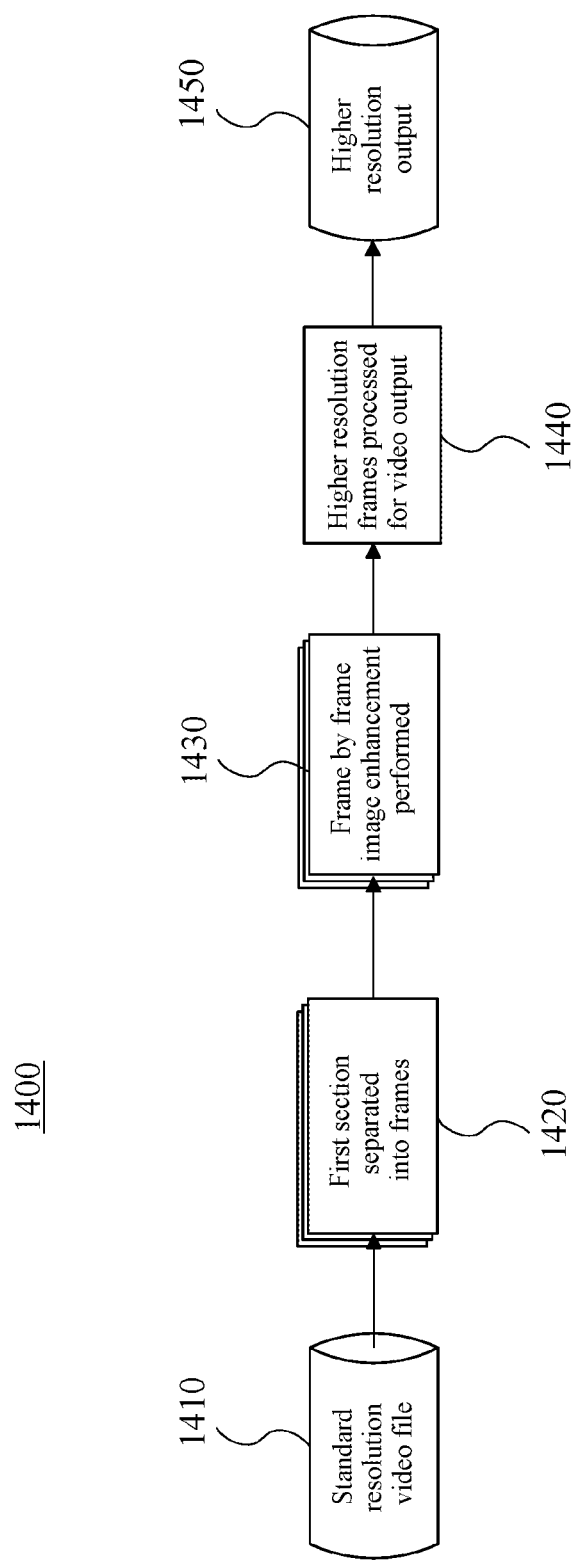
FIG. 14 is a flowchart illustrating the method steps for a conventional image enhancement process from a lower resolution original visual data to a higher resolution visual data.

FIG. 13 shows a further method of decoding the received information at the second node to reproduce substantially the higher resolution video. The package transmitted at step 1260 of FIG. 12 is received by the second node at step 1310, and unpacked at step 1320. The references to known models are used to locate the known reconstruction models stored in a library at the second node at step 1330. The modifications corresponding to these known reconstruction models are then applied at step 1340 to reproduce the optimised reconstruction model generated by the machine learning process in step 1260 of FIG. 12. This model is optimised to substantially reproduce the original higher resolution video 1260 without the need for it to be applied to a corresponding low resolution video sample. Hence the second node can substantially reconstruct the original high resolution video from only the modified reconstruction model. This reconstruction is performed at step 1350, and the resulting reconstructed higher resolution video is output at step 1360.

Specific Description—Artefact Removal

To improve on the above mentioned approaches for image artefact removal, it is proposed to use deep learning techniques and neural networks such as recurrent neural network and convolutional neural network models.

In some cases fully connected neural networks can't scale up to larger sizes of network easily as the computational complexity soon becomes too great as the size of the network scales, but this depends on the application of the neural network and also other factors such as the kernel and filter sizes.

Figure 22:
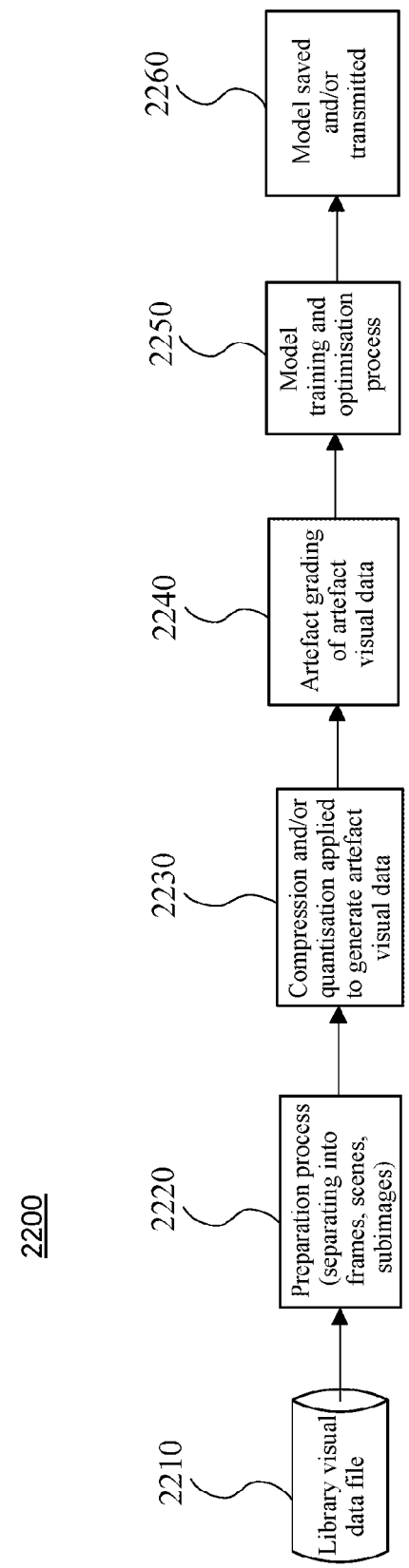
FIG. 22 illustrates an overview of a method of generating models for use in image artefact removal.

Neural network models can be transmitted along with the low-resolution and/or low-bitrate and/or low quality frames of video data because size of a convolutional neural network model or recurrent neural network model data is small enough to do so compared with the size of a learned dictionary for the same level of accuracy. In comparison, the data size of learned dictionaries means that it is impractical for these dictionaries to be transmitting along with the low-resolution images, especially in where the dictionaries are learned over-complete dictionaries FIG. 22 illustrates an overview of embodiments of a method of generating models for use in image artefact removal. These embodiments can be used in combination with other embodiments, and alternative and optional portions of embodiments, described elsewhere in this specification.

In some embodiments, training image or video file is selected at step 2210 from a library of training images or videos stored at a network node and divided up into frames, sub-images or sequences of images (collectively referred to herein as scenes) at step 2220 depending on its content. In these embodiments, the scene type can then be classified into a particular category depending on its content using a metric.

In some embodiments, at step 2230, image artefacts are purposefully generated in the scene by applying aggressive compression and/or quantisation algorithms to the scene, with the level of expected artefacts being controlled by the compression/quantisation level or quality level. This creates a training scene. In some of these embodiments an artefact grading technique is applied to this training scene at step 2240 to quantify the severity of the induced artefacts.

At step 2250, in some embodiments, an image artefact removal model is trained on the training scene using machine learning techniques. In these embodiments the image artefact removal model can be generated such that it substantially cleans the training scene of image artefacts. In some of these embodiments, image quality metrics are used to compare the "cleaned" scene with the original, and the training process can be continued until the comparison produces results within some pre-defined threshold.

In some embodiments, the resulting image artefact removal model is then saved at step 2260, along with metric data relating to the scene type classification and an artefact grade relating to the types and/or severity of the artefacts in the training scene.

The process can be repeated multiple times, depending on the embodiment, on the same training scene with different levels of compression and quantisation in order to train a set of models for different levels of artefact severity.

The process can also be repeated in some embodiments with different training scenes in order to generate a library of different image artefact removal models indexed by both their content type and artefact severity. In these embodiments a "matrix" of library models can be created, where one axis of the matrix can be thought of as the content type, and the other the artefact severity.

Each step of the above method, as used in some embodiments, will now be described in further detail.

The division of the training image or video into a scene or scenes at step 2220 can be achieved in several different ways in different embodiments. The training image or video may already be divided into scenes prior to being stored in the library of training images or videos in certain embodiments, hence this step of the method is not always necessary. For the training of the image artefact removal model, in some embodiments only one scene is used for each model generated. In these embodiments a single training image or video may therefore be used to train multiple different image artefact removal models relating to different content types present within the image or video.

Considering first the case of video data, in some embodiments the library video data can be split into single full-resolution frames, i.e. into a sequence of images at the full resolution of the original video data. For some video codecs, in certain embodiments, this will involve "uncompressing" or restoring the video data as, for example, common video compression techniques remove redundant (non-changing) features (or subset of features) from sequential frames.

Optionally, in other embodiments the full-resolution frames can be grouped into scenes or sections of frames having common features (or subset of features), otherwise known as "scene selection". In such embodiments, the video data can be split or clustered into scenes to enable more specific training and optimisation. By scene, it is meant a consecutive group or sequence of frames, which at the coarsest level can be the entire video or at the most granular level can be a single frame or portion of a frame depending on embodiment.

For the training of the image artefact removal model, in some embodiments only one scene is used for each model generated. A single training image or video may therefore be used in such embodiments to train multiple different image artefact removal models relating to different content types.

Once a scene has been generated, in some embodiments it is classified using metrics relating to properties of the scene. In embodiments, metrics that can be used for this classification can include probability or distance, depending on the classifier type or clustering used in each embodiment, and some function of the error or differences can be included in the metric depending on embodiment. Example metrics can include the differences between pixels or histogram differences such as the sum of absolute differences or Euclidean distance in these embodiments. Example metrics can also include mean squared error and peak signal-to-noise ratio in some embodiments. Alternatively, in other embodiments classification can be performed according to predetermined trained classifications, for example there could exist predetermined trained classifications for a variety of scenes or objects such as outdoors, indoors, mountains, bike, etc. The probability would be determined by the classifier used in the embodiment, for example embodiments could use a statistical similarity measure such as the Kullback-Leibler divergence. In other embodiments, a further alternative would be to use machine learning to develop a metric to be applied to the image-space, which would determine a formula for the distances. This classification using metrics is used to distinguish between scenes containing different content in at least some embodiments. The metric data determined in this way effectively assigns the scene a content type in such embodiments.

After the scene has been generated and classified, in at least some embodiments it is compressed and/or quantised at step 2230. In these embodiments, the compression of the scene can be implemented using any well-known lossy image/video compression algorithm. In such embodiments, the quantisation methods may include both colour quantisation, using for example a median cut algorithm or a clustering algorithm, and frequency quantisation.

In embodiments, the compression or quantisation process introduces image artefacts to the scene, producing a training scene that will be used together with the original uncompressed and unquantised version of the scene to train and/or optimise an image artefact removal model. In these embodiments, different levels of artefact severity can be introduced by varying the level of compression and/or quantisation performed at this stage.

Before the training and optimisation process begins in some embodiments, the artefact severity of the training scene is determined at step 2240 by using an artefact grading algorithm. Examples of such algorithms that can be used in embodiments are found in the paper "No-Reference Image Quality Assessment in the Spatial Domain" by Anish Mittal, Anush Krishna Moorthy and Alan Conrad Bovik published in IEEE TRANSACTIONS ON IMAGE PROCESSING, Vol. 21, No. 12, DECEMBER 2012, which is incorporated herein by reference. By grading the artefact severity of a training scene in embodiments, image artefact removal models can be trained based on both scene content type and the severity of the artefacts present.

At step 250 the model training and optimisation process is performed on the training scene in some embodiments. Super resolution techniques and machine learning techniques are employed in some embodiments to create an image artefact removal model, such that the model can be used to substantially recreate the original "clean" version of the training scene. By employing a deep learning approach to generating the model in at least embodiments, a non-linear hierarchical model can be created to reconstruct the original clean scene from the compressed and/or quantised scene.

An example of a deep learning approach, but in respect of only still images and in relation to jpeg compression artefacts (but not, for example, other video artefacts such as motion blur and inter-frame artefacts), but which can be used with or without modification in some embodiments, is described in the paper "Compression Artifacts Reduction by a Deep Convolutional Network" by Chao Dong, Yubin Deng, Chen Change Loy, and Xiaoou Tang published as arXiv:1504.06993v1 [cs.CV] 27 Apr. 2015 and this paper is incorporated herein by reference. This paper is related to generating an improved deep Super Resolution Convolutional Neural Network for image artefact removal from a shallow network model.

In some of the embodiments, the quality of the recreated or cleaned scene can be compared with the original using objective metrics such as error rate, PSNR and SSIM and/or subjective measures. In some of these embodiments, if the quality is found to be within some pre-defined threshold, then the model can be saved along with results from a classifier or outcomes identifying the scene content and the artefact severity that the model relates to. Otherwise, in some embodiments the training process continues until the predefined threshold is met. Alternatively or additionally, in some embodiments a pre-defined number of iterations of the machine learning process can be used to limit the computational time spent training the model.

In some embodiments, the image artefact correction model trained in this way may be one of a non-linear hierarchical algorithm, a convolutional neural network, a recurrent neural network, a multi-layer (neural) network, an artificial neural network, a deep belief network, a dictionary learning algorithm, a parameter, a mapping function, a multi-layer feed-forward network, a non-linear filter, a dictionary, set or series of parameters or functions, or a series of functions.

In some embodiments, the original training scene generated in the scene selection process is used to generate multiple models for the same scene content type by repeating the compression and quantisation process with different levels of compression and/or quantisation, or by using different compression and/or quantisation algorithms. In these embodiments, this approach introduces a different level of artefact severity to the scene. Further, in some of these embodiments the training and optimisation process can then be repeated to generate a new image artefact removal model for the same content, but a different level of artefact severity.

In some embodiments, the trained and/or optimised image artefact removal models are saved to a library of image artefact removal models. In some of these embodiments, each model in the library is associated with a classifier identifying the scene content and the artefact severity that the model was trained on. In these embodiments, the library can be thought of as a "matrix" of example based models, with its rows corresponding to the scene content type, and its columns corresponding to the image artefact severity.

The library can be stored on a node within a network in certain embodiments.

Figure 23:
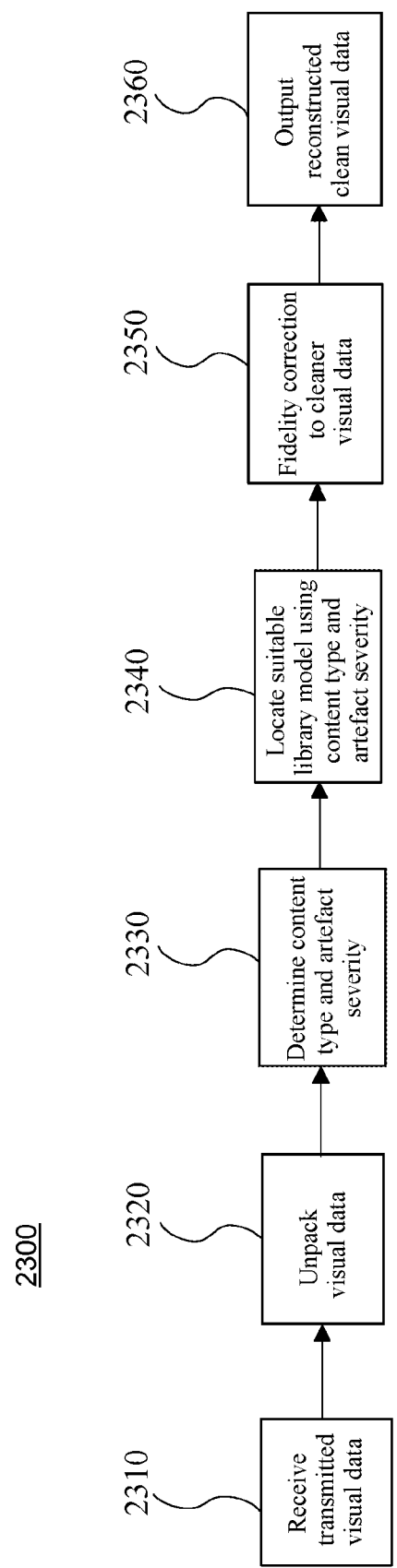
FIG. 23 illustrates a method of using the image artefact removal models.

Referring now to FIG. 23, a method of using the image artefact removal models will now be described according to some embodiments.

A section of video or an image is received from a network at a receiving network node at step 2310 in some embodiments. In these embodiments, the data received depends on how the data was prepared for transmission at a transmitting network node and will include the video/image data or representations of the video/image data. It is possible in some of these embodiments that video data or representations is not transmitted and/or received simultaneously so some buffering may be required to wait for all of the components required before the artefact removal process can take place.

In some embodiments, at step 2320, the received video or image data is unpacked and divided into scenes depending on its content using the process described above in relation to the image artefact removal process. In some of these embodiments, the scenes are then classified at step 2330 using metrics to determine the scene content type.

Alternatively, in other embodiments the received video/image data can already have been divided into scenes and classified by the transmitting network node, in which case the data received by the receiving node will contain metadata for each of the scenes contained within it that identifies the scene content type.

In either case, in some embodiments, at step 2330, the received scenes are subjected to an artefact grading algorithm or classifier to determine the level of artefact severity present in the scene. In some of these embodiments the source of these artefacts can be the video/image compression and quantisation process performed by the transmitting node prior to transmission of the video/image data, or they could be introduced by faulty or lossy network transmission.

In some embodiments, the scene content type and image artefact severity are used to select the image artefact removal model from the library of image artefact removal models generated in the model creation process that best matches the scene content type and artefact severity of the received scene. In these embodiments, this matching may be performed at the receiving network node if the library is stored there. Alternatively, in other embodiments, if the library is stored remotely from the receiving network node, a request for the most suitable image artefact removal model may be transmitted from the receiving node to the location of the model library. In some of these embodiments the model library will then transmit the relevant image artefact removal model to the receiving network node. If no suitable image artefact removal is stored in the library then a generic model may be used instead. In such embodiments, a suitable model may be determined, for example, by requiring that the metric data relating to the content type and the artefact severity of the received video or image data lie within some predefined range of at least one of the image artefact removal models stored in the library.

In some embodiments, the image artefact removal model identified to be the most suitable (or the generic model in the case that no suitable model is present in the library or if the generic model is the most suitable model) is then applied to the received scene at step 2350 in order to substantially recreate the original video/image file largely free from image artefacts. In such embodiments, this fidelity correction process can result in a clean reconstructed video/image, which is then output by the receiving node at step 2360.

Figure 24:
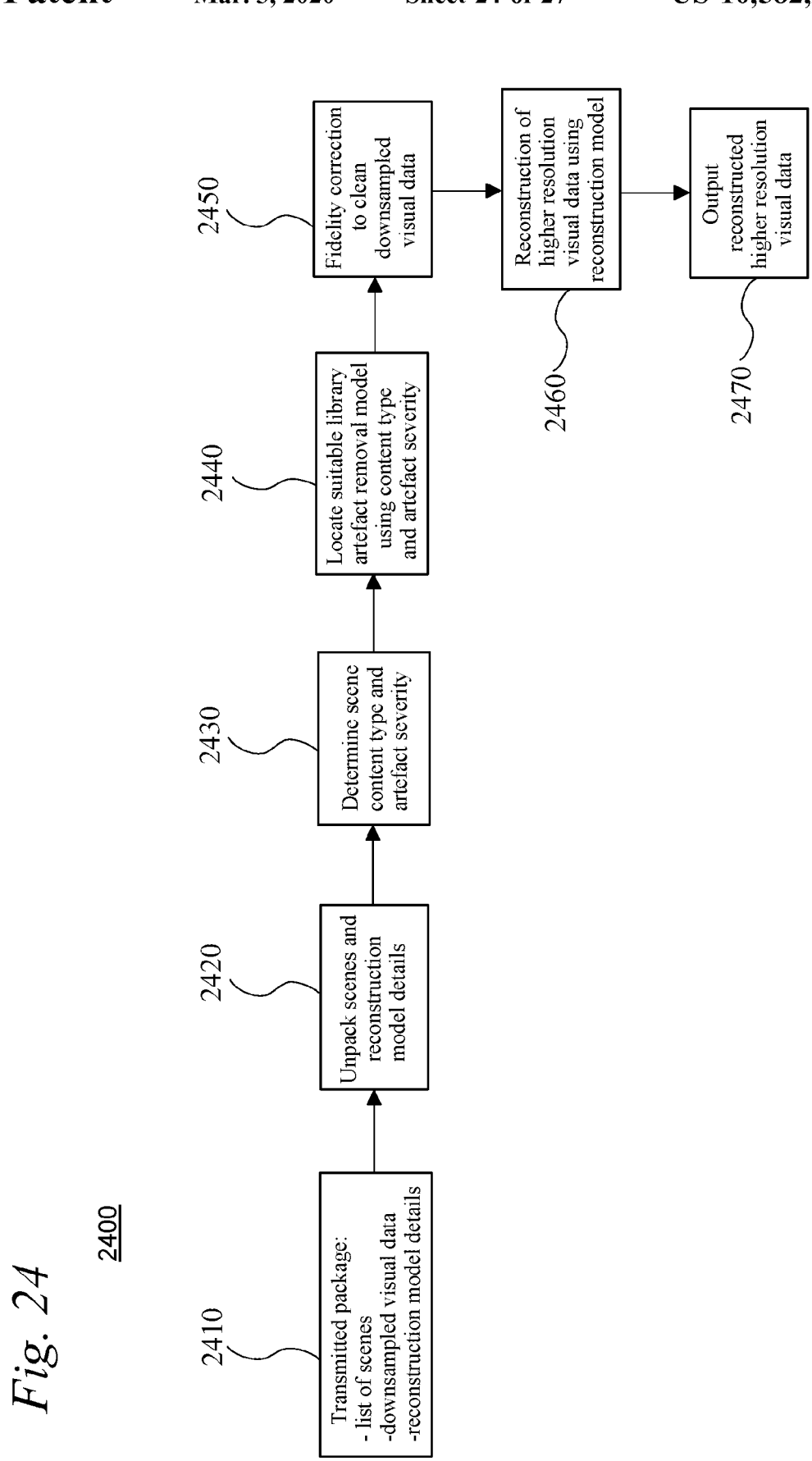
FIG. 24 illustrates an alternative method of using the image artefact removal models.

Referring now to FIG. 24, an alternative method of using the image artefact removal models according to some embodiments will now be described.

In such embodiments, this method relates to the combined use of image artefact removal and super resolution techniques to reconstruct a video or image from a downsampled (i.e. lower resolution than an original higher resolution) video or image data received from a network.

In some embodiments, firstly, at step 2410, the data package is received from the network. In these embodiments, the data received in the package depends on how the data was prepared for transmission by the transmitting network node and can include downsampled video or image data or representations of the video or image data and/or details of one or more reconstruction models for recreating high-resolution video data from the downsampled video or image data. In such embodiments, these details may be the reconstruction models themselves, or references to known reconstruction models stored at the receiving node or on the network.

In some embodiments, it is possible that the video data or representations, references to the one or more initial reconstruction models and the modifications to those models are not transmitted and/or received simultaneously so some buffering may be required to wait for all of the components required to decode or reconstruct the higher-resolution video from the data transmitted over the network.

Next, at step 2420, the received data is prepared for reconstruction in some embodiments. In these embodiments, this step generally involves separating the low-resolution video/image or representations if transmitted from the details of the relevant reconstruction models. Optionally, in other embodiments, the low-resolution video or image is decompressed using the video or image codec used for transmission into full-resolution scenes and each of the frames is matched up with the corresponding reconstruction model, which are also unpacked into scene-by-scene order.

At step 2430, in some embodiments, if the scene content has not already been determined by the transmitting node, then it is now determined by the receiving node.

In some embodiments, the unpacked video or image scenes are then graded to determine their artefact severity using an artefact grading algorithm.

In some embodiments, at step 2440, the scene content type and image artefact severity are used to select the image artefact removal model from the library of image artefact removal models generated in the model creation process that best matches the scene content type and artefact severity of the received scene. In such embodiments, this matching can be performed at the receiving network node if the library is stored there. Alternatively, in other embodiments where the library is stored remotely from the receiving network node, a request for the most suitable image artefact removal model can be transmitted from the receiving node to the location of the model library. In such embodiments the model library will then transmit the relevant image artefact removal model to the receiving network node. If no suitable image artefact removal model is stored in the library then a generic model may be used instead in some of these embodiments.

in some embodiments, the image artefact removal model identified for each scene is then applied to the downsampled scene at step 2450 in order to substantially recreate the original downsampled image transmitted by the transmitting node. Alternatively, in other embodiments the identified model can be used after the upscaling process of step 2460 to substantially remove the upscaled image artefacts from the recreated higher resolution video.

At step 2460, in some embodiments the relevant reconstruction models are then applied to each of the scenes to output higher-resolution scenes. In such embodiments the reconstruction, or decoding, process can involve applying the optimised super resolution convolutional neural network model, or reconstruction model, for each scene in order to recreate higher resolution video or image having substantially the same quality as the original high-resolution video or image from which the downsampled video or image was generated by the transmitting node. Given the corresponding reconstruction models and each lower-resolution scene or set of representations, in some embodiments a higher resolution frame that is substantially visually identical to the original higher-resolution frames can be reconstructed with high accuracy.

In some embodiments, the reconstructed higher resolution scene is then output by the receiving node at step 470.

The above-described process is performed as a post-process to the standard decompression process used at the decoding node for received transmissions of, for example, video after the conventional decoding step and therefore "outside" the traditional compression pipeline in at least some embodiments.

Alternatively, in other embodiments, the image artefact removal process can be performed as part of the upscaling process itself. In such embodiments, several reconstruction models can be trained to reproduce the higher resolution image or video at the first node from a number of different downsampled images or videos, each with a different artefact severity. In such embodiments, these can either all be transmitted with the downsampled video, or the required model can be transmitted to the second network node from the first node once a request for the model containing the artefact severity of the received downsampled image or video has been sent from the second node to the first node. In either case, in some embodiments the model best matching the artefact severity of the received downsampled image or video is used to substantially recreate the original high resolution video.

Spatio-Temporal Interpolation

In some embodiments, visual data being received may be of a lower than desirable quality, such as at a low resolution or a low frame rate. It will be appreciated other features (or subset of features) may render the visual data lower than desirable quality. One or more hierarchical algorithms (e.g., having hierarchical layers) may be used to increase the quality of the visual data to a more desirable quality. For example, in some embodiments, the hierarchical algorithm may increase the resolution of the received visual data section or sections. In another embodiment the hierarchical algorithm may develop intermediate sections, such as a section to be placed between two received sections of visual data. In yet another embodiment, the hierarchical algorithm any be used to increase the quality of the received visual data by combining the above mentioned embodiments.

These embodiments can be used in combination with other embodiments, and alternative and optional portions of embodiments, described elsewhere in this specification.

In some embodiments, one or more hierarchical algorithms may be used to estimate higher-resolution versions of received lower-resolution frames. In such embodiments, upon receiving multiple lower-resolution frames, a hierarchical algorithm can be used to estimate a higher resolution version of a particular received frame. In some embodiments, on the receipt of three or more consecutive frames of lower-resolution visual data a hierarchical algorithm may be used to estimate a higher resolution version of one of the middle frames. In such embodiments, this estimation can be based not only on the lower-resolution version of the received frame, but also the lower-resolution version of the previous and subsequent frames also received. Alternatively, in other embodiments the hierarchical algorithm can be used to determine an unknown intermediate frame at the same resolution as previous and subsequent received frames.

Alternatively, in some other embodiments a hierarchical algorithm may be used to estimate higher-resolution versions of the received lower-resolution frames, as well as a higher-resolution version of an unknown intermediate frame. Furthermore, in some embodiments the hierarchical algorithm may also be used to estimate an unknown future or past frame based upon the received lower-resolution frames.

Online Training

In some embodiments, new visual data being transmitted from a node to one or more other nodes has no hierarchical algorithms trained to enhance a lower-quality version of the new visual data. For example, in some embodiments this new visual data may be live broadcast video data and in some embodiments the new visual data may be streamed or rendered e-gaming video content. Where there exist no hierarchical algorithms for this new visual data, specific or generic hierarchical algorithms need to be trained in order to enhance lower-quality versions of the new visual data in some of these embodiments and as per some of the embodiments described elsewhere.

In some embodiments, multiple hierarchical algorithms can be trained in parallel on the same visual data. In such embodiments, this allows for wider range of hierarchical algorithms to be explored within a given timeframe. In some of these embodiments, the most suitable algorithm from these developed algorithms can be selected for transmission across the network with the visual data. In some embodiments, developing the hierarchical algorithms in parallel can be useful in situations where there is only a limited time available to develop the hierarchical algorithm.

In parallel to the development of hierarchical algorithms (whether singly or multiple in parallel), in some embodiments the visual data can be encoded in an encoder in preparation for its transmission across the network. In this way, the time taken to prepare both the hierarchical algorithm and the visual data for transmission can be reduced when compared to developing the hierarchical algorithm and encoding the visual data in series in such embodiments.

Once generic or specific hierarchical algorithms have been developed or trained, for example for a new game being streamed as e-gaming video content, these can be used to enhance the quality of lower-quality streamed visual data at receiving nodes.

These embodiments can be used in combination with other embodiments, and alternative and optional portions of embodiments, described elsewhere in this specification Offline Training In some embodiments, new visual data to be transmitted from a node to one or more other nodes has no hierarchical algorithms trained to enhance a lower-quality version of the new visual data. For example, in some embodiments this new visual data may be new video data such as a new film or television series and in some embodiments the new visual data may be a computer game that will in the future be used to generate streamed e-gaming video content. Where there exist no hierarchical algorithms for this new visual data, specific or generic hierarchical algorithms need to be trained in order to enhance lower-quality versions of the new visual data in some of these embodiments and as per some of the embodiments described elsewhere.

Often, the visual data will be encoded prior to transmission across the network using an encoder in certain embodiments. The encoding process may introduce encoder specific artefacts to the visual data in such embodiments. By refining the hierarchical algorithm by performing further training steps on the encoded video in some embodiments, the hierarchical algorithm can be trained to substantially correct image artefacts introduced by the encoder.

In some embodiments the hierarchical algorithms can be trained using training data corresponding to the exact visual data that will be transmitted across the network. In such embodiments, this approach can be particularly useful in situations where the visual data is known in advance, and where the visual data is likely to be transmitted across the network multiple times. For example, in some embodiments the hierarchical models can be trained on sections of an episode of a TV program that will be made available on an on-demand streaming service. In such embodiments the models trained on that particular episode can be transmitted alongside the lower-quality visual data and be used to enhance the lower-quality visual data to a higher-quality version of that episode.

Alternatively, in other embodiments the hierarchical algorithms can be trained on training data that is similar, but not identical, to the expected visual data on which they are to be used. In such embodiment these trained models can be associated with metric data relating to properties of the visual data on which they were trained. In some of these embodiments, this metric data can later be used to select an appropriate hierarchical algorithm to use to enhance visual data for which no specific model has been trained. In some embodiments visual data is being generated and transmitted across the network substantially simultaneously, for example during a live broadcast. In such embodiments, there may not be enough time to generate a specific hierarchical algorithm for the visual data without introducing a substantial delay to the live broadcast. In such embodiments, selecting a hierarchical algorithm that has been pre-trained on similar visual data can reduce this delay.

Once hierarchical algorithms have been trained in order to enhance lower-quality versions of the new visual data these can be stored in order to be sent with the visual data or distributed to receiving nodes in advance of visual data being sent, depending on the embodiments.

These embodiments can be used in combination with other embodiments, and alternative and optional portions of embodiments, described elsewhere in this specification.

Strided Convolutions

Figure 18:
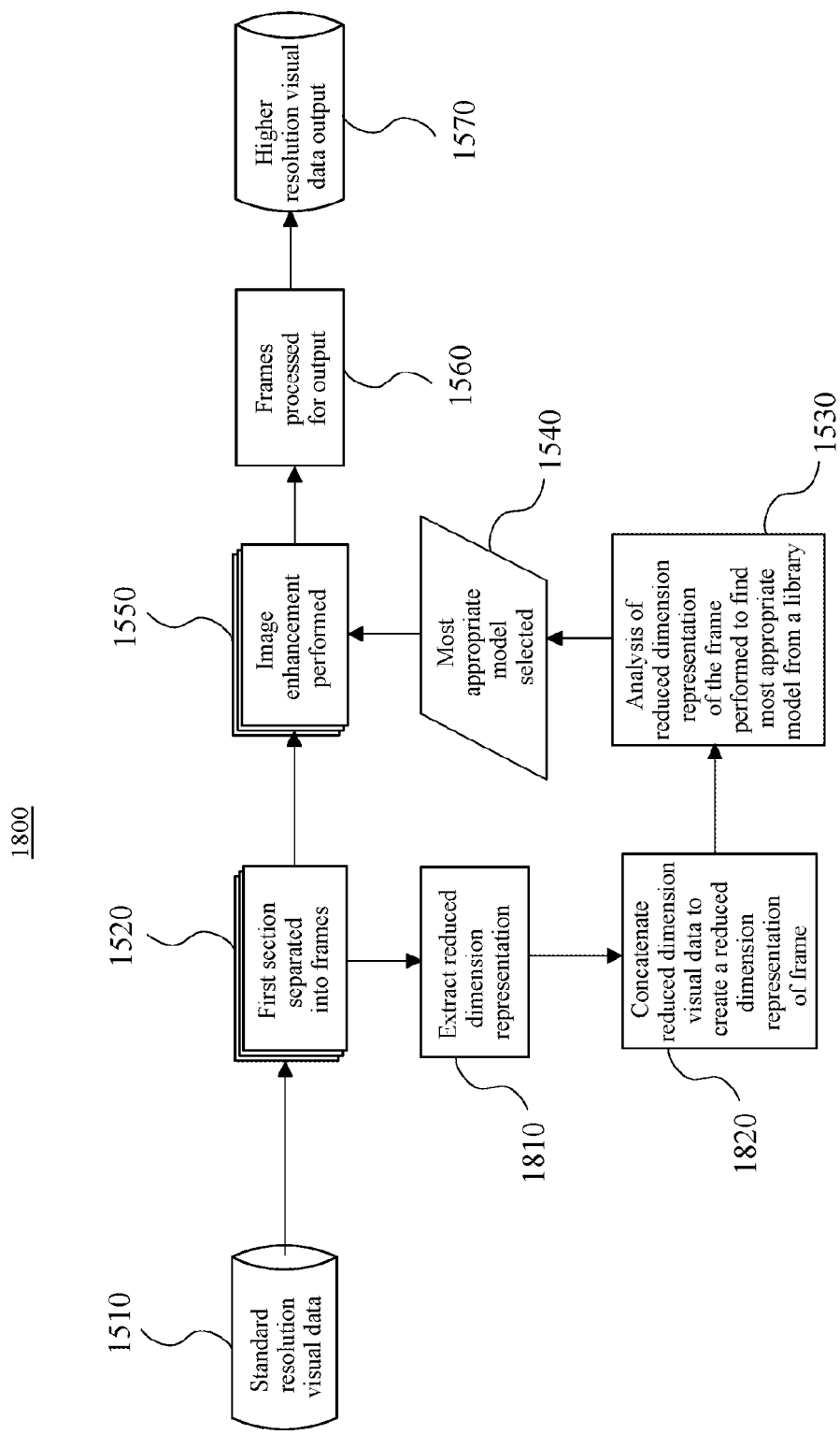
FIG. 18 is a flowchart illustrating the method of FIG. 15, with the additional steps of extracting a reduced dimension representation and concatenating the visual data to create a reduced dimension representation of the separated frame.
Figure 21:
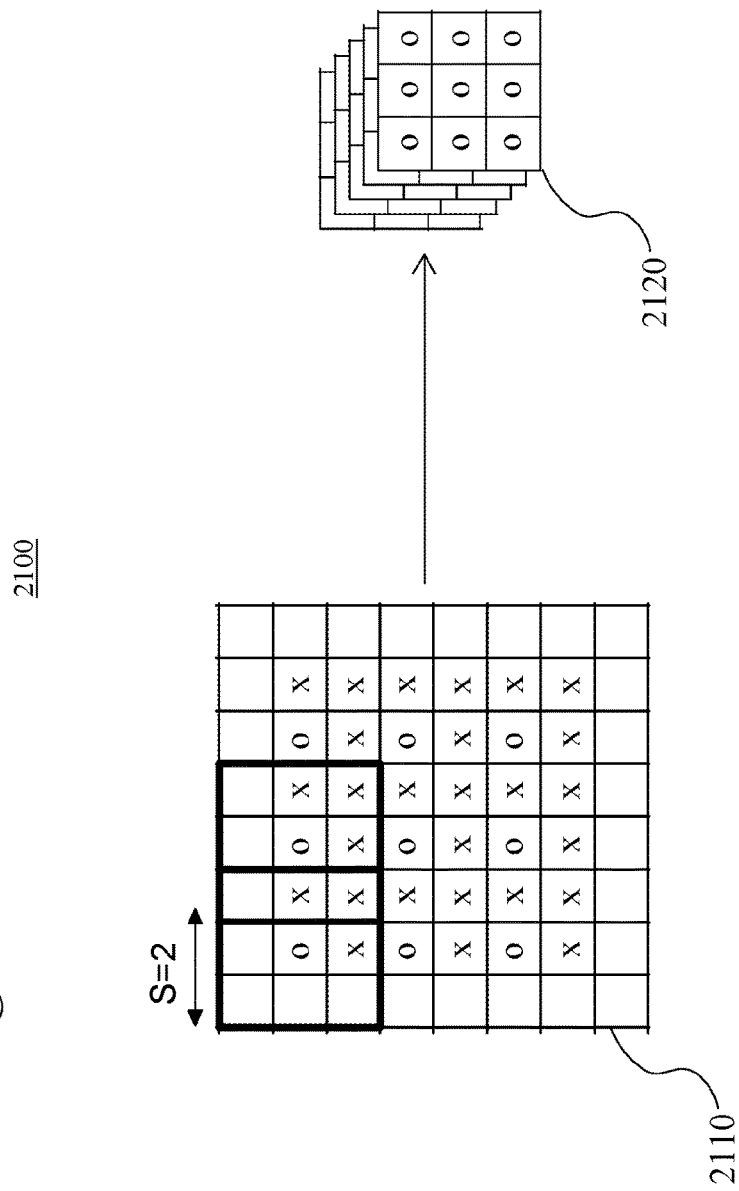
FIG. 21 illustrates the selection of pixels from visual data based upon a predetermined value to produce reduced resolution visual data for processing by the method illustrated in FIGS. 18 through 20.

Optionally, FIG. 18 shows an alternative method 1800 of the method 1500 shown in FIG. 15 according to some embodiments. In these embodiments, once the visual data 1510 has been separated into individual frames at step 1520, the dimension of the full resolution images 2110 extracted may be reduced based on at least one predetermined factor at step 1810. In these embodiments, at step 1810, the at least one predetermined factor may be used to select individual pixels from the extracted full resolution images 2110 to form a lower resolution representation 2120 of the extracted full resolution images 2110. For example, in some embodiments, a predetermined factor of 2 may indicate every other pixel in both the horizontal and vertical dimensions is selected, as shown in FIG. 21. It will be appreciated that other values of the predetermined factor may be used in other embodiments, furthermore in some of these other embodiments both the horizontal and vertical dimensions may each have a different predetermined factor applied.

In some embodiments, the reduced dimension visual data may be concatenated in step 1820, to form a lower resolution representation 2120 of the extracted full resolution images 2110. In these embodiments, the lower resolution representation 2120 can then be used as a basis for any image enhancement techniques and analysis allowing for the use of larger super resolution networks without compromising the runtime. In some embodiments, different predetermined factors and sizes of super resolution network can be used to obtain optimum performance.

Figure 19:
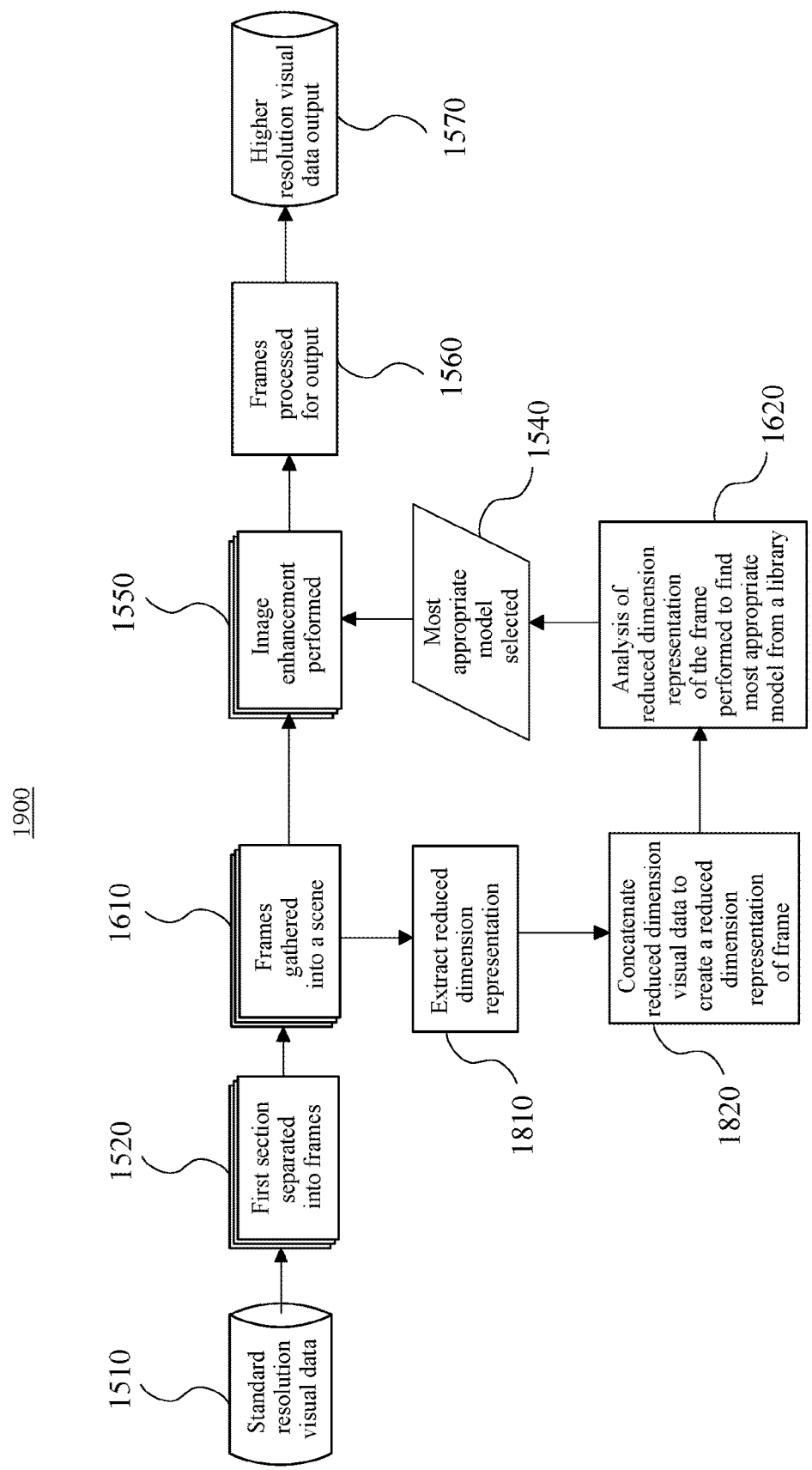
FIG. 19 is a flowchart illustrating the method of FIG. 16, with the additional steps of extracting a reduced dimension representation and concatenating the visual data to create a reduced dimension representation of the separated scene.

Alternatively, in other embodiments, FIG. 19 shows a method 1900 based upon the method 1600 shown in FIG. 16. In method 1900 of these other embodiments, steps 1810 and 1820 can occur after the frames are grouped into scenes in step 1610.

Figure 20:
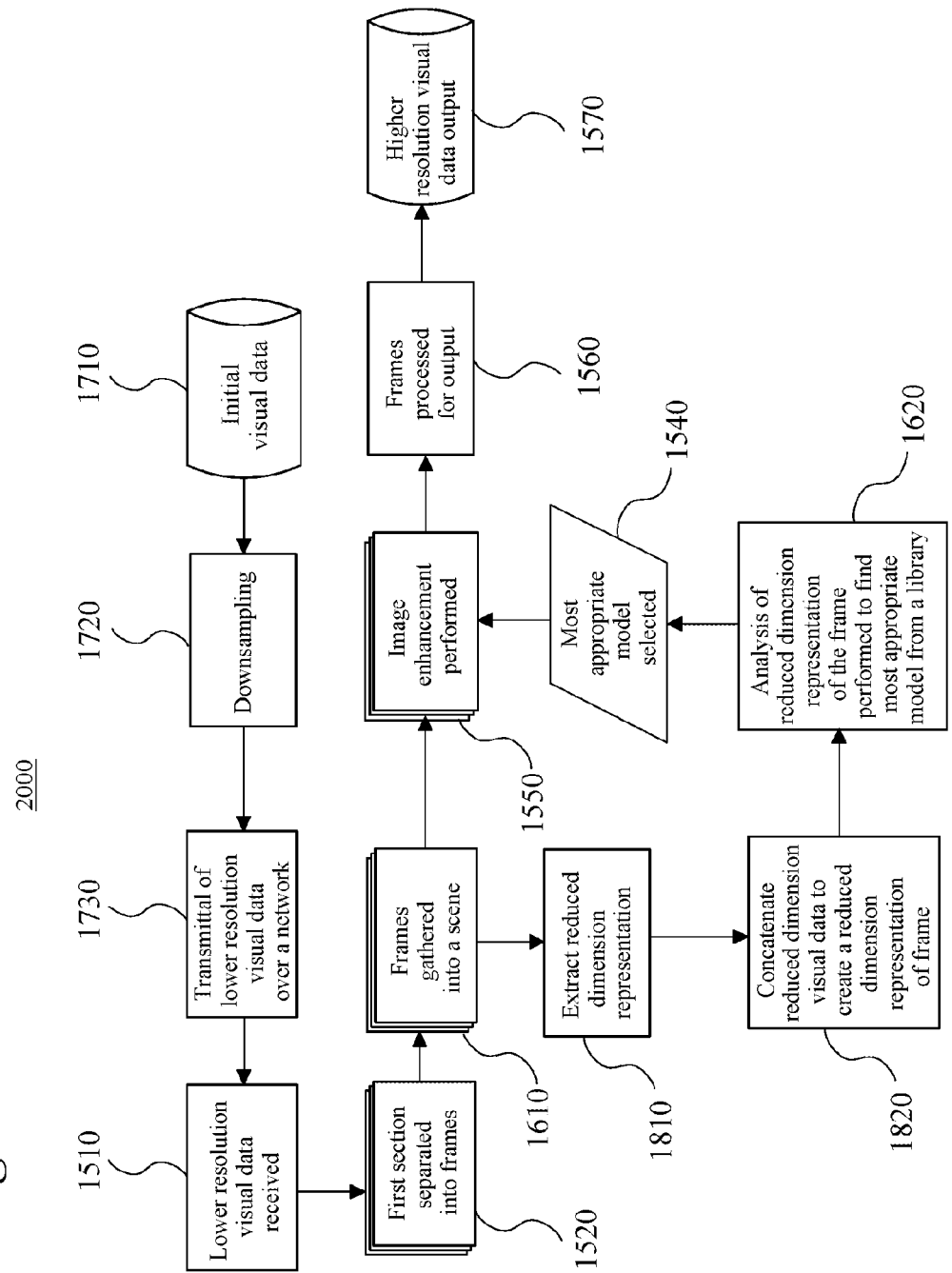
FIG. 20 is a flowchart illustrating the method steps for an image enhancement process according to the embodiment in FIG. 19, with additional steps for encoding visual data at another node prior to transmitting the encoded visual data to the node performing the method of FIG. 19.

Referring now to FIG. 20, a modified process 2000 according to some embodiments (based on process 1900 but which could equally be a modified version of process 1800) is shown.

In these embodiments, process 1900 is modified with further steps. Specifically, in some of these embodiments, step 1710 can begin with a high resolution visual data, for example at HD resolution. Then, at step 1720 of these embodiments, the visual data can be down-sampled to, for example, SD resolution to enable transmission over a bandwidth-restricted network. At step 1730 of these embodiments, the lower-resolution visual data can be transmitted over a network thus becoming the input visual data 310 of either process 1800 or 1900 described above in relation to FIG. 18 or 19 respectively.

Specific Description—Flexibility of Described Aspects and Embodiments

Any system feature as described herein may also be provided as a method feature, and vice versa.

As used herein, means plus function features may be expressed alternatively in terms of their corresponding structure.

In particular, method aspects may be applied to system aspects, and vice versa.

Furthermore, any, some and/or all features in one aspect can be applied to any, some and/or all features in any other aspect, in any appropriate combination.

It should also be appreciated that particular combinations of the various features described and defined in any aspect described herein can be implemented and/or supplied and/or used independently.

In alternative embodiments, the input visual data concerned may be media for playback, such as recorded visual data or live streamed visual data, or it can be videoconference video or any other visual data source such as video recorded or being recorded on a portable device such as a mobile phone or a video recording device such as a video camera or surveillance camera.

It should also be appreciated that the term 'visual data', may refer to a single image, a sequence of images, video, or a section of visual data.

It should further be appreciated that the term "enhancing" may refer to upscaling, increasing the resolution and/or quality of visual data. References to enhancing or increasing the quality of visual data can refer to upscaling or using enhancement techniques of the possible embodiments described. References to down sampling can refer to reducing the resolution and/or quality of visual data (for example by quantisation to lower the bit rate of the visual data).

It should also be appreciated that the term 'frame', particularly in reference to grouping multiple frames into scenes, can refer to both an entire frame of a video and an area comprising a smaller section of a frame.

In aspects and/or embodiments, the terms algorithms and/or models and/or parameters can be used interchangeably or exchanged with each other. Further, in aspects and/or embodiments, the terms hierarchical algorithm, hierarchical model and hierarchical parameter can be exchanged with the terms convolutional neural networks and/or convolutional neural network model, convolutional neural network algorithm, convolutional neural network parameter.

What is claimed is:

1. A method for enhancing a section of low resolution visual data, the method comprising:
   receiving at least one section of low-resolution visual data;
   receiving at least one convolutional neural network based on the at least one section of low-resolution visual data;
   extracting, using the at least one convolutional neural network, a subset of features from the at least one section of low-resolution visual data;
   forming, using the at least one convolutional neural network, a plurality of feature maps of reduced-dimension visual data from the extracted subset of features; and
   mapping, using the at least one convolutional neural network, the plurality of feature maps of reduced-dimension visual data to at least one section of high-resolution visual data using a sub-pixel convolution layer, wherein the at least one section of high-resolution visual data corresponds to the at least one section of low-resolution visual data.

2. The method of claim 1, wherein the extracted subset of features is based on at least one predetermined factor indicating a downscaling factor of the low-resolution visual data.

3. The method of claim 2, wherein a number of maps of the plurality of feature maps is based on the at least one predetermined factor.

4. The method of claim 1, wherein the at least one convolutional neural network differs for each section of visual data.

5. The method of claim 1, wherein the at least one convolutional neural network is selected from a library of convolutional neural networks.

6. The method of claim 5, wherein standardized features of the at least one section of received low-resolution visual data are extracted and used to select the at least one convolutional neural network from the library of convolutional neural networks.

7. The method of claim 5, wherein the at least one convolutional neural network to be selected from the library of convolutional neural networks is based on generating the highest resolution version of the low resolution visual data.

8. The method of claim 1, wherein the at least one convolutional neural network is developed using a learned approach.

9. The method of claim 8, wherein the learned approach includes a machine learning technique.

10. The method of claim 1, wherein the at least one convolutional neural network is non-linear.

11. The method of claim 1, wherein the at least one convolutional neural network performs image enhancement using a super-resolution technique.

12. The method of claim 1, wherein the at least one convolutional neural network uses a spatio-temporal approach.

13. The method of claim 1, wherein the high-resolution visual data is at a higher-resolution than the low-resolution visual data.

14. The method of claim 1, wherein the low-resolution visual data contains a higher amount of artefacts than the high-resolution visual data.

15. The method of claim 1, wherein the visual data includes a plurality of frames of video, or a plurality of images.

16. The method of claim 1, wherein in enhancing the at least one section visual data includes upscaling a quality of the at least one section visual data.

17. The method of claim 1, wherein the section of low resolution visual data includes at least one of a single frame of visual data, a sequence of frames of visual data, and a region within a frame or sequence of frames of visual data.

18. The method of claim 1, wherein the at least one section of low-resolution visual data includes a plurality of hierarchical layers that are at least one of sequential, recurrent, recursive, branching, and merging.

19. The method of claim 1, wherein the sub-pixel convolutional layer performs a convolution with a fractional stride.

20. The method of claim 19, wherein mapping the plurality of feature maps of reduced dimension visual data to at least one section of high-resolution visual data includes applying a periodic shuffling to an output of the convolution with the fractional stride.

* * * * *